United States Patent

Bean et al.

[15] 3,642,197

[45] Feb. 15, 1972

[54] DATA RECORDER AND VERIFIER

[72] Inventors: Donald E. Bean; James T. Engh; James R. Hammer; John J. Igel, all of Rochester; Myron D. Schettl, Oronoco; Harry J. Tashjian; Richard J. Ullmer, both of Rochester; John W. Kerr, Byron, all of Minn.

[73] Assignee: International Business Machines Corporation, Armonk, N.Y.

[22] Filed: July 29, 1969

[21] Appl. No.: 845,817

[52] U.S. Cl. ....................234/35, 101/19, 234/42, 234/56

[51] Int. Cl. ....................G06k 1/20

[58] Field of Search ....................234/42–44, 56, 234/35; 101/19

[56] References Cited

UNITED STATES PATENTS

| | | | |
|---|---|---|---|
| 2,684,718 | 7/1954 | Luhn | 234/43 X |
| 2,729,290 | 1/1956 | Maul | 234/44 |
| 2,857,001 | 10/1958 | Braun | 234/56 X |
| 2,918,658 | 12/1959 | Hoberg et al. | 101/19 X |
| 3,140,822 | 7/1964 | Hergert | 234/56 X |

*Primary Examiner*—William S. Lawson
*Attorney*—Keith T. Bleuer and Hanifin and Jancin

[57] ABSTRACT

A data recorder for punching document cards which are of the type having three tiers into which encoded data may be punched, the system including a keyboard on which characters are entered serially, a magnetostrictive delay line constituting a storage device for storing encoded data from the keyboard in such serial form, and circuitry for actuating punches from spaced characters in the storage device so that a plurality of aligned columns in the plurality of tiers may be punched simultaneously. The data recorder includes printing mechanism for printing the data in corresponding tiers, and the same machine includes circuitry for verifying a punched document card utilizing the same keyboard as that used for punching.

17 Claims, 32 Drawing Figures

INVENTORS.
DONALD E. BEAN
JAMES T. ENGH
JAMES R. HAMMER
JOHN W. KERR
JOHN J. IGEL
MYRON D. SCHETTL
HARRY J. TASHJIAN
RICHARD J. ULLMER

BY Keith T. Bleuer
ATTORNEY

CLOCK BITS

PATENTED FEB 15 1972

3,642,197

SHEET 15 OF 25

DATA RECORDER AND VERIFIER

BACKGROUND OF THE INVENTION

The invention relates to a data recorder or keypunch for document cards and particularly to such a punch in which data may be entered serially from an associated keyboard and which includes punching apparatus for punching the data into a plurality of tiers.

Prior conventional keypunches in general use have utilized document cards, in which successive characters entered on a keyboard are serially punched in a single tier in the card, as the card is incremented across a punching position—the punching for any particular character being accomplished simultaneously as that character is entered on the keyboard. The transport of the machine utilizes a hopper feeding cards generally downwardly with mechanism being included for turning cards about their longitudinal axes so that they are inclined from vertical at a small angle, and the cards are then incremented across a punch station in this disposition. The machine also includes a stacker extending generally vertically and mechanism for turning the cards through approximately 90°, after punching, and into the stacker.

Verifying of a punched card is accomplished by utilizing a separate keyboard-operated machine indicating that a wrong character has been punched, if this is the case.

SUMMARY OF THE INVENTION

It is an object of the present invention to provide an improved keyboard-operated data recorder for document cards, particularly for the type of card having a plurality of longitudinal tiers including aligned transversely extending columns for encoded data, the data recorder including a storage device for receiving encoded data entered serially by means of the keyboard and also including punching mechanism arranged to extract the encoded data from the storage device from spaced characters so that aligned columns in the plurality of tiers may be punched simultaneously.

It is also an object of the present invention to provide such a data recorder which includes a printing mechanism, the printing mechanism likewise being capable of extracting the encoded data from spaced characters in the storage device so that aligned columns of printed information may simultaneously be applied onto the document card to correspond with the aligned columns of punching information.

It is a further object of the invention to provide an improved data recorder of this type having an improved card transport with a card hopper that has the cards extending in it with their faces inclined from vertical through a small angle so that the faces of the cards are easily read by the operator, with the transport being arranged to move and increment the cards to a stacker with the cards remaining in this disposition inclined slightly from vertical. The transport preferably also includes mechanism for turning the cards about an axis substantially parallel with a card and extending transversely thereof so that the cards provide a stack extending in the same general direction as they move along the transport.

It is a further object of the invention to provide a read station in the data recorder and circuitry for entering information from the punched holes into the storage device so that data from the keyboard may be compared with that read from a document card for the purpose of verifying the data punched into the card.

A preferred embodiment of the data recorder includes a magnetostrictive delay line connected by means of circuitry with a keyboard so that characters, as they are punched on the keyboard, are entered serially in encoded form into the delay line; and additional circuitry is provided so that continuous circulation of the data entered into the delay line circulates through the delay line. The data recorder is particularly adapted for use with a document card having positions for three tiers of punched data, there being a column of six punch positions in each tier, and with the columns in the three tiers being in alignment. The recorder preferably includes 18 aligned punches, with six punches being applicable for a column in each of the tiers, and circuitry for extracting spaced encoded characters from the delay line corresponding to the three aligned columns in each incremented position of a card so that data in three aligned columns of three tiers is simultaneously punched into a card. The circuitry for extracting the encoded data from the delay line in three separated characters for each punching operation preferably includes a punch register for storing the information for each of the three separated characters in the delay line so that the punches may be effective for simultaneously punching the data from the three separated characters.

The data recorder includes a row of printing characters for each of the tiers of punched information and also includes a print register corresponding to each of the tiers for storing the data from the three separated characters for the plurality of aligned columns in the plurality of tiers that are punched simultaneously, and the arrangement is such that the three characters are printed that correspond to the punched data in a plurality of aligned columns.

The data recorder also preferably includes a read station connected with the delay line in such a manner that, as the card is fed across the read station, the data is read from a plurality of aligned punched columns in the plurality of tiers, with circuitry being included to enter this data into the data circulating through the delay line. Compare circuitry is also included so that data entered serially on the keyboard may be compared with the data derived from the read station for the purpose of verifying a punched card.

The data recorder preferably includes a card transport with a hopper holding cards with their faces inclined at a small angle with respect to vertical and includes also means for transporting and incrementing these cards in the same disposition through the transport, whereby the cards may be punched, printed, and read in this disposition at punch, print, and read stations as they travel through the transport.

DESCRIPTION OF THE PREFERRED EMBODIMENT

Figures 1, 2:
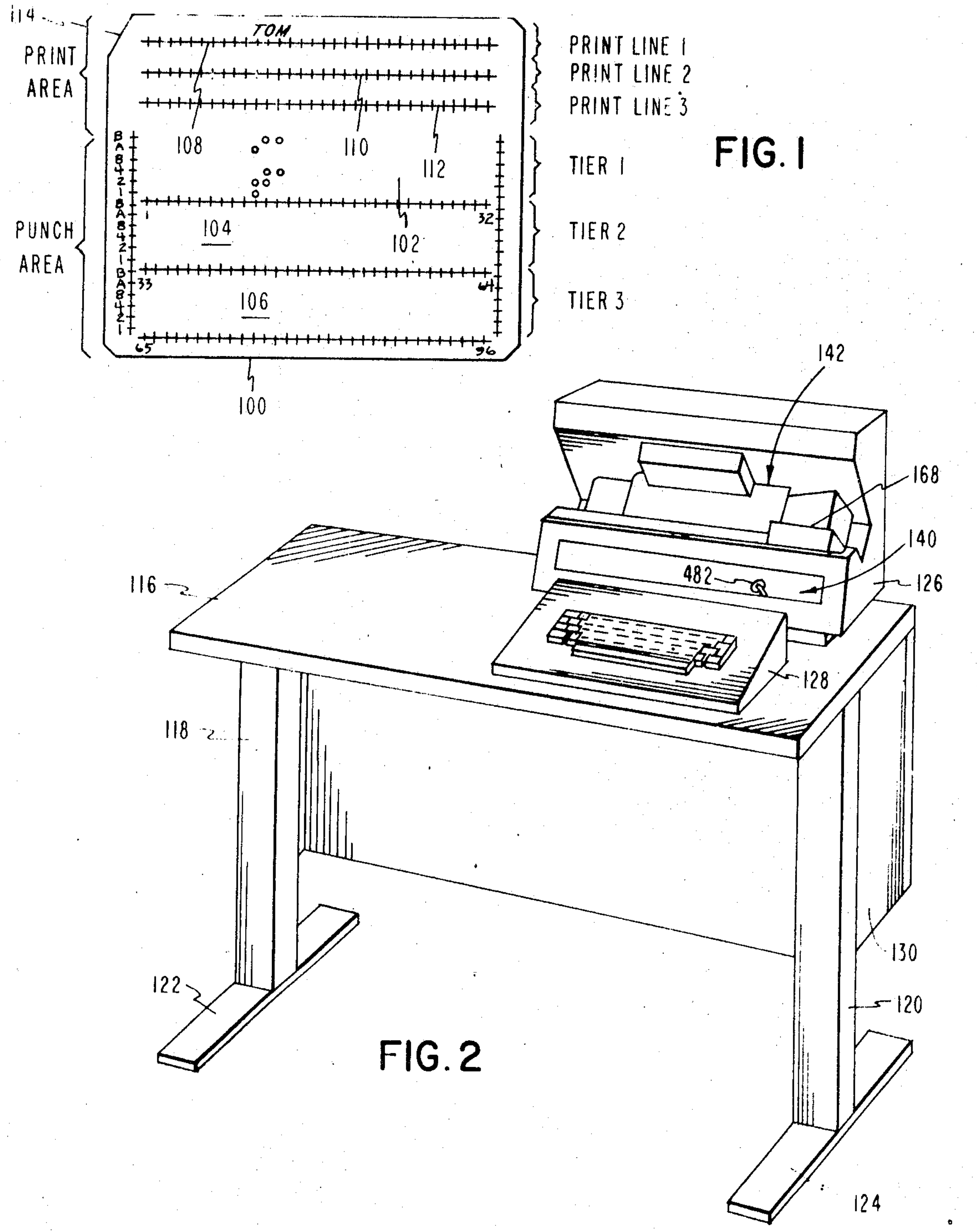
FIG. 1 is a plan view of the document card with which the data recorder of the invention may be used.
FIG. 2 is a perspective view of the data recorder.

Referring now to FIG. 1, the document card 100, with which the data recorder or keypunch is adapted to be used, may be seen to have in its lower region a punch area having three tiers 102, 104, and 106 in which holes may be punched. It will be noted that the first tier 102 contains 32 columns for receiving holes; the second tier 104 contains columns 33 to 64; and the third tier 106 contains columns 65 to 96. Each of the tiers 102, 104, and 106 has six horizontal rows 1, 2, 4, 8, A, and B; and, therefore, as many as six holes may be punched into each of the columns in each of the tiers 102, 104, and 106.

The upper part of the document card 100 constitutes a print area having three print lines 108, 110, and 112. It will be noted that print line 108 contains print positions 1 to 32, print line 110 contains print positions 33 to 64, and print line 112 contains print positions 65 to 96. The print positions in the various print lines correspond to the columns in each of the tiers 102, 104, and 106; and, in the particular card illustrated, the letters T–O–M in print positions 11, 12, and 13 correspond to the punched holes in columns 11, 12, and 13 in tier 1.

The card 100 may be quite small in comparison with prior conventional document cards and may, for example, have a length of about 3¼ inches and a width of 2⅝ inches. The upper left corner of the card is preferably docked to have a diagonally extending edge 114 for expeditiously stacking cards 100 to be in the same disposition with respect to each other in the stack.

The data recorder or keypunch is shown in FIG. 2 and may be seen to comprise a horizontal table top 116 fixed on a pair of upstanding legs 118 and 120. Oblong plates 122 and 124 are respectively attached to the legs 118 and 120 and are adapted to rest flat on a floor so as to maintain the structure upright.

The punching, reading, and printing assembly 126 of the data recorder is mounted coincident with the back edge and adjacent one side edge of the table top 116; and a keyboard 128 is mounted directly in front of and centered with respect to the assembly 126. A chest 130 extends downwardly from the table top 116 and is mounted on the rear sides of the legs 118 and 120 and provides room for the electronic components of the data recorder. The arrangement is such that the operator of the data recorder has substantial table space on which source documents may be placed; and for this purpose, the table top 116 may, for example, be of a length of 42 inches and a width of 24 inches, while the assembly 126 may have the horizontal dimensions of 11½ inches by 19 inches; and the keyboard 128 may have horizontal dimensions of 9¾ inches by 14½ inches.

Figure 3:
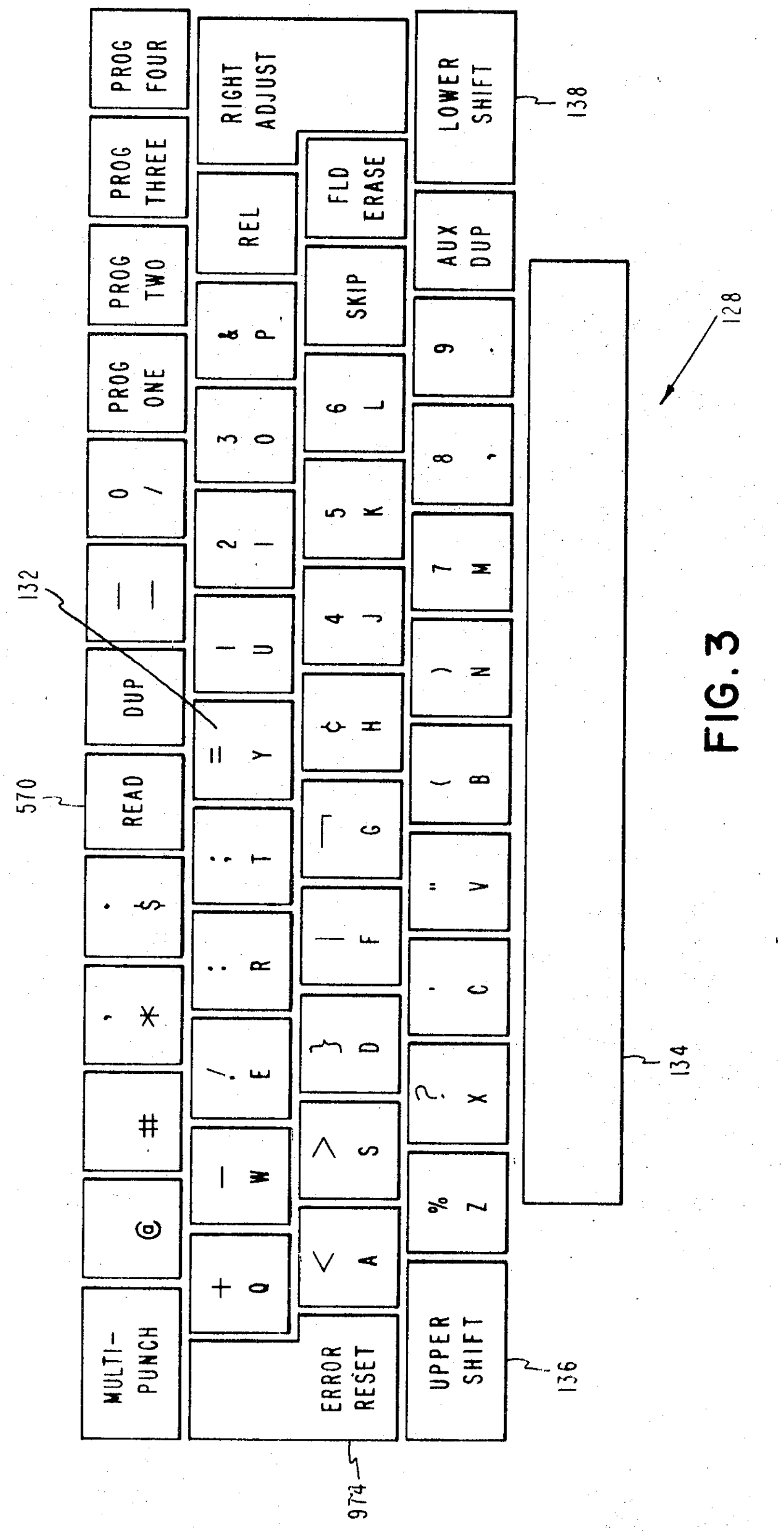
FIG. 3 is a plan view of the keyboard of the data recorder.

Referring now to FIG. 3, the keyboard may be seen to comprise a plurality of data keys 132, a space key 134, an upper shift key 136, and a lower shift key 138. The assembly 126 also includes a plurality of switches 140 (see FIG. 2) disposed in front of and above the keyboard 128.

The assembly 126 includes a card transport 142 for the cards 100 (see FIGS. 5 to 12). The transport comprises, in general, a hopper 144, a pick roll 146, a transport roll 148, a card sensor 150, a punch 152, a first incrementer wheel 154, a gate 156, a read station 158, a verify notcher 160, a printer 162, a second incrementer wheel 164, and a stacker 166.

The hopper comprises a front plate 168 on which a stack of the cards 100 rests; and the plate 168, as will be observed from FIG. 2, extends downwardly at approximately an angle of 35° with respect to horizontal. The cards 100 are adapted to be discharged from the hopper 144 onto a deck 170. The hopper comprises also a bed plate 172 for supporting the stack of cards 100, and it will be observed from FIG. 6 that the bed plate 172 extends at an angle of about 15° with respect to the deck 170 so that the cards 100 discharge downwardly from the top of the stack onto the deck 170. The bed plate 172 is supported by suitable guide mechanism 174 for upward movement as the stack of cards decreases in height, and a spring 176 is provided for forcing the plate 172 upwardly.

Figure 7:
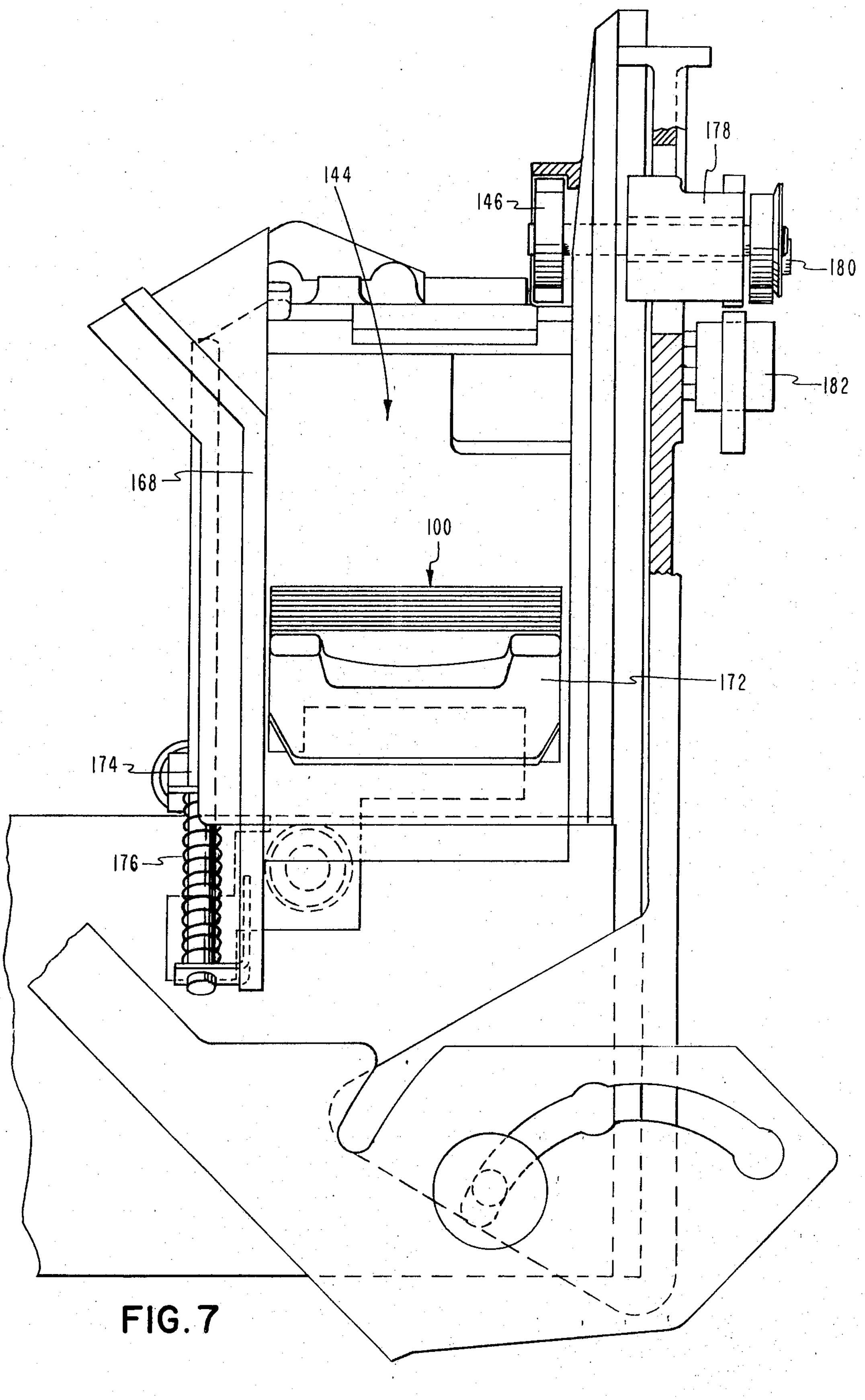
FIG. 7 is an end view of the document card hopper included in the card transport as shown in FIGS. 5 and 6.
Figures 8, 9:
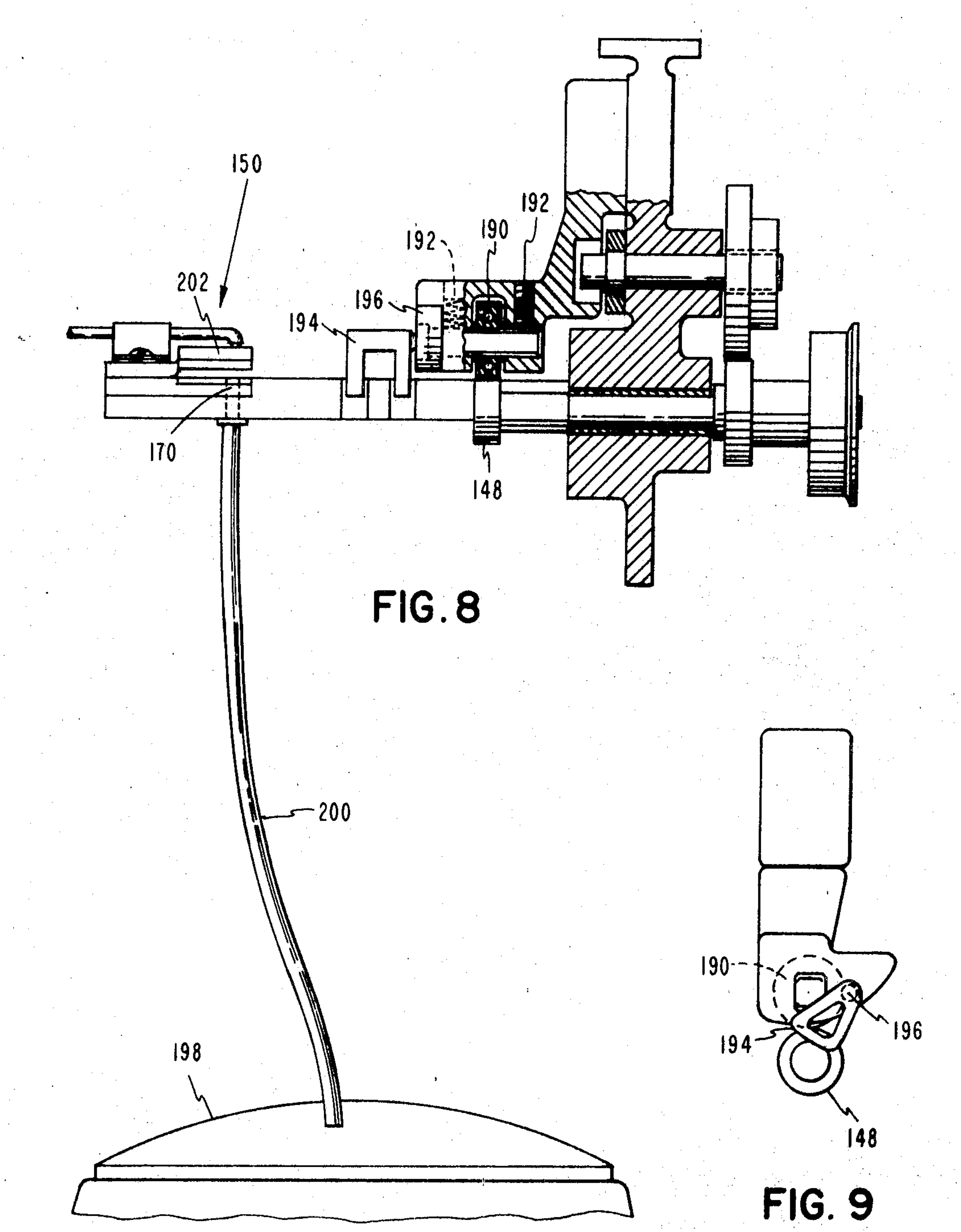
FIG. 8 is a sectional view taken on line 8—8 of FIG. 5.
FIG. 9 is a side elevational view of a cam effective on the trailing edge of a document card passing through the transport.
Figure 10:
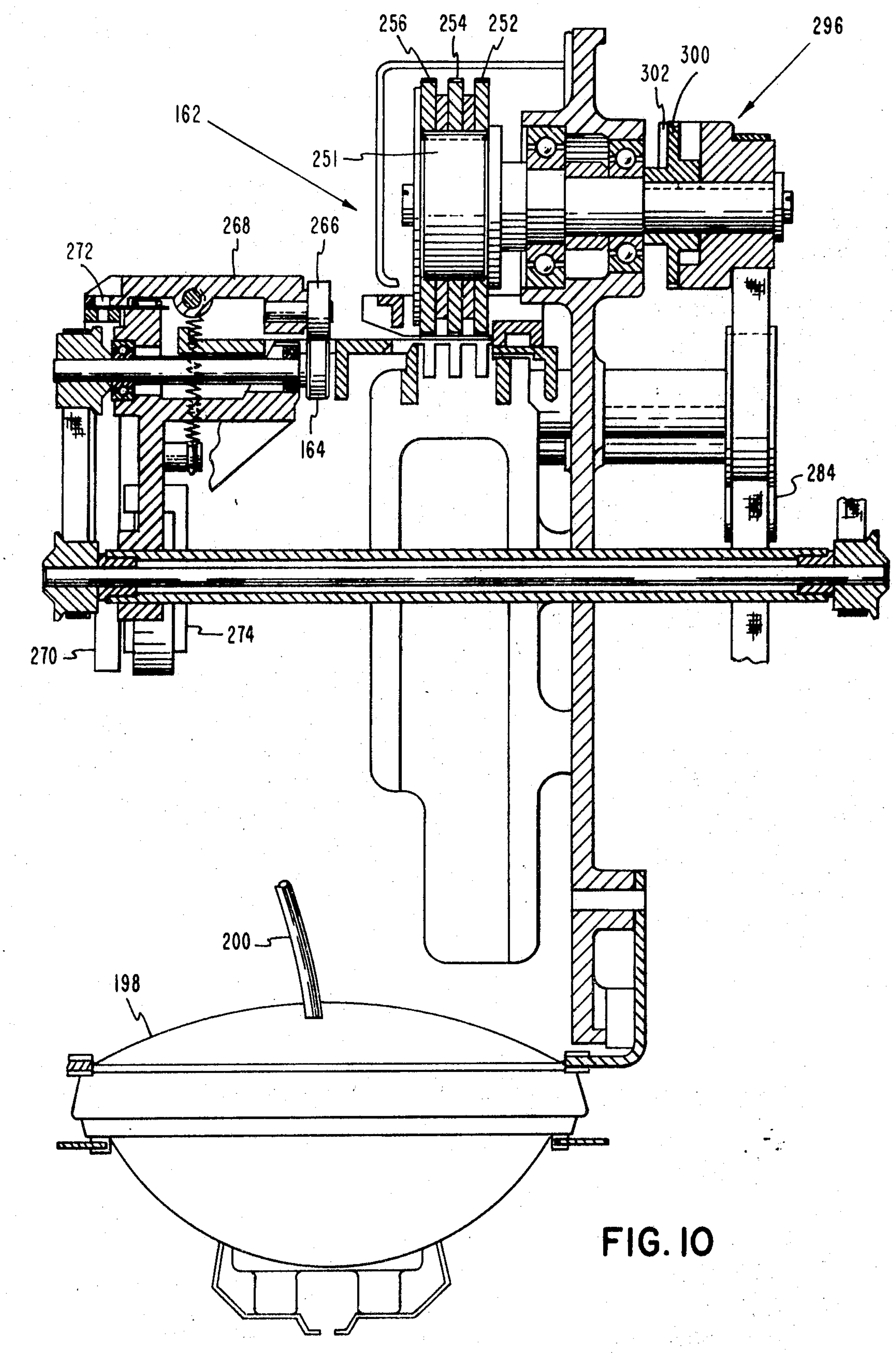
FIG. 10 is a sectional view taken on line 10—10 of FIG. 5.
Figures 11, 12:
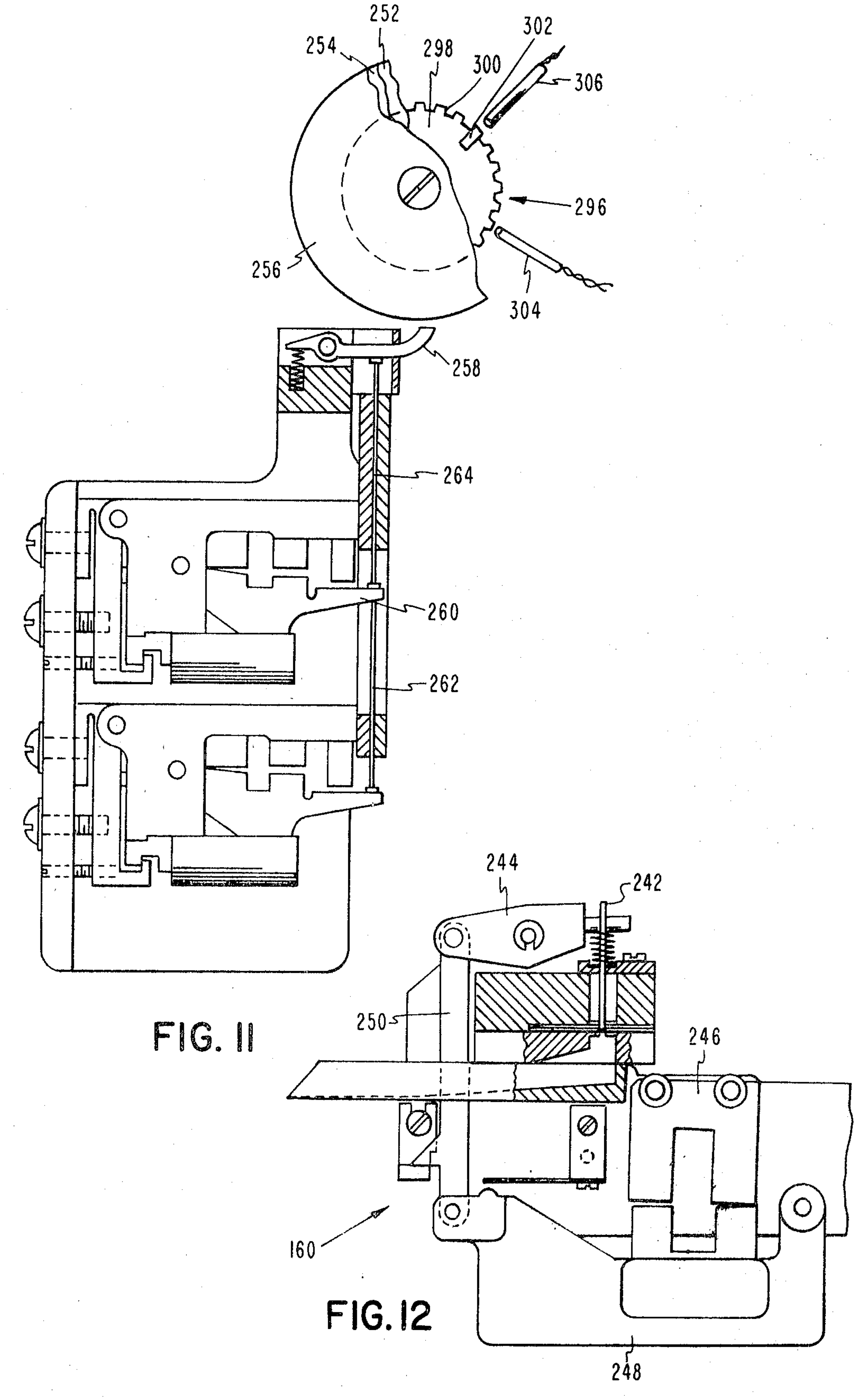
FIG. 11 is a sectional view of printing mechanism including an electrical print emitter constituting a part of the data recorder.
FIG. 12 is a sectional view taken on line 12—12 of FIG. 5.

The pick roll 146 is rotatably mounted above the stack of cards 100 supported by the bed plate 172 and is carried by a lever 178 pivoted about a point 180 (see FIG. 7). A magnet 182 is provided for acting on the lever 178 in order to move the pick roll 146 downwardly into contact with the top card 100 of the stack. The pick roll 146 is driven at a constant speed by any suitable driving mechanism.

A throat 184 (see FIG. 6) is provided for assuring that only a single card 100 is moved at a time by the pick roll 146 off the stack of cards 100. The throat 184 comprises an upper throat blade 186 and a lower throat blade 188 which are positioned closely together with a separation exceeding only slightly the thickness of a card 100.

The transport roll 148 is positioned below an idler roll 190 supported by springs 192 (see FIG. 8) so as to grip a card 100 between them. The roll 148 is continuously driven by any suitable drive mechanism.

A cam 194 (see FIGS. 5 and 9) is mounted adjacent the rolls 148 and 190 and is pivoted at 196 so as to fall behind a card 100 as it is fed onto the deck 170.

The card sensor 150 (see FIG. 8) comprises an electric lamp 198 and a plurality of card sensor fibers 200 terminating at an opening through the deck 170. A phototransistor 202 is located above the ends of the fibers 200.

The gate 156 (see FIGS. 5 and 6) comprises an electromagnetically energized pole piece 204 mounted by means of a flexure element 206 over the deck 170 and adapted to engage the deck for forming a stop for card movement.

The punch 152 comprises a punch die 208 and 18 punches 210 which are reciprocable and enter into openings in the die 208. An interposer spring 212 is provided for each of the punches 210, and the interposer springs 212 are constantly reciprocated vertically by means of an eccentric drive mechanism 214 carrying a punch bail 216 which in turn carries the springs 212. Each of the springs 212 is moved into abutting relationship with respect to a punch 210 by means of a lever 218, and each of the levers 218 is actuated by means of a magnet 220 having its armature 222 connected by a connecting rod 224 with the lever 218.

The incrementer wheel 154 is driven in increments of partial revolutions by any suitable drive mechanism so as to propel a card 100 a distance equal to one column (as, for example, from column 10 to column 11). An upper roll 226 (see FIG. 5) is positioned above the wheel 154 and is rotatably mounted on a lever 228 pivoted by means of a pivot flexure 230. A magnet 232 is provided for moving the lever 228 vertically.

The read station 158 comprises 18 phototransistors 234 mounted in a row on a circuit card 236 positioned in an upper read station 238. The station 238 is positioned over a lower read station 240 which, in turn, is positioned directly over the lamp 198.

The notcher 160 (see FIGS. 5 and 12) comprises a punch 242 actuated by means of a lever 244. A magnet 246 has its armature 248 connected with the lever 244 by means of a connecting rod 250 for this purpose.

The printer 162 (see FIGS. 5, 10, and 11) comprises a print wheel 251 containing three rows of print characters 252, 254, and 256 and rotatably driven at a constant speed by any suitable drive mechanism. A print hammer 258 is pivotally mounted below each of the print rows 252, 254, and 256; and a magnet 260 is provided for actuating each of the print hammers. The magnets 260 are disposed in upper and lower tiers and are connected to actuate the print hammers through long and short connecting rods 262 and 264.

The second incrementer wheel 164 (see FIG. 10) is driven in increments similarly to the first incrementer wheel 154 and has an upper pressure roll 266 mounted above it on a lever 268. The lever 268 has a downwardly extending extension 270 and is movable by virtue of a flexure 272. A magnet 274 is effective on the extension 270 for the purpose of pivotally moving the lever 268 and roll 266.

The stacker 166 (see FIG. 6) comprises a support plate portion 276 and a tray back 278 adapted to move toward and away from the plate portion 276 for receiving cards therebetween. A spring 280 is effective on the back 278 tending to hold it in a position adjacent the plate portion 276. A stacker shoe 282 is positioned adjacent a constantly rotating stacker wheel 284 for the purpose of guiding cards between the plate portion 276 and the tray back 278.

A punch emitter 286 (see FIG. 6) is provided in connection with the eccentric drive mechanism 214 and comprises a disk 288 driven in connection with the eccentric drive mechanism 214 and having metallic inserts 290 in its periphery. A pair of magnetic pickups 292 and 294 are provided adjacent the periphery of the disk 288 so that an electric pulse is provided in the pickups 292 and 294 as the inserts 290 pass them.

A print emitter 296 (see FIG. 11) is provided in connection with the printer 162. The print emitter comprises a wheel 298 driven along with the print wheel 251. The wheel 298 has 64 teeth 300 in it corresponding to the 63 characters and a space provided on each of the print rows 252, 254, and 256; and one of the teeth 302 is elongated axially of the wheel 298. A pair of emitter pickups 304 and 306 are provided adjacent the periphery of the wheel 298, and one of the emitters 304 is in such position that all 64 teeth are effective on it while the other emitter 306 is positioned so that only the elongated tooth 302 has an effect on the latter emitter.

Figure 13A:
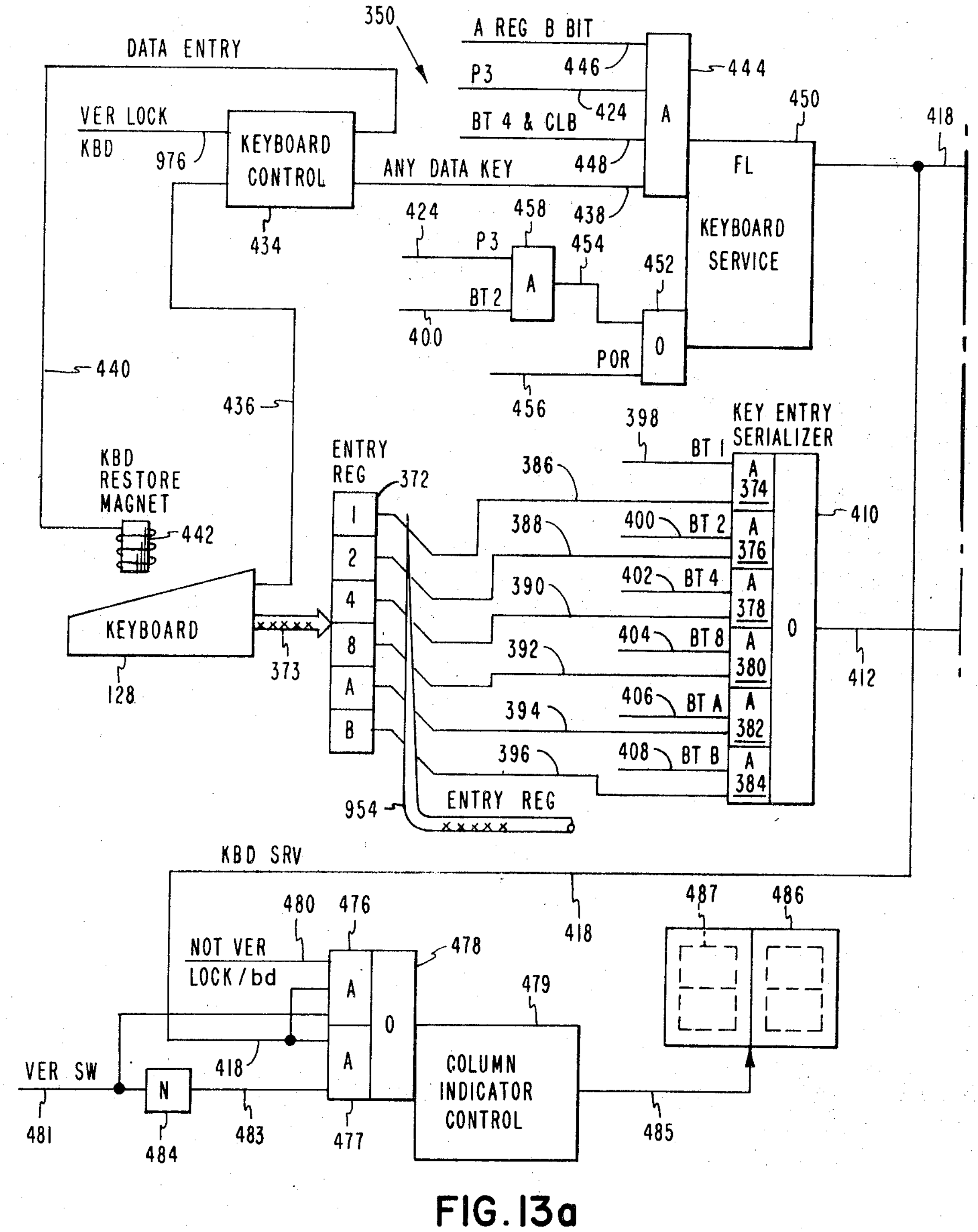
FIG. 13 is a diagram showing the manner in which FIGS. 13*a*, 13*b*, 13*c*, 13*d*, 13*e*, 13*f*, 13*g*, and 13*h* shall be placed together to form a complete FIG. 13 and to show diagrammatically the data entry section of the electrical control circuitry for the data recorder, the memory and control section of the circuitry, the verify section of the circuitry, and the read section of the circuitry—the data entry circuitry being shown particularly in FIGS. 13*a*, 13*b*, and 13*c*; the memory and control circuitry being shown particularly in FIGS. 13*c* and 13*d*; the card feed control circuitry being shown in FIG. 13*d*; the verify circuitry being shown in FIG. 13*e*; and the read circuitry being shown in FIGS. 13*f*, 13*g*, and 13*h*.
Figure 13:
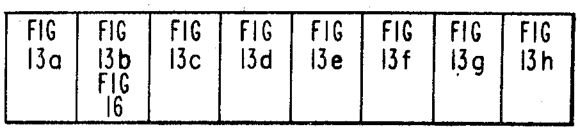
Figure 13B:
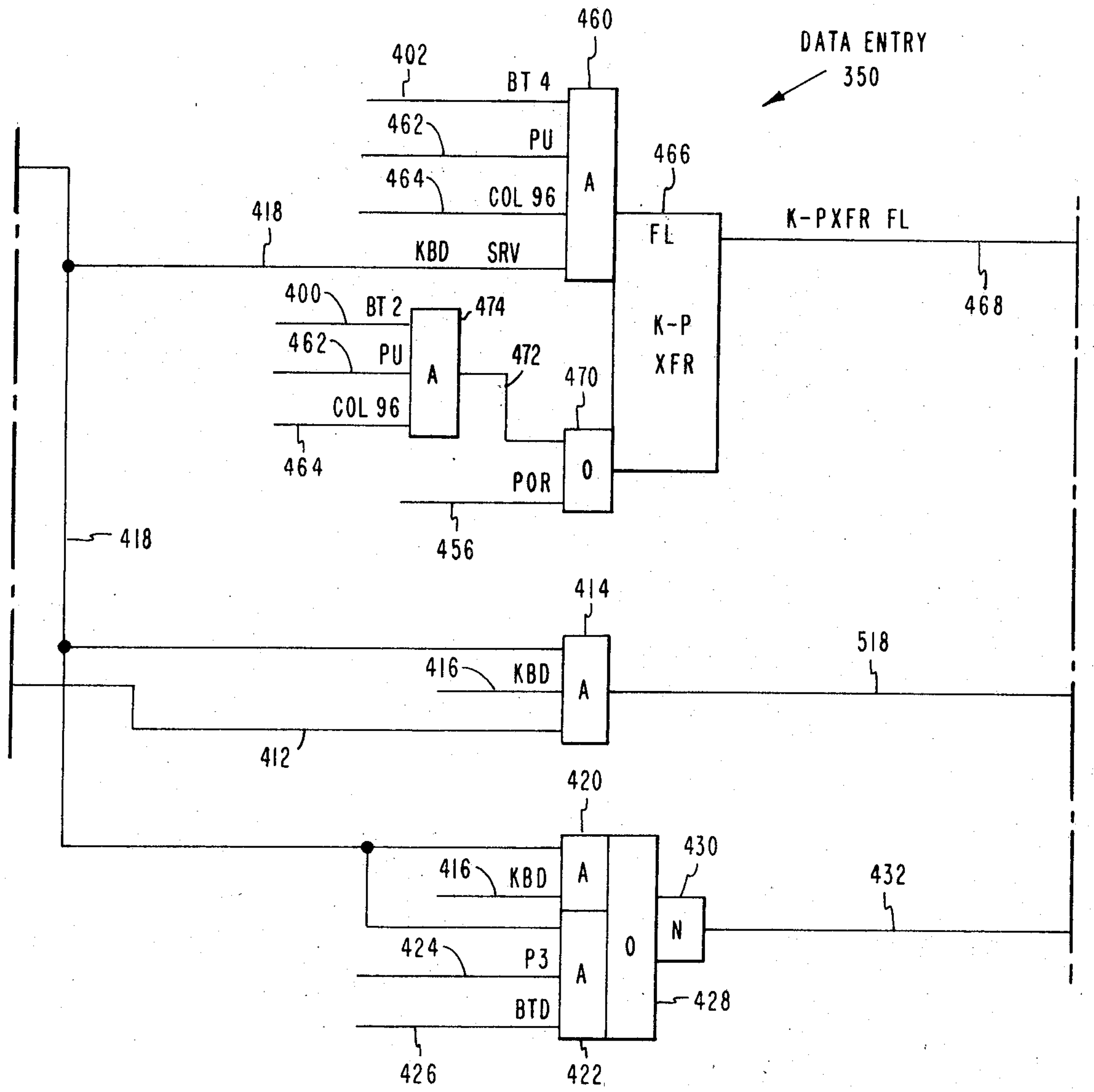
Figure 14D:
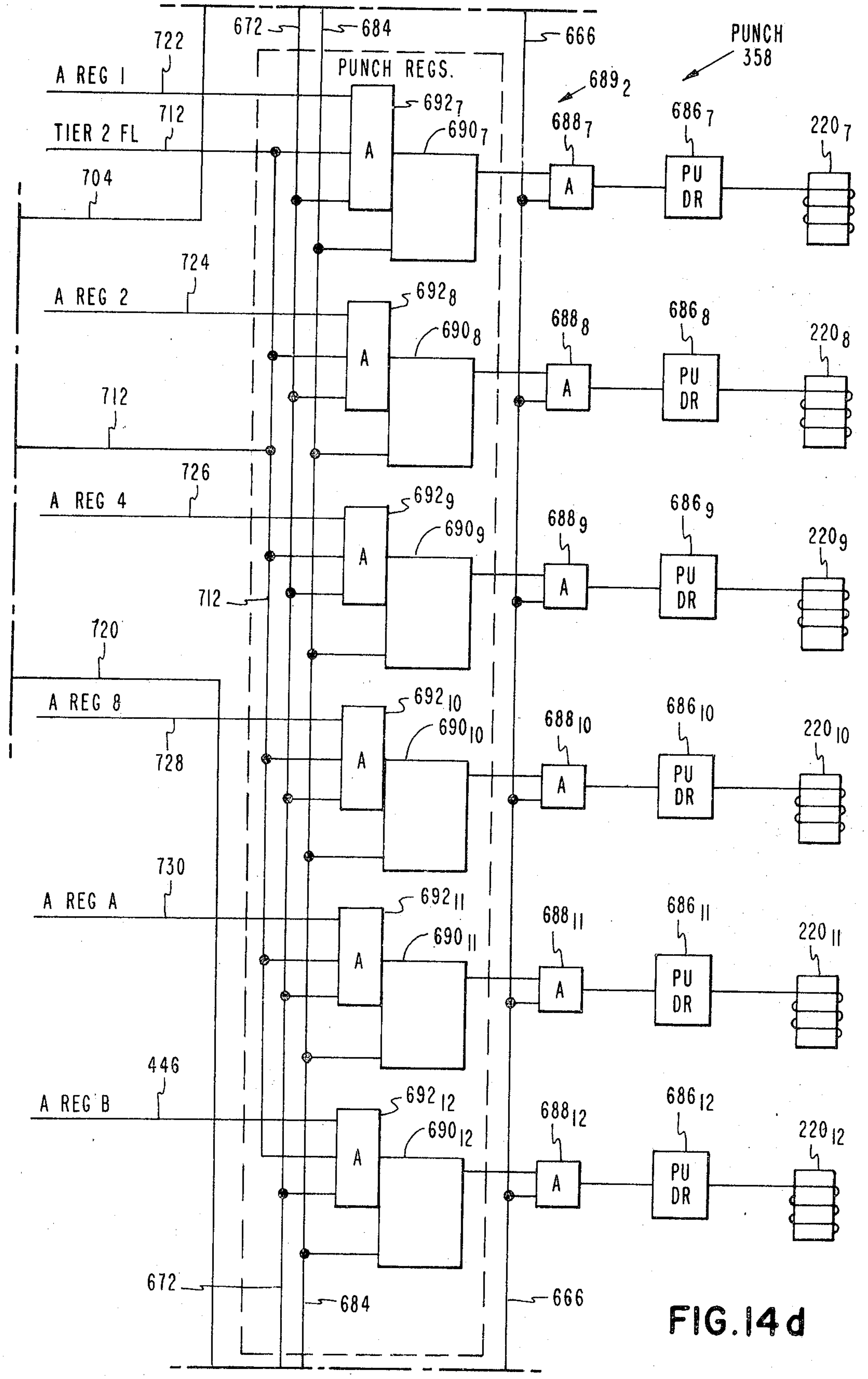
Figure 14E:
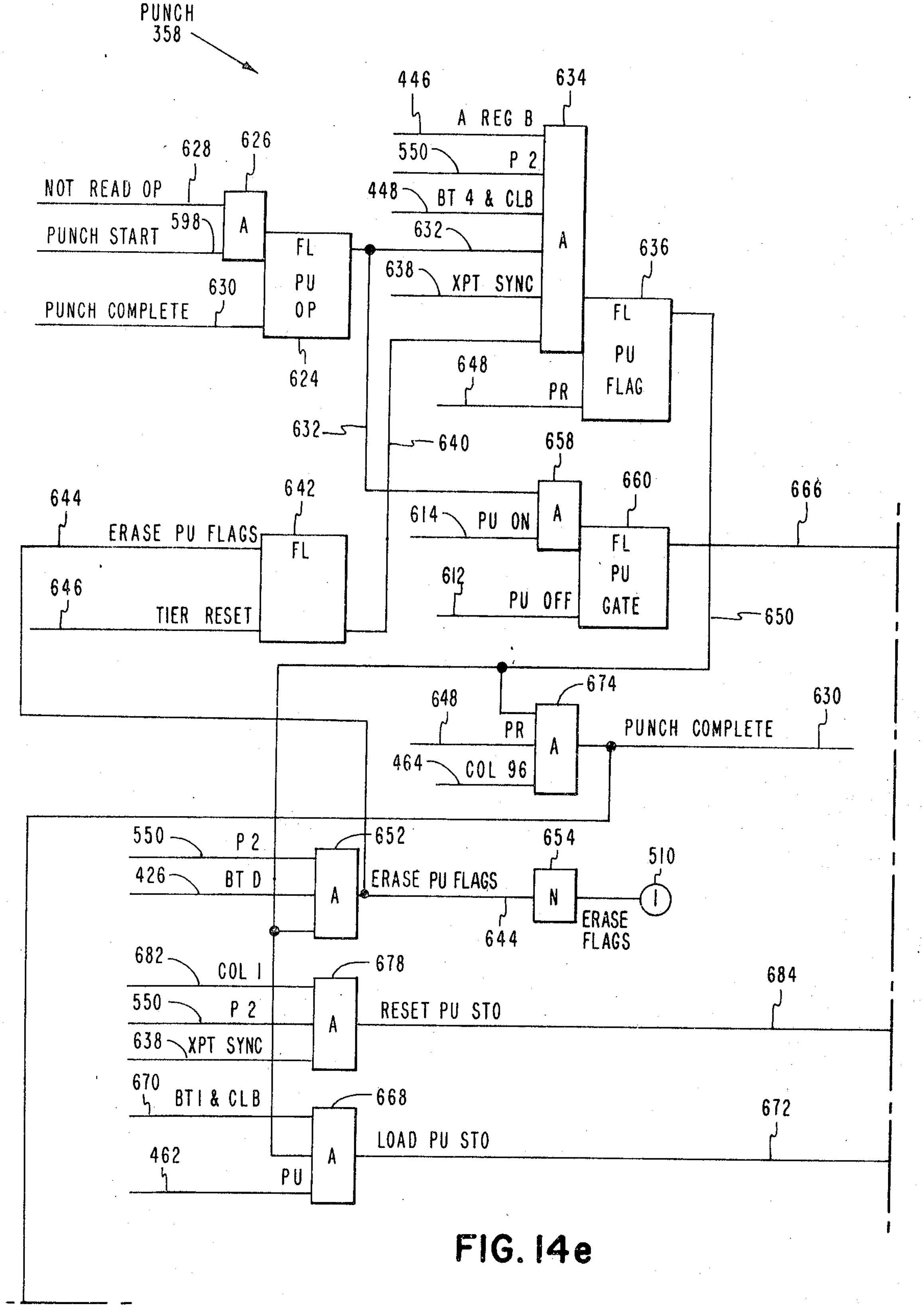
Figure 14F:
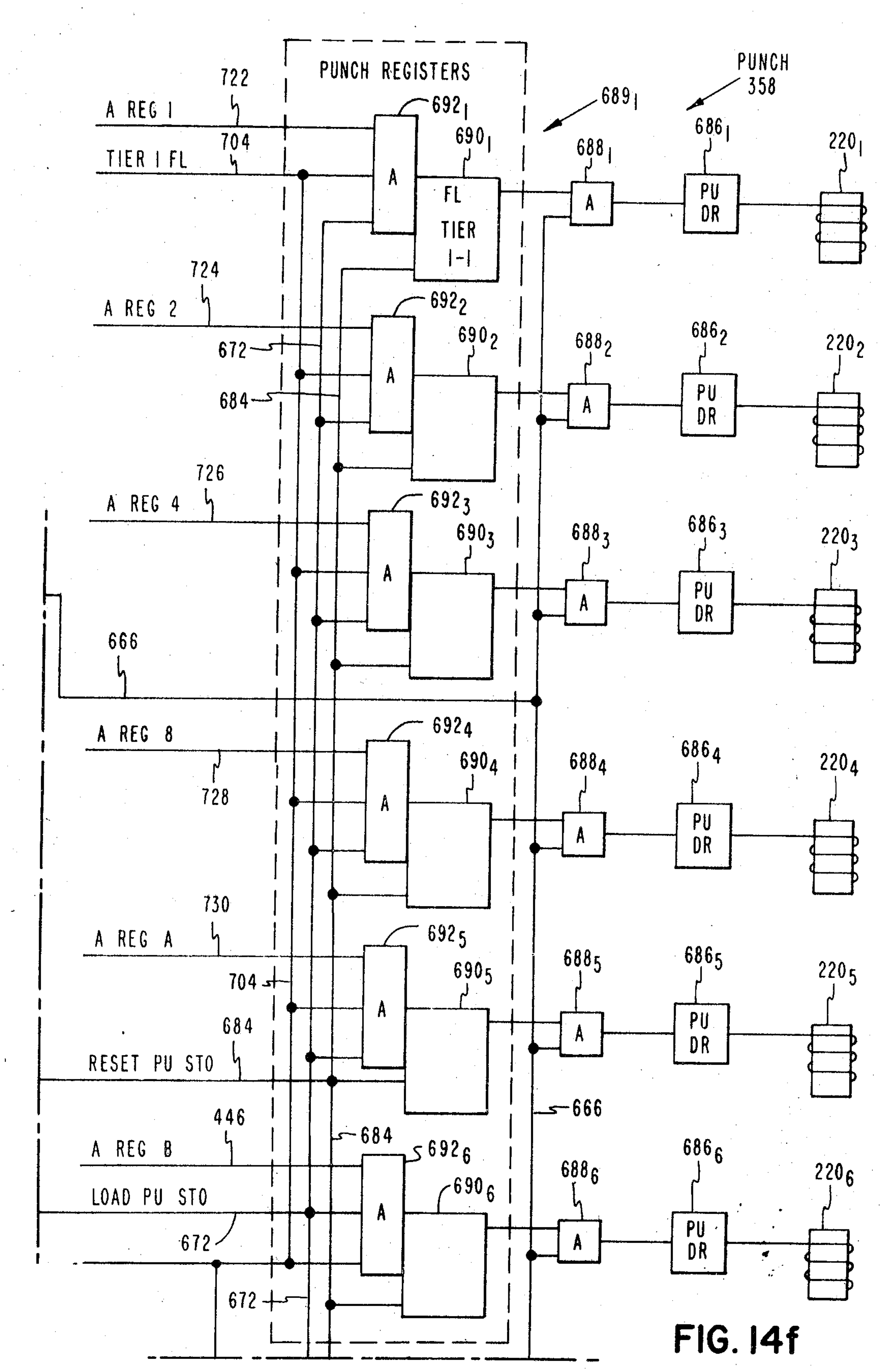
Figure 14G:
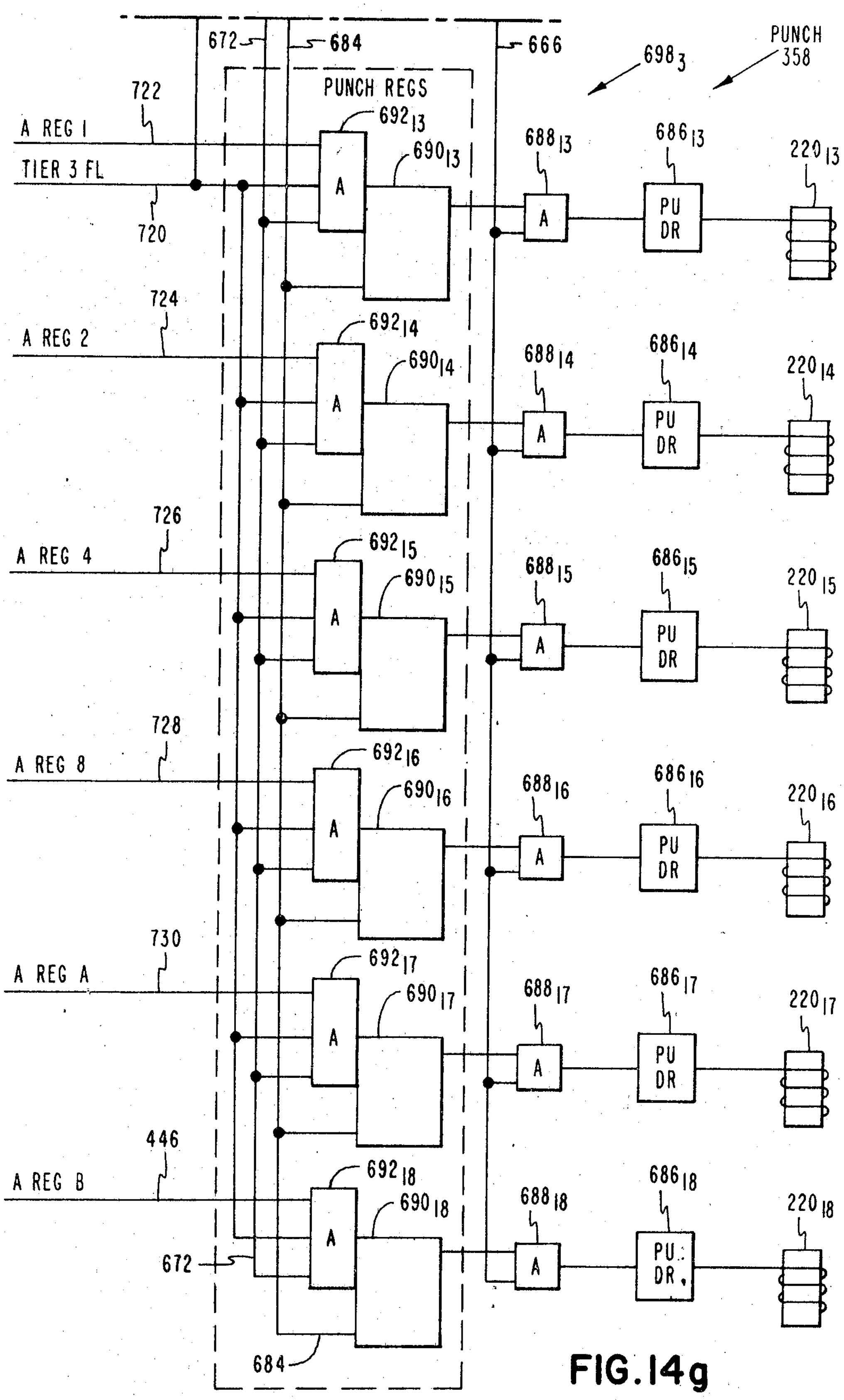
Figures 14, 14H:
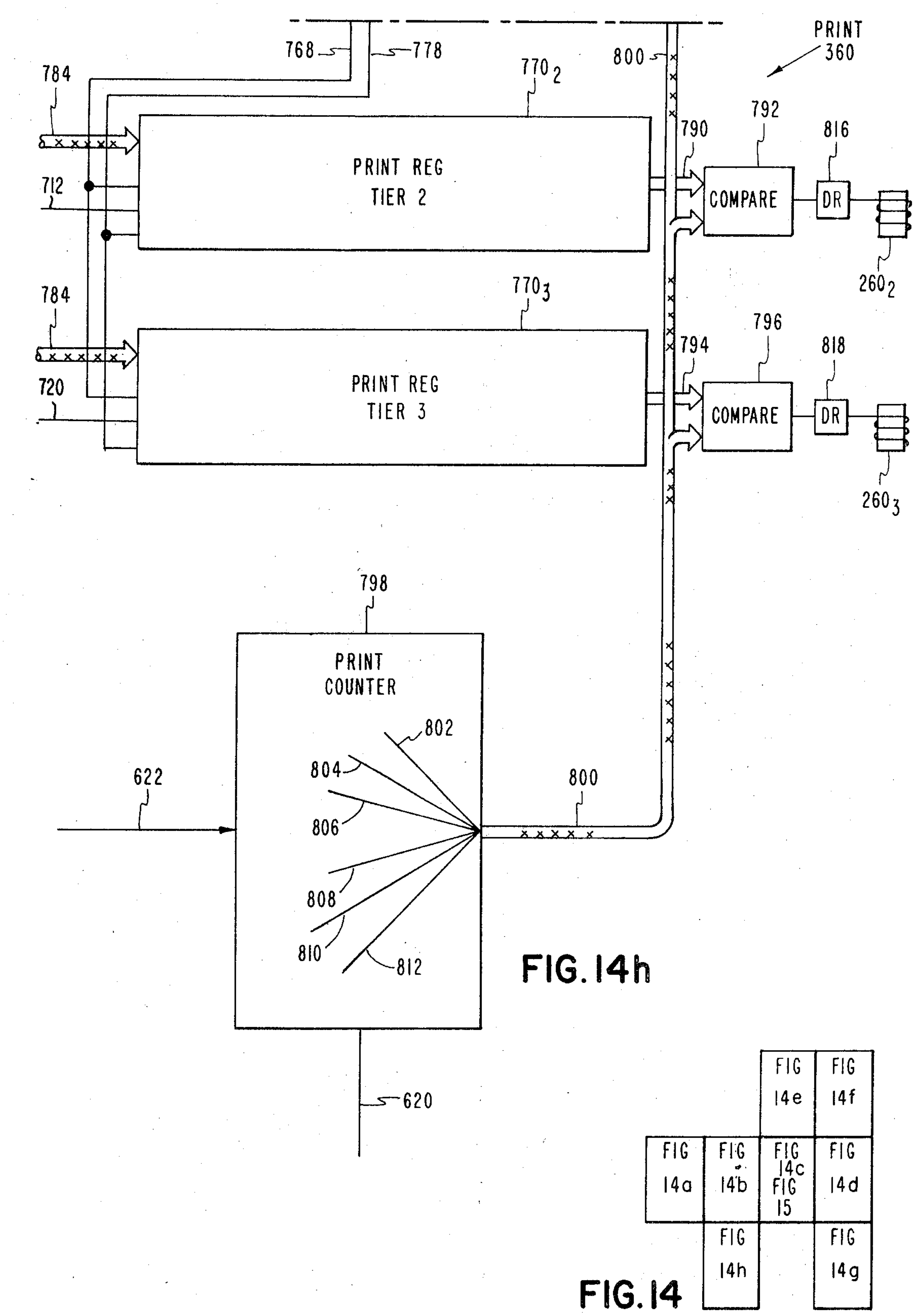

Referring now to FIGS. 13 and 14, the control system for the machine may be seen to comprise, in general, a data entry section 350, a memory and control section 352, a card feed control section 354, a card transport section 356, a punch section 358, a print section 360, a read section 362, and a verify section 364.

The memory and control section 352 includes a magnetostrictive delay line 366 which is adapted to have data bits passing through it from one end to the other and includes also an A register 368 also having these data bits passing through it from one end to the other. The A register 368 is a shift register made up of a series of triggers, and various signals are derived from this register. Therefore, the preferred constitution of the data bits passing through the delay line 366 and A register 368 will now be described.

Figure 4:
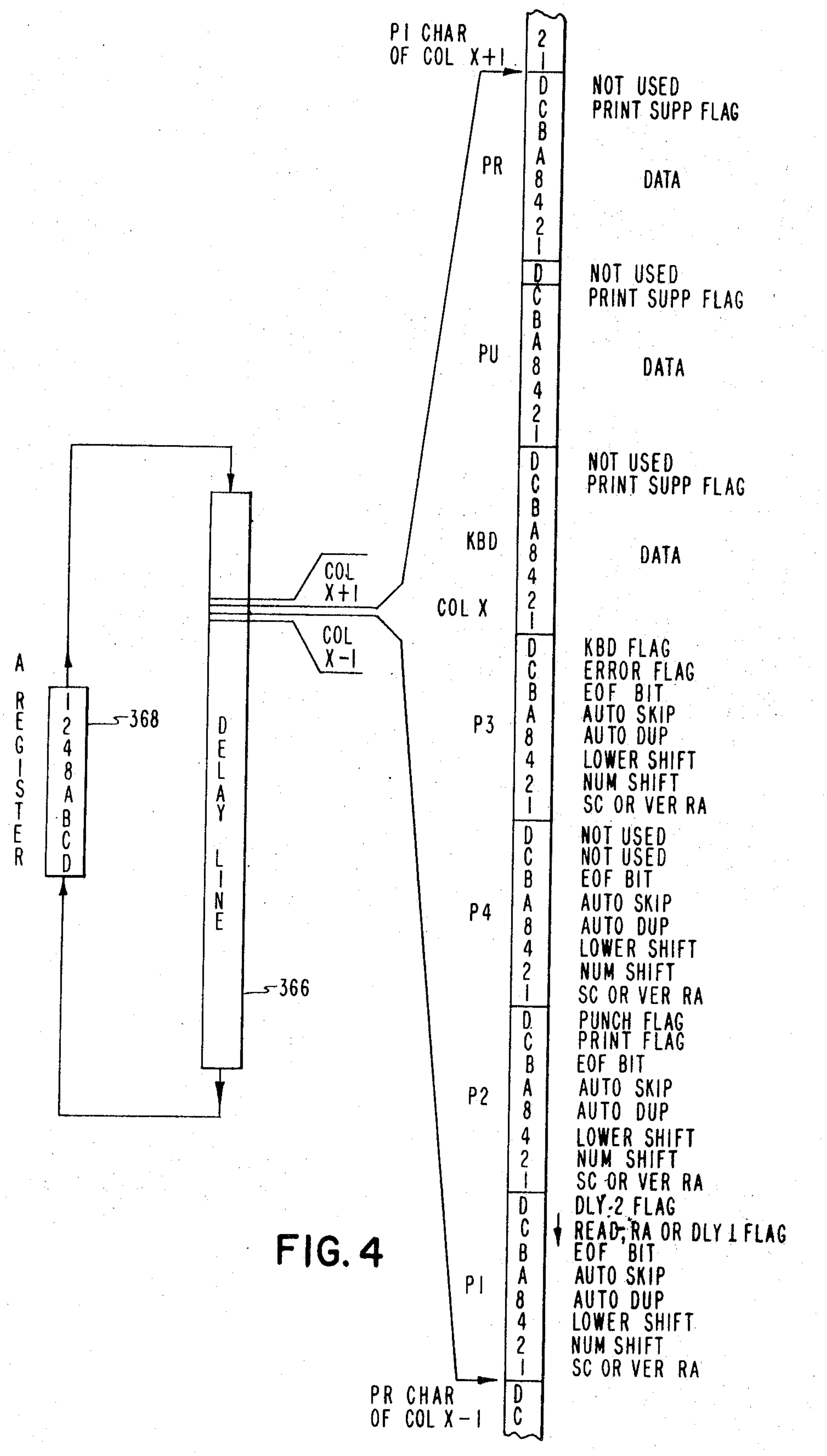
FIG. 4 is a diagrammatic illustration showing the relationship of the bits, characters, and columns of data circulating in a memory and control section of the electrical controls for the data recorder.

The data passing through the delay line 366 and the A register 368 may, for example, be in the form shown in FIG. 4 and may consist of 96 columns each of which has P1, P2, P4, P3, KBD, PU, and PR characters. Each of these characters, in turn, may be made up of bits 1, 2, 4, 8, A, B, C, and D. Each of the characters may, for example, have a duration of 8 microseconds; and, therefore, each of the bits may have a duration of 1 microsecond, as the bits and characters pass any one point in either the delay line 366 or in the A register 368.

Figure 16:
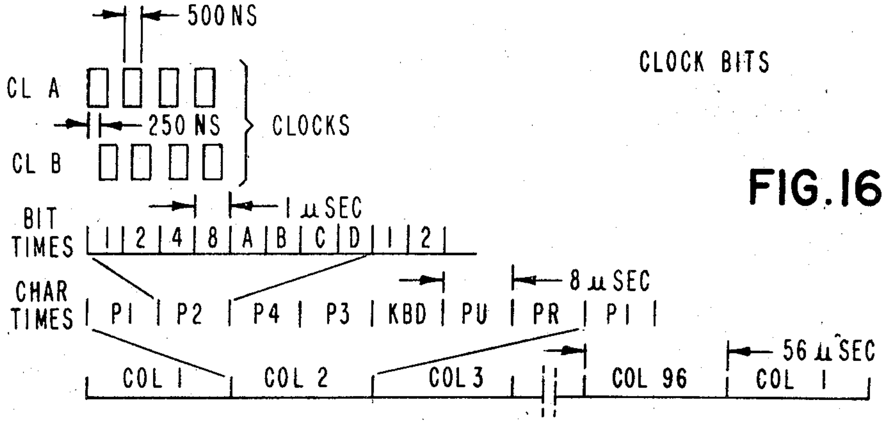
FIG. 16 is a diagram showing the relationship of the clock times, bit times, character times, and column times constituting the output of the clock.
Figure 13C:
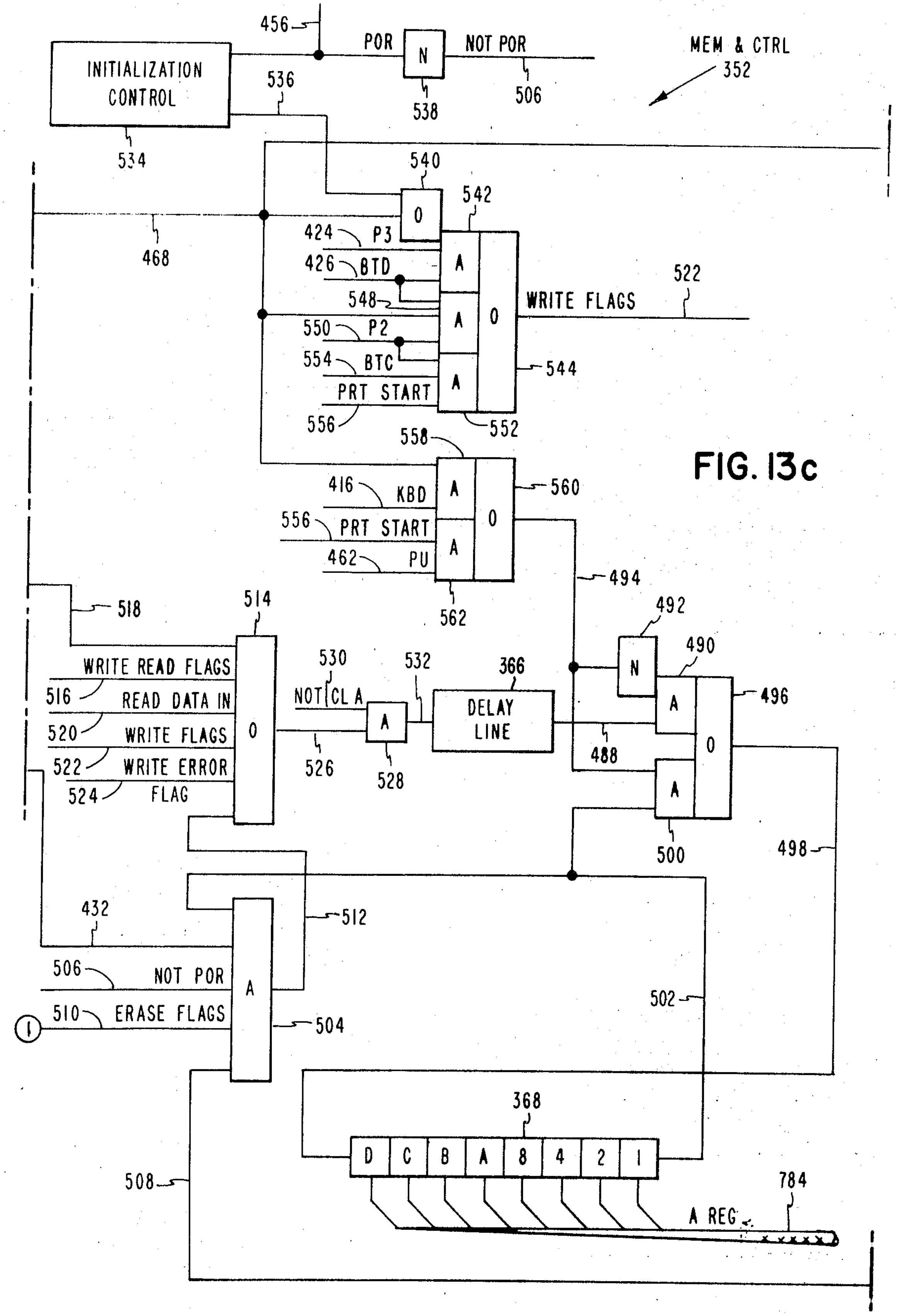
Figure 13D:
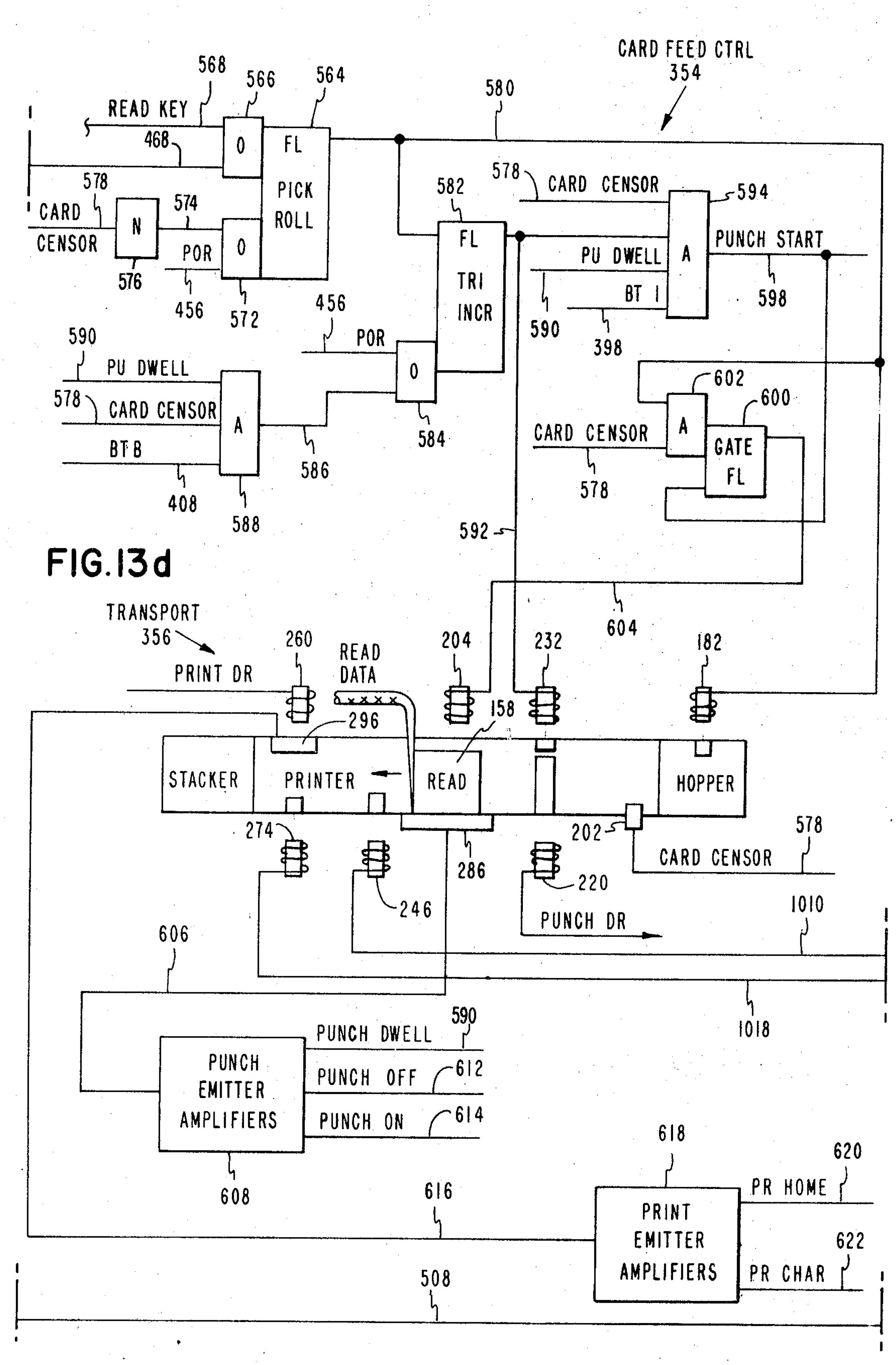
Figure 13E:
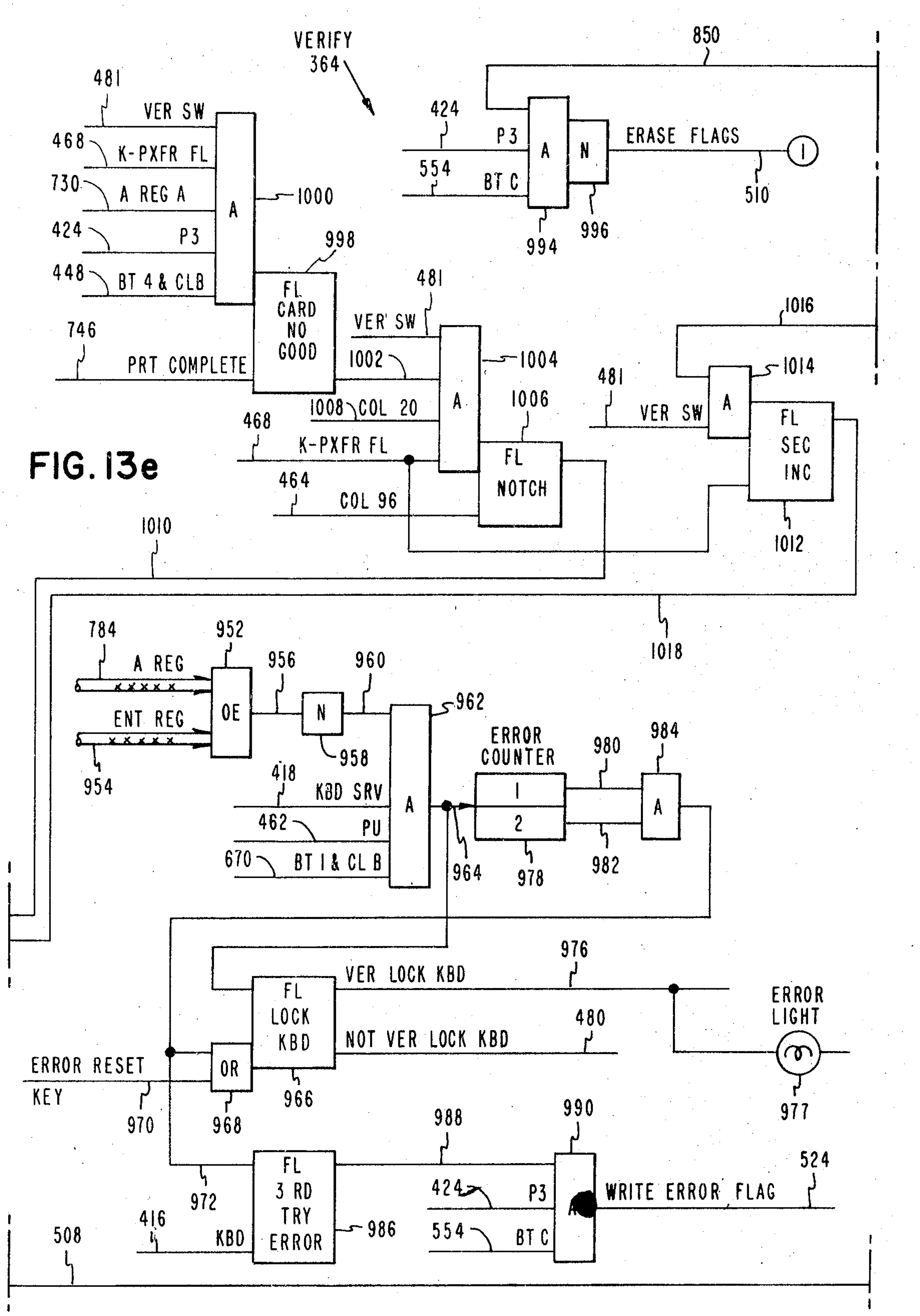
Figure 13F:
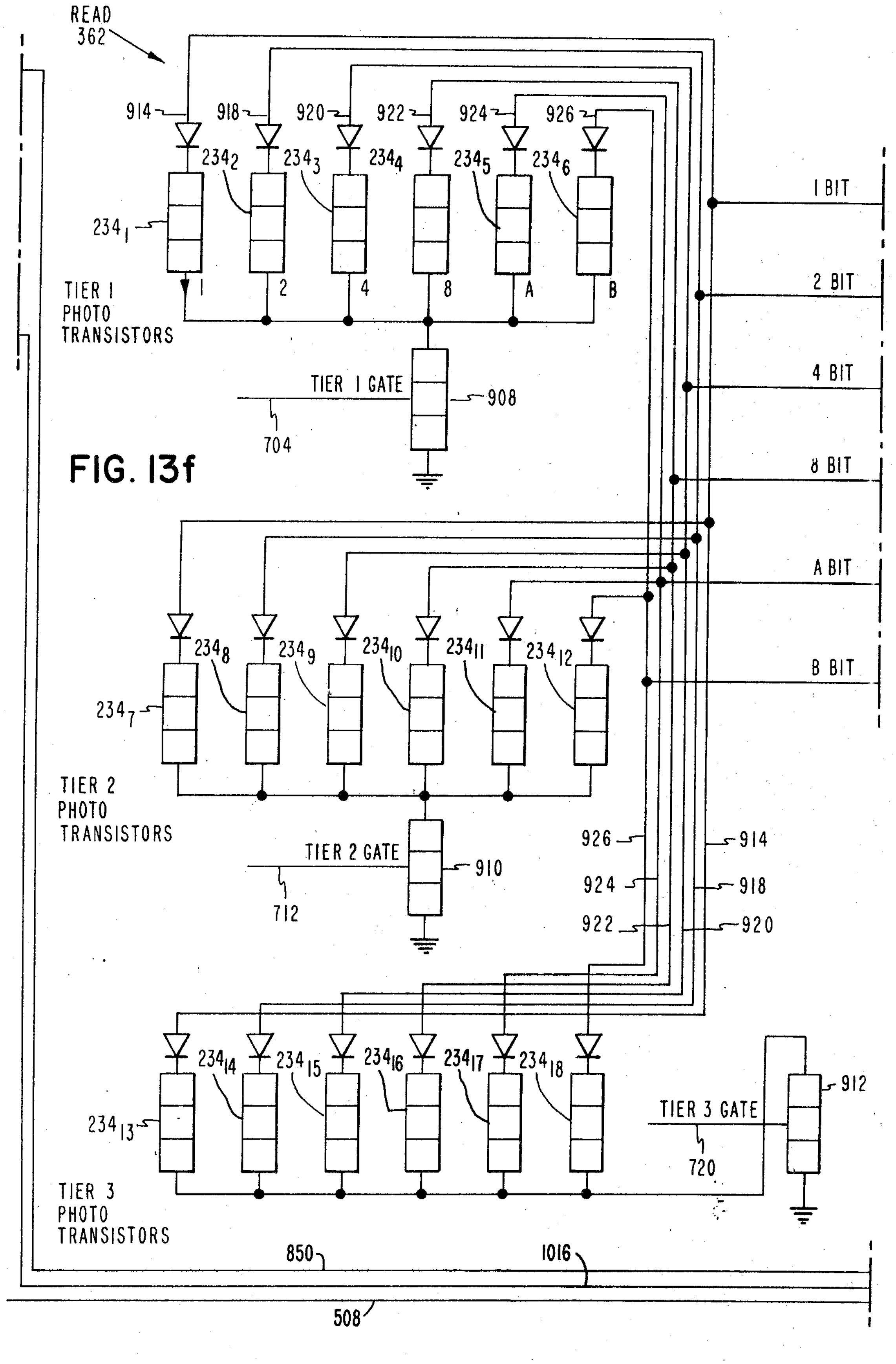
Figure 13G:
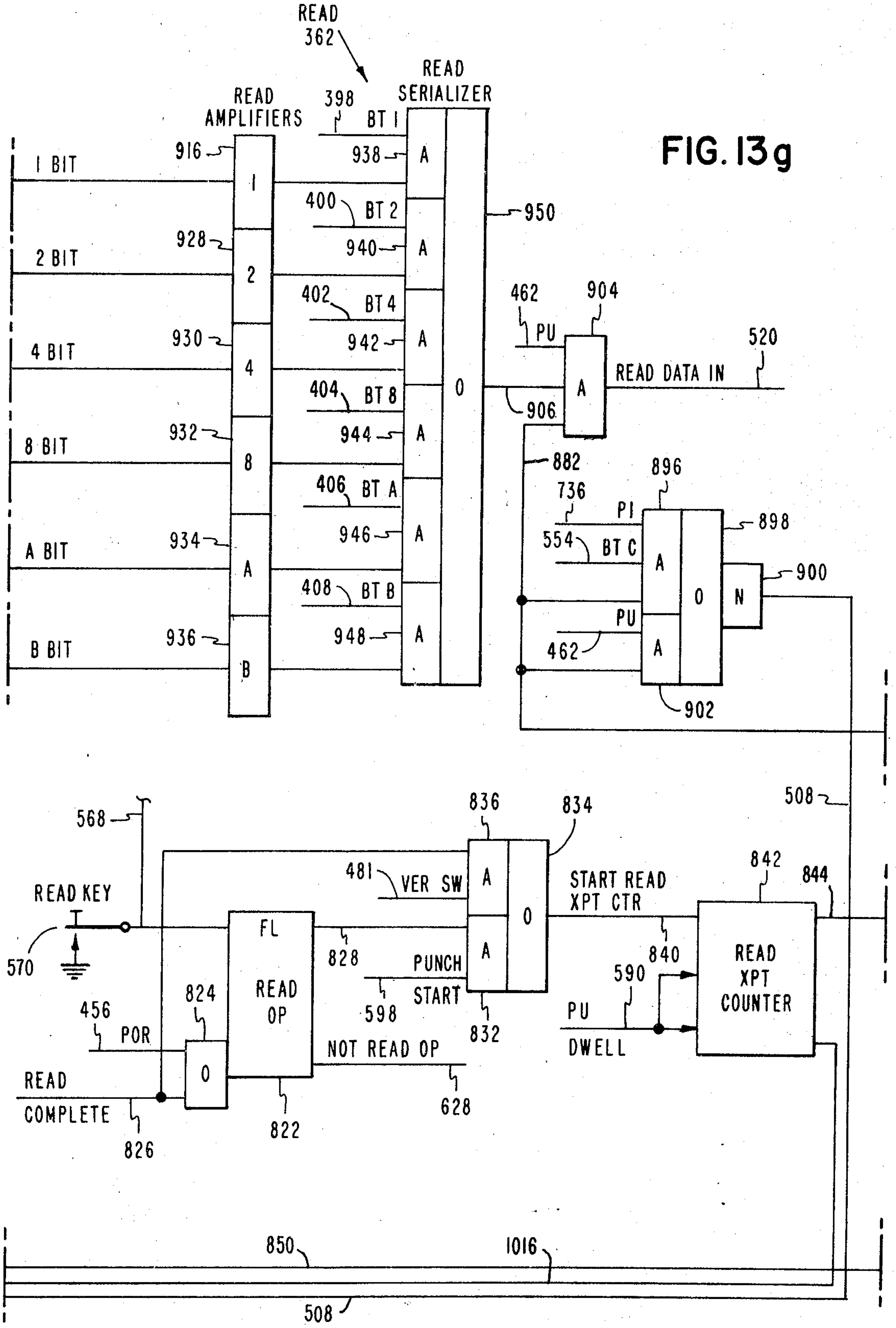
Figure 13H:
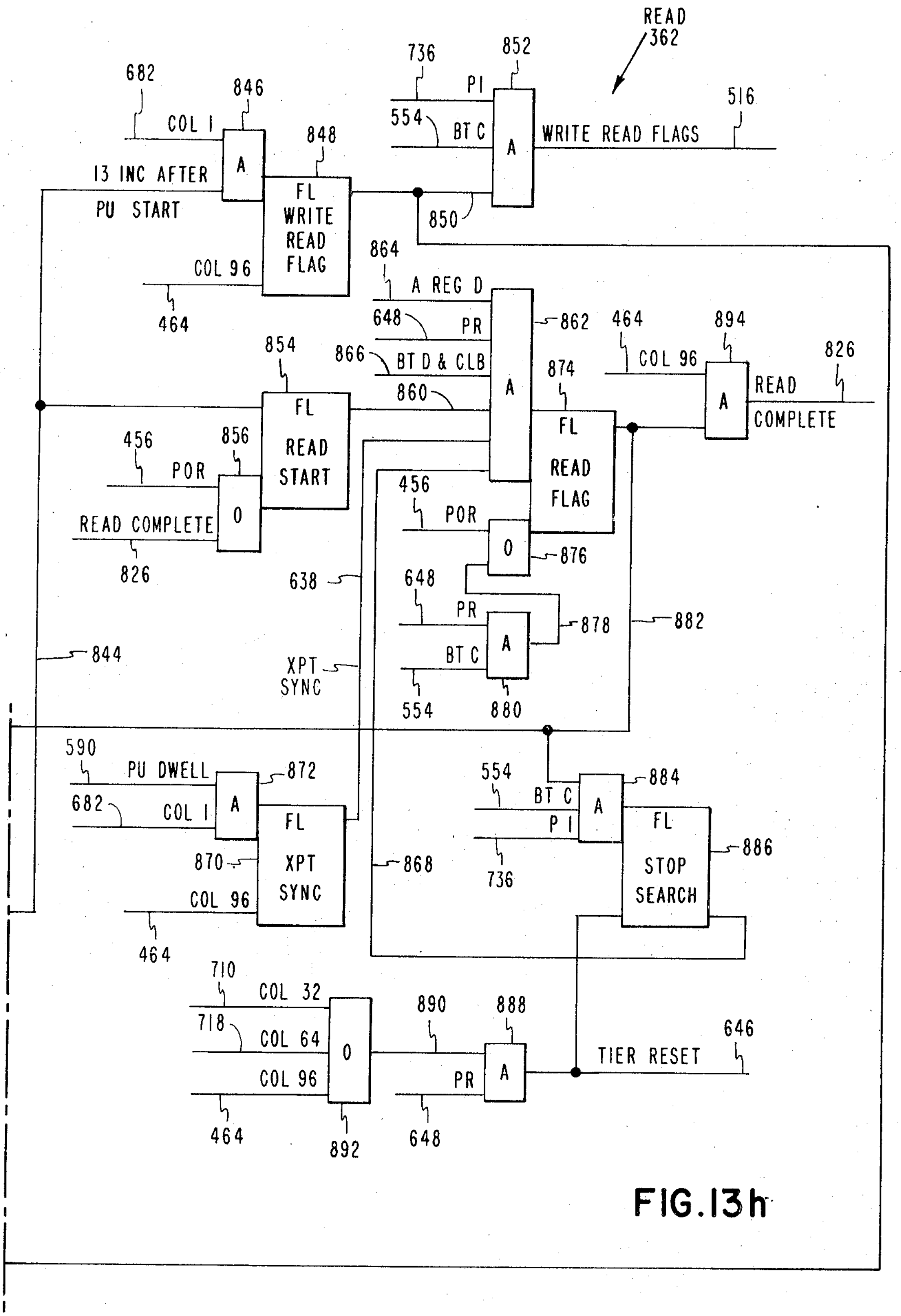
Figure 14A:
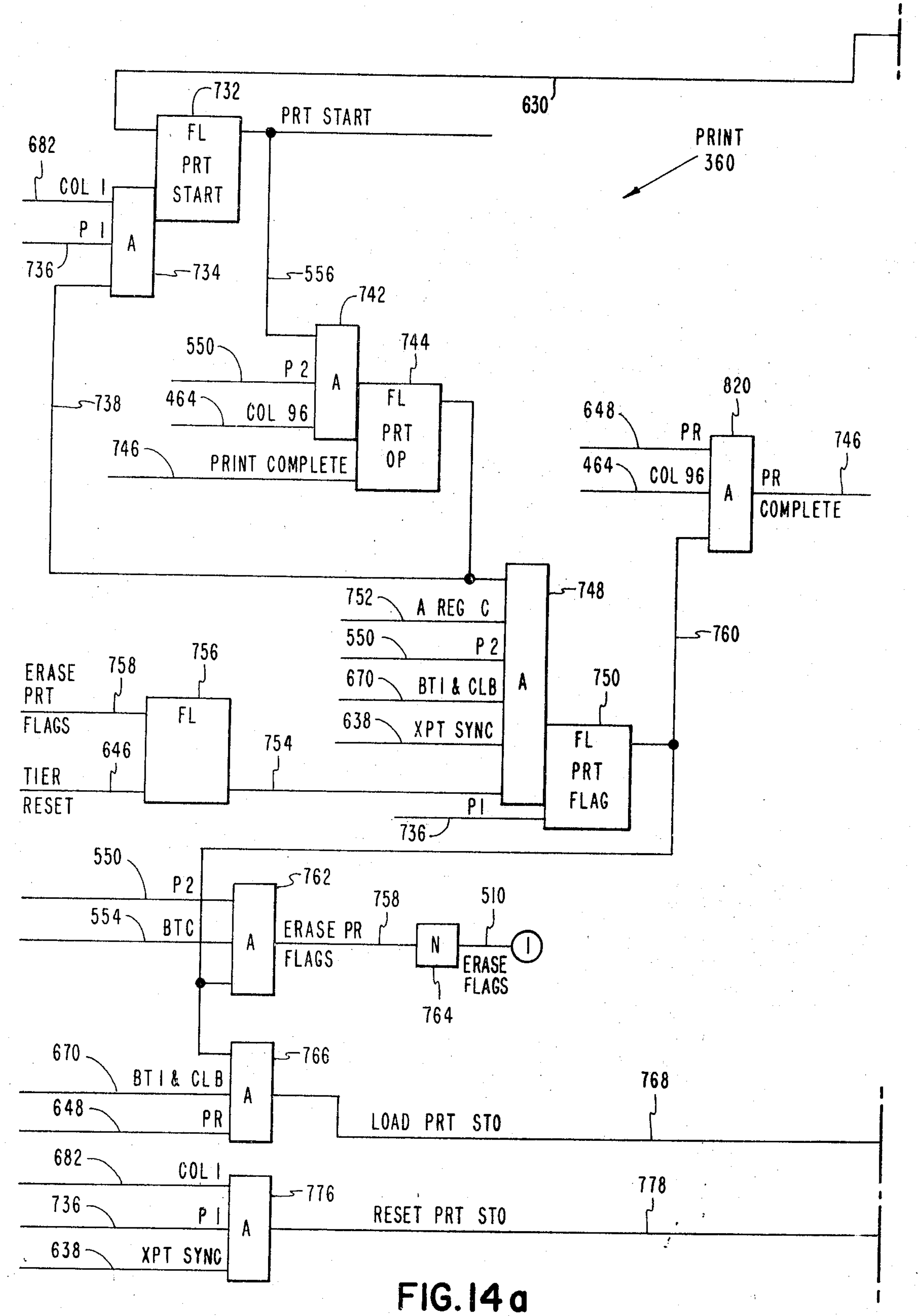
FIG. 14 is a diagram showing the manner in which FIGS. 14*a*, 14*b*, 14*c*, 14*d*, 14*e*, 14*f*, 14*g*, and 14*h* shall be placed together to form a complete FIG. 14 and to show diagrammatically the print and punch sections of the electrical control circuitry for the data recorder—the print section being shown in FIGS. 14*a*, 14*b*, and 14*h* and the punch section being shown in FIGS. 14*c*, 14*d*, 14*e*, 14*f*, and 14*g*.
Figure 14B:
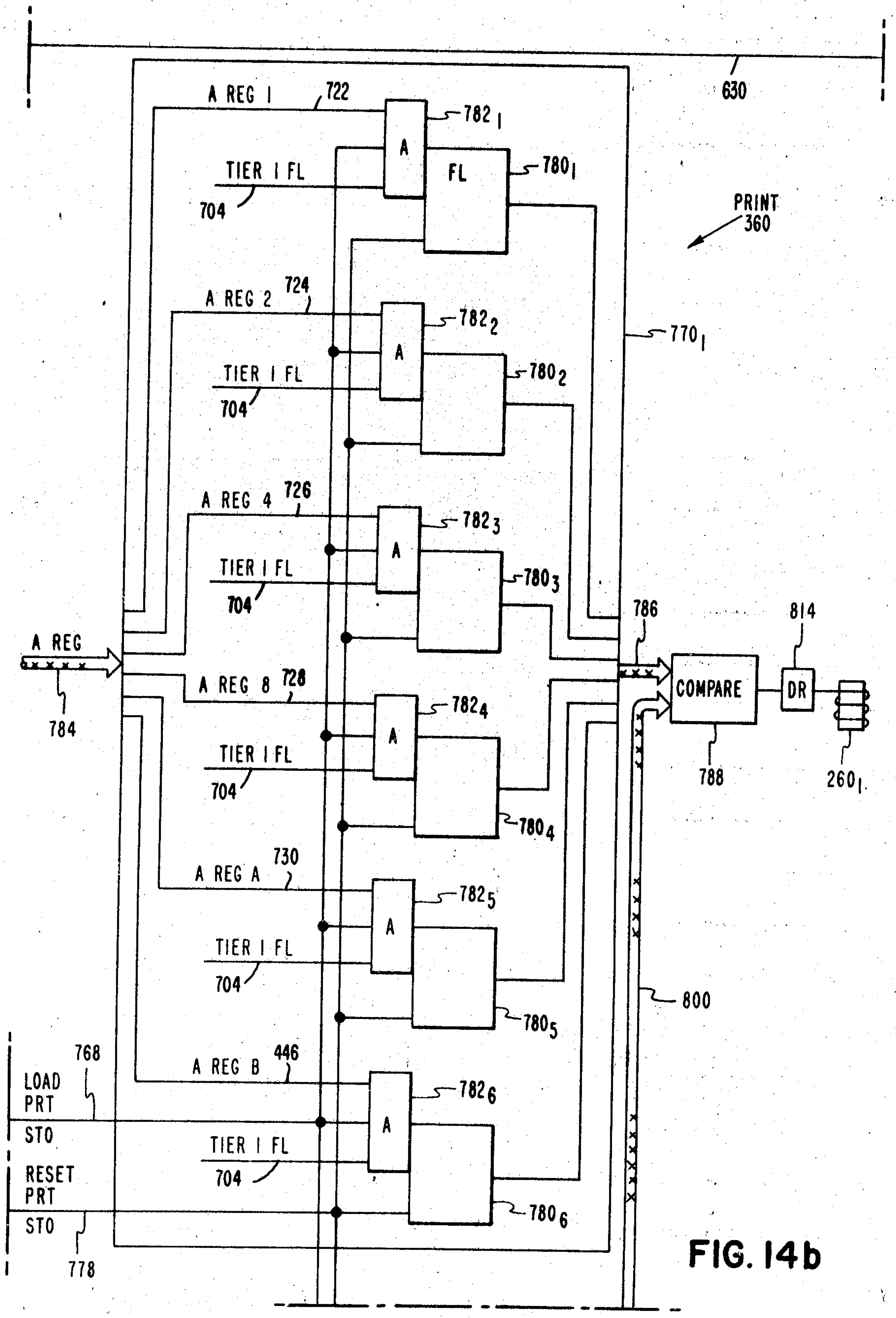
Figure 14C:
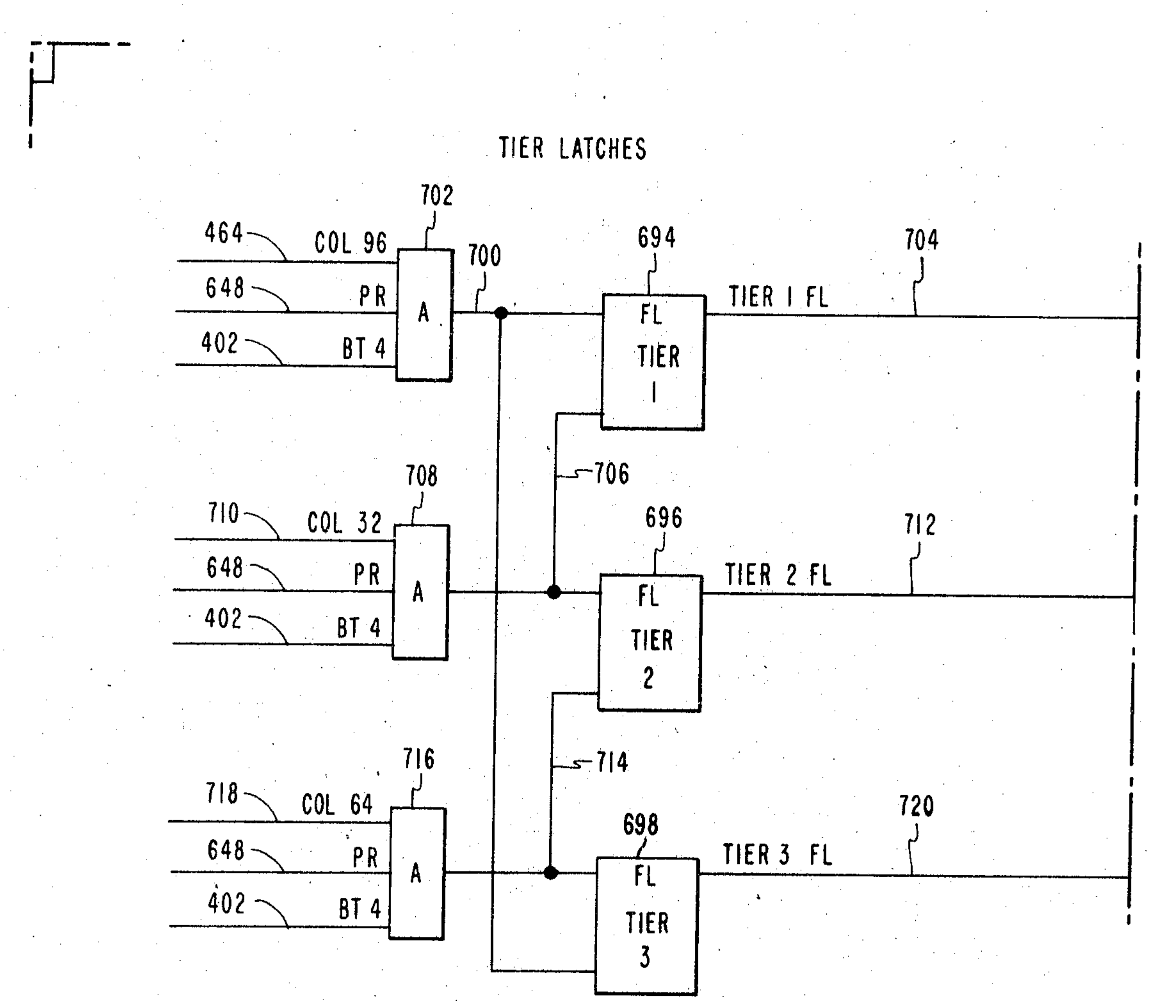
Figure 15:
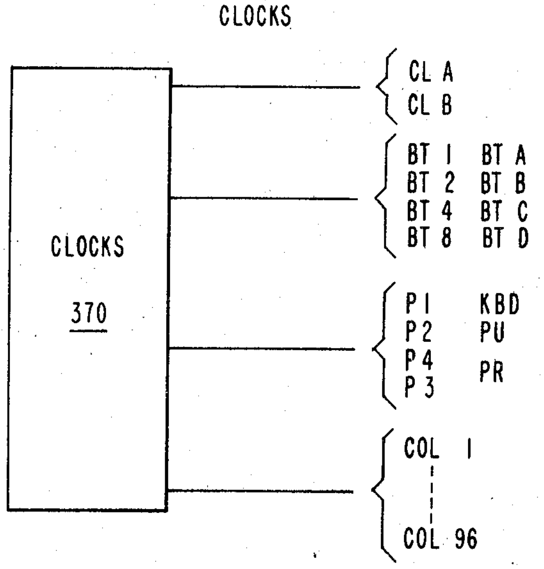
FIG. 15 is a diagram showing the clock forming a part of the electrical controls for the data recorder.

The system also utilizes various timed signals and is under the control of a clock 370 (see FIG. 15) which provides the timing shown in FIG. 16. According to FIG. 15, the clock 370 provides the bit times 1, 2, 4, 8, A, B, C, and D, each of which has a duration of 1 microsecond. Each of the bit times is divided into clock A and clock B times. A clock A time has a duration of 500 nanoseconds for each of the bit times, and a clock B time extends for 500 nanoseconds for the middle half of each of the bit times. The clock 370 also provides character times P1, P2, P4, P3, KBD, PU, and PR; and each of these character times has a duration of 8 microseconds and includes each of the bit times. The clock 370 also provides column times, each of which has a duration of 56 microseconds; and each of the column times includes all of the different character times.

The data entry section 350 (see FIG. 13) includes the keyboard 128 which is connected to an entry register 372 by means of a data buss 373. The entry register includes a series of six latches, namely, latches 1, 2, 4, 8, A, and B; and these latches are respectively connected with AND-circuits 374, 376, 378, 380, 382, and 384 by means of leads 386, 388, 390, 392, 394, and 396. The AND-circuits 374, 376, 378, 380, 382, and 384 also have input leads 398, 400, 402, 404, 406, and 408; and these leads respectively have the timed signals "bit time 1," "bit time 2," "bit time 4," "bit time 8," "bit time A," and "bit time B" applied to them derived from the clock 370. The AND-circuits 374, 376, 378, 380, 382, and 384 are appended onto an OR-circuit 410 having an output lead 412. The lead 412 constitutes an input to an AND-circuit 414; and the AND-circuit has two additional inputs, namely, leads 416 and 418. The lead 416 has the timed signal "KBD" applied to it which is derived from the clock 370.

The lead 418 is also applied as an input to an AND-circuit 420 which also has the lead 416 carrying the timed "KBD" signal applied to it as an input. The lead 418 also constitutes an input to another AND-circuit 422 which has additional leads 424 and 426 as inputs. The leads 424 and 426 respectively carry the timed signals "P3" and "bit time D" derived from the clock 370. The AND-circuits 420 and 422 are appended onto an OR-circuit 428, and an inverter circuit 430 is appended on the OR-circuit 428 and has an output lead 432.

The keyboard 128 is connected to keyboard control logic 434 by means of a lead 436. The keyboard control logic 434 has two outputs in the form of leads 438 and 440. The lead 438 carries a signal "any data key" which is raised when any of the data keys 132 and the space key 134 is depressed, and the lead 440 is connected to a keyboard restore magnet 442 which is effective on the keyboard 128 to restore the keyboard to operating condition after each of the keys on the keyboard 128 has been operated.

The lead 438 is connected as an input to an AND-circuit 444; and the AND circuit has additional inputs in the form of leads 446, 424, and 448. The lead 424 carries the timed signal "P3" as previously mentioned, and the lead 446 carries the signal "A REG B bit." The signal "A REG B bit" is derived from the A register 368 and constitutes the particular bit that is in the B position of register 368. The lead 448 carries the signal "bit time 4 & clock B," and this is a timed signal derived from the clock 370 and exists at the correspondence of bit time 4 and clock B time.

The AND-circuit 444 is applied onto the set side of a latch 450 which may be termed a keyboard service latch, and this latch has the lead 418 as an output so that the lead 418 carries the signal "keyboard service." An OR-circuit 452 is applied onto the reset side of the latch 450 and has two inputs in the form of leads 454 and 456. The lead 456 carries a "POR" (power on reset) signal which will be raised as subsequently described on machine initialization, and the lead 454 constitutes the output of an AND-circuit 458. The AND-circuit 458 has the leads 424 and 400 as inputs which respectively carry the timed signals "P3" and "bit time 2" as previously mentioned.

The lead 418 constitutes an input lead to an AND-circuit 460 which has additional inputs in the form of leads 402, 462, and 464. The lead 402 carries the "bit time 4" signal as previously mentioned, and the leads 462 and 464 carry the timed signals "PU" and "column 96" derived from the clock 370. The AND-circuit 460 is appended on the set side of a latch 466 which may be termed a K to P transfer latch. The latch 466 has a lead 468 as an output which carries a signal "K to P transfer latch," and the latch 466 has an OR-circuit 470 on its reset side which has the input leads 472 and 456. The lead 456 carries the "POR" signal, and the lead 472 constitutes the output of an AND-circuit 474. The AND-circuit 474 has three inputs; and these are leads 400, 462, and 464 respectively carrying the timed signals "bit time 2," "PU," and "column 96" previously referred to.

Two AND-circuits 476 and 477 are appended onto an OR-circuit 478 which, in turn, is appended onto a column indicator control 479. The AND-circuit 476 has three inputs, namely, lead 418 carrying the "keyboard service" signal as previously mentioned, lead 480 carrying a signal "not verify lock keyboard," and lead 481 carrying the signal "verify switch." The signal "verify switch" is derived from a verify switch 482 in the switch bank 140. The AND-circuit 477 has two inputs, one of these being the lead 418 carrying the "keyboard service" signal and the second being a lead 483 connected through an inverter circuit 484 with the lead 481. The column indicator control 479 is connected by means of a lead 485 with a column indicator 486 of the conventional type which includes a plurality of lighted bars 487.

The memory and control section 352 (see FIG. 13) includes the delay line 366 and A register 368 previously mentioned. The output of the delay line 366 is a lead 488, and this lead is connected to an AND-circuit 490 as one of two inputs. The other input to the AND-circuit 490 is an inverter circuit 492 which has an input lead 494. The AND-circuit 490 is appended onto an OR-circuit 496, and the OR circuit has an output in the form of a lead 498 which constitutes the input to the A register 368. The OR-circuit 496 has another AND-circuit 500 appended to it; and the AND-circuit 500 has two inputs, one of which is the lead 494 and the other of which is a lead 502 that also constitutes the output lead from the A register 368.

An AND-circuit 504 has the lead 502 as one of five inputs; and the other inputs are leads 432, 506, 508, and 510. The leads 506 and 510 carry the signals "not POR" and "erase flags," respectively, derived as will be hereinafter explained. The AND-circuit 504 has its output in the form of a lead 512 which constitutes one of the inputs to an OR-circuit 514. The OR-circuit 514 has five additional inputs; and these are leads 516, 518, 520, 522, and 524. The lead 518 constitutes the output of the AND-circuit 414; and the leads 516, 520, 522, and 524 respectively carry the signals "write read flags," "read data in," "write flags," and "write error flag"—the origins of which will be subsequently described.

The output of the OR-circuit 514 is in the form of a lead 526 constituting an input to an AND-circuit 528. The AND-circuit 528 has an additional input in the form of a lead 530, and the lead 530 carries the timed signal "not clock A" which is derived from the clock 370 and constitutes the inverse of the signal "clock A." The output of the AND-circuit 528 is a lead 532 which constitutes the input for the delay line 366.

The memory and control section 352 includes the initialization control logic 534 which has two outputs in the form of leads 456 and 536. The lead 456 carries the "POR" signal previously mentioned, and an inverter 538 is connected to the POR lead 456 so as to provide the signal "not POR" on lead 506. An OR-circuit 540 has the leads 536 and 468 as inputs, and this OR circuit is appended onto an AND-circuit 542 as one of the three inputs to the AND-circuit 542. The other two inputs to the AND-circuit 542 are the leads 424 and 426 respectively carrying the timed signals "P3" and "bit time D." The AND-circuit 542 is appended onto an OR-circuit 544 which has its output in the form of lead 522 carrying the signal "write flags."

Another AND-circuit 548 is provided on the OR-circuit 544 and has three inputs, one of which is the lead 426 carrying the "bit time D" signal. The second input is the lead 468 which carries the signal "K to P transfer latch," and the third input is a lead 550 carrying the timed signal "P2" derived from the clock 370. A third AND-circuit 552 has three inputs, and one of these is the lead 550 carrying the timed "P2" signal. The other two inputs are leads 554 and 556. The lead 554 carries the "bit time C" signal derived from the clock 370, and the lead 556 carries the signal "print start" derived as will be subsequently described.

The lead 468 is connected as an input to an AND-circuit 558 which has two inputs, and the other input is the lead 416 carrying the "KBD" signal. The AND-circuit 558 is appended onto an OR-circuit 560, and the output of the OR-circuit 560 is the lead 494. Another AND-circuit 562 is appended onto the OR-circuit 560 and has two inputs, namely, leads 556 and 462. As previously mentioned, the lead 462 carries the timed signal "PU;" and the lead 556 carries the signal "print start."

The card feed control section 354 (see FIG. 13) comprises a pick roll latch 564. The latch 564 has an OR-circuit 566 on its set side; and the OR-circuit 566 has two inputs, one of which is the lead 468 from the K to P transfer latch 466 and the other of which is a lead 568 carrying the signal "read key." The "read key" signal is obtained by actuations of the read key 570 on the keyboard 128. The latch 564 has an OR-circuit 572 on its reset side, and the OR-circuit 572 has two inputs which are in the form of the "POR" signal lead 456 and a lead 574. The lead 574 constitutes the output of an inverter circuit 576, and the input to the inverter circuit 576 is a lead 578 that constitutes the output of the card sensor 202 and carries the signal "card sensor." The output of the latch 564 is a lead 580 that is connected to the pick roll magnet 182.

A primary incrementer latch 582 has its set side connected to the lead 580. The latch 582 has an OR-circuit 584 on its reset side; and the OR-circuit 584 has two input leads, namely, the POR lead 456 and a lead 586. The lead 586 constitutes the output of an AND-circuit 588; and the AND-circuit 588 has three inputs in the form of leads 590, 578, and 408. The leads 578 and 408 carry respectively the signals "card sensor" and "bit time B" as previously mentioned, and the lead 590 carries the signal "punch dwell" derived as will be hereinafter described.

The primary incrementer latch 582 has its output in the form of lead 592 connected with the primary incrementer magnet 232. An AND-circuit 594 has the lead 592 as one of its inputs and has additional inputs in the form of leads 578, 398, and 590 respectively carrying the signal "card sensor," the timed signal "bit time 1," and the "punch dwell" signal. The AND-circuit 594 has a lead 598 as an output which carries a "punch start" signal.

A gate latch 600 has an AND-circuit 602 on its set side, and the AND-circuit 602 has two inputs including the lead 578 having the "card sensor" signal thereon and the lead 580 constituting the output lead of the pick roll latch 564. The reset side of the gate latch 600 is connected with the lead 598, and the output of the gate latch 600 is a lead 604 connected to the electromagnetically energized pole piece 204.

Figure 5:
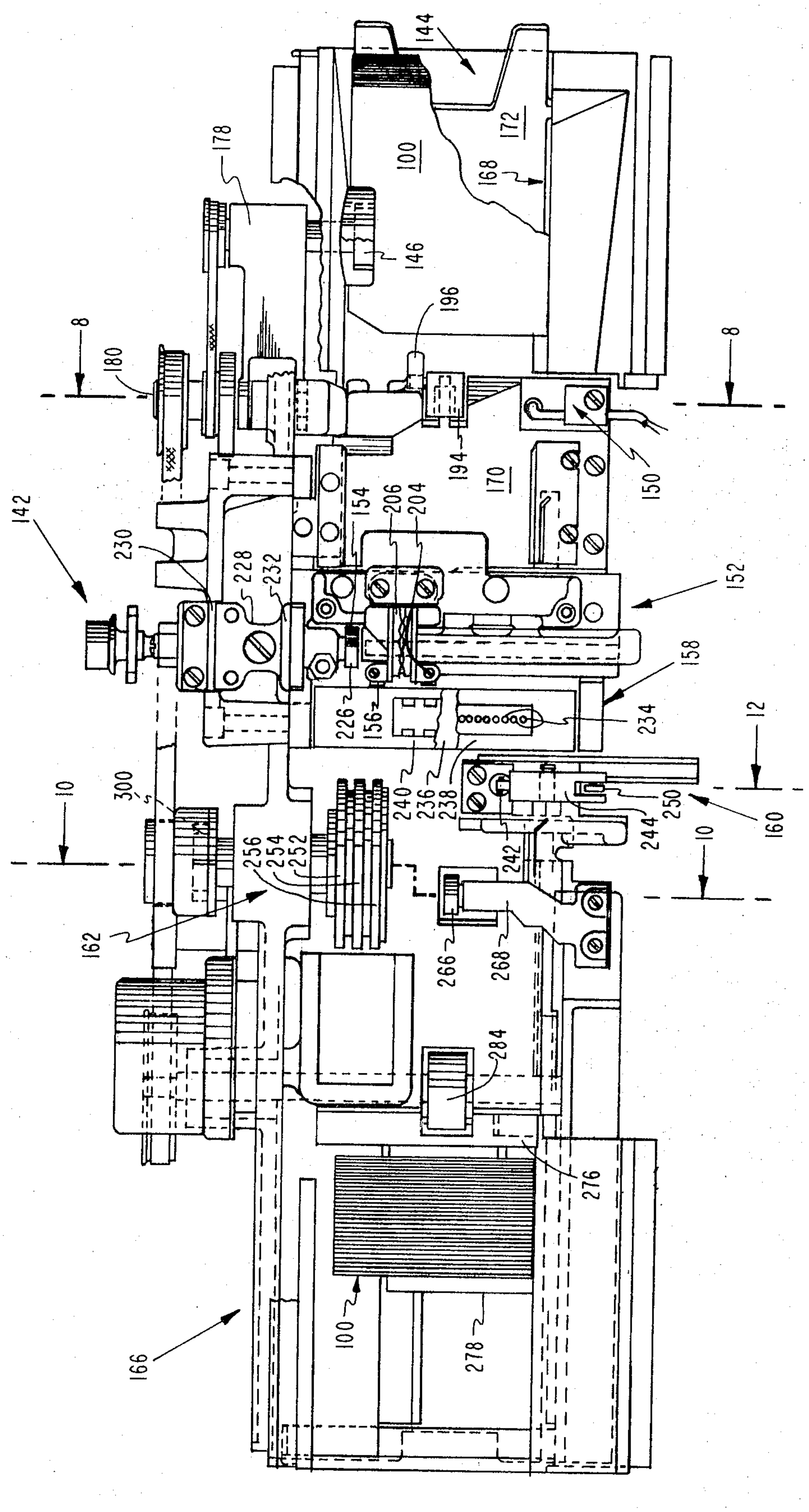
FIG. 5 is a plan view of the document card transport in the data recorder.
Figure 6:
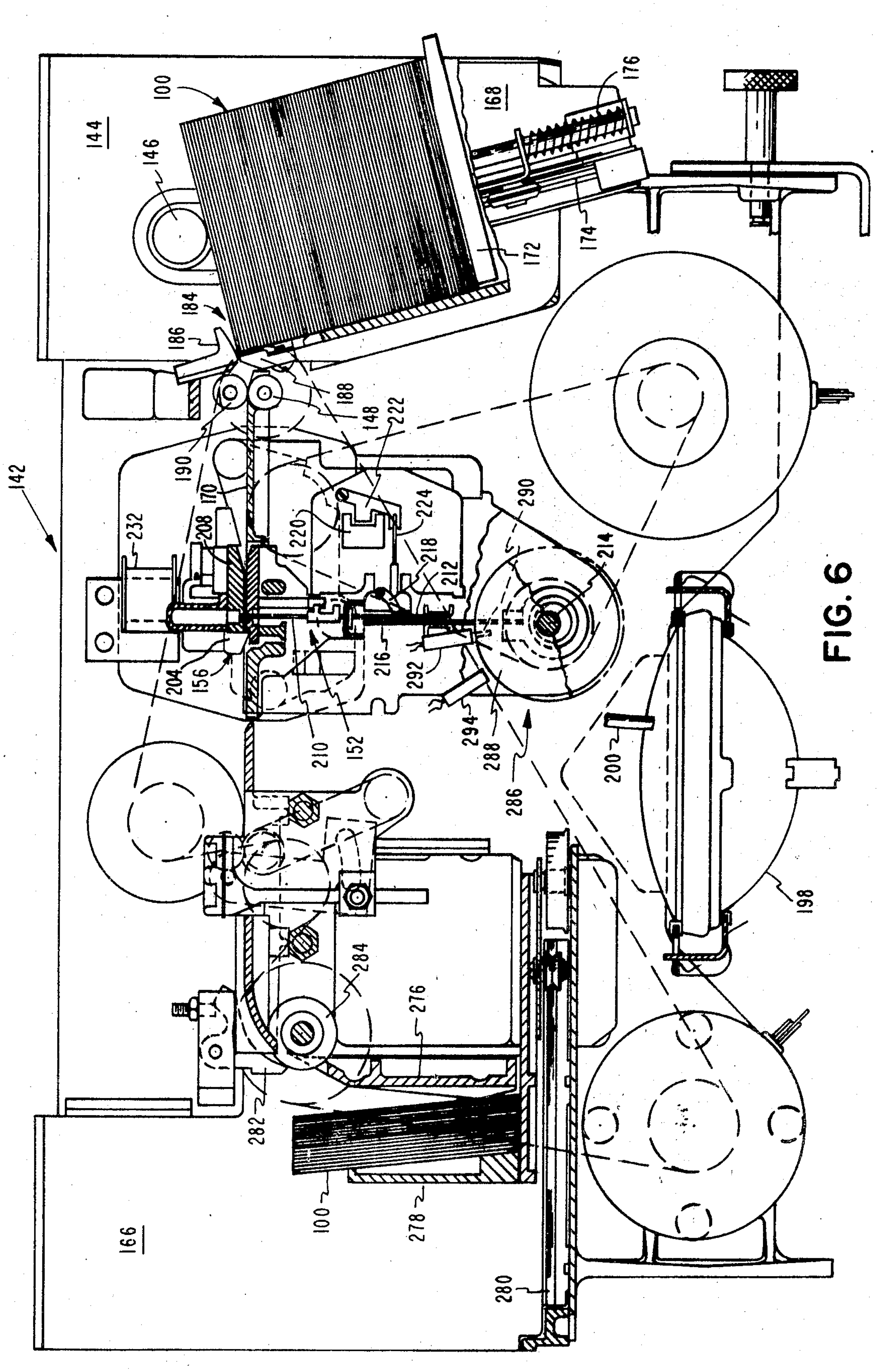
FIG. 6 is a side elevational view of the card transport.

The transport section 356, as shown in FIG. 5, has the various magnets 274, 232, and 182 and other devices previously described and includes the emitters 286 and 296. The punch emitter 286 is connected by means of a lead 606 with punch emitter amplifiers 608; and these amplifiers have outputs 590, 612, and 614 which respectively carry the signals "punch dwell," "punch off," and "punch on." The print emitters 296 are connected by means of a lead 616 with print emitter amplifiers 618, and these amplifiers have outputs in the form of leads 620 and 622 which respectively carry the signals "print home" and "print character."

The punch section 358 (see FIG. 14) comprises the punch op latch 624 having an AND-circuit 626 on its set side. The AND-circuit 626 has two inputs which are from a lead 628 that carries a "not read op" signal and from the lead 598 that carries the "punch start" signal. A lead 630, which carries a "-punch complete" signal, is connected to the reset side of the latch 624. The punch op latch 624 has its output in the form of a lead 632 which constitutes one of the inputs of an AND-circuit 634 appended to the set side of a punch flag latch 636. The AND-circuit 634 has six inputs including leads 448, 550, and 446 carrying respectively the signals "bit time 4 & clock B," "P2," and "A REG B" previously referred to. In addition, the AND circuit has the leads 638 and 640 as inputs, and the lead 638 carries a "transport sync" signal. The lead 640 constitutes the output of a latch 642 having two inputs, namely, a lead 644 on its set side and a lead 646 on its reset side which respectively carry the signals "erase punch flags" and "tier reset." The latch 636 had the lead 648 on its reset side, and the lead 648 carries the timed "PR" signal from the clock 370.

The output of the punch flag latch 636 is a lead 650, and this constitutes one of the inputs to an AND-circuit 652. The AND-circuit 652 has three inputs, and the other two inputs are leads 550 and 426 having the timed signals "P2" and "bit time D" applied respectively thereon. The output of the AND-circuit 652 is the lead 644 which is also an input to the latch 642, and an inverter circuit 654 is connected to the lead 644. The output of the inverter circuit 654 is the lead 510 carrying the "erase flag" signal.

The lead 632 constitutes one of the inputs to an AND-circuit 658 which is applied onto the set side of the punch gate latch 660. The AND-circuit 658 has two inputs, and the other input is the lead 614 carrying the "punch on" signal. The latch 660 on its reset side has the lead 612 carrying the "punch off" signal applied thereto. The latch 660 has its output in the form of a lead 666.

An AND-circuit 668 has three inputs, one of which is the lead 650 and the other of which is the lead 462 carrying the timed "PU" signal from the clock 370. The third input to the latch 668 is a lead 670 carrying the timed signal "bit time 1 & clock B" produced by the clock 370 at the correspondence of the bit time 1 and clock B times. A lead 672 constitutes the output of the AND-circuit 668 and carries a signal "load punch store."

The lead 650 is connected with another AND-circuit 674 to be an input thereto. The AND-circuit 674 has two other inputs, and these are leads 648 and 464 having the timed signals "PR" and "column 96" thereon. The output of the AND-circuit 674 is the lead 630 which carries the "punch complete" signal.

An AND-circuit 678 is provided and has three inputs. Two of the inputs are the leads 550 and 638 having the timed "P2" signal and the "transport sync" signal respectively thereon. The other input constitutes lead 682 carrying a "column 1" signal derived from the clock 370. The AND-circuit 678 has an output in the form of a lead 684 carrying a "reset punch store" signal thereon.

As has been previously described, there are 18 punches 210 actuated by magnets 220. The respective magnets may be designated as magnets $220_1$ to $220_{18}$ in FIG. 14; and these magnets are energized respectively by punch drivers $686_1$ to $686_{18}$. The punch drivers $686_1$ to $686_6$ are controlled by a tier 1 punch register $689_1$; the punch drivers $686_7$ to $686_{12}$ are controlled by a tier 2 punch register $689_2$; and the punch drivers $686_{13}$ to $686_{18}$ are controlled by tier 3 punch register $689_3$. The punch register $689_1$ includes the punch latches $690_1$ to $690_6$; the punch register $689_2$ includes the punch latches $690_7$ to $690_{12}$; and the punch register $689_3$ includes the punch latches $690_{13}$ to $690_{18}$. The latches $690_1$ to $690_{18}$ are respectively connected to the AND-circuits $688_1$ to $688_{18}$ which are respectively controlled by these latches. The latches $690_1$ to $690_{18}$ are respectively provided with the AND-circuits $692_1$ to $692_{18}$ on their set sides.

Tier latches 694, 696, and 698 are provided to correspond to tiers 1, 2, and 3 respectively. Tier latch 694 is connected by means of a lead 700 with an AND-circuit 702; and the AND-circuit 702 has three inputs, namely, leads 464, 648, and 402 respectively carrying the timed signals "column 96," "PR," and "bit time 4." The tier 1 latch 694 has its output in the form of lead 704. A lead 706 is connected to the reset side of the latch 694.

The latch 696 has its set side connected by means of the lead 706 with an AND-circuit 708; and the AND-circuit 708 has three inputs including the leads 648 and 402 carrying the "PR" and "bit time 4" signals. The third input to the AND-circuit 708 is a lead 710 carrying a "column 32" signal derived from the clock 370. The latch 696 has its output in the form of a lead 712. A lead 714 is connected to the latch 696 on the reset side of the latch.

The tier 3 latch 698 is connected by means of the lead 714 with an AND-circuit 716 having three inputs, two of which are the leads 648 and 402 carrying the timed signals "PR" and "bit time 4" respectively. The third input to the AND-circuit 716 is a lead 718 carrying a "column 64" signal derived from the clock 370. The output of the latch 698 is a lead 720, and the reset side of the latch 698 is connected to the lead 700.

Each of the AND-circuits $692_1$ to $692_{18}$ has three inputs. The lead 672 is one of the inputs to each of these AND circuits. The lead 704, which carries the "tier 1 latch" signal, constitutes the second input to the AND-circuits $692_1$ to $692_6$; the lead 712, which carries the "tier 2 latch" signal, constitutes the second input to the AND-circuits $692_7$ to $692_{12}$; and the lead 720, which carries the signal "tier 3 latch," constitutes the second input for each of the AND-circuits $692_{13}$ to $692_{18}$.

The third inputs to each of the AND-circuits $692_1$ to $692_{18}$ are provided from the A register 368. The third input for the AND-circuits $692_1$, $692_7$, and $692_{13}$ is the lead 722 carrying the "A REG 1" signal; the third input for the AND-circuits $692_2$, $692_8$, and $692_{14}$ is the lead 724 carrying the "A REG 2" signal; the third input for the AND-circuits $692_3 692_9$, and $692_{15}$ is the lead 726 carrying the "A REG 4" signal; the third input for the AND-circuits $692_4$, $692_{10}$, $692_{16}$ is the lead 728 carrying the "A REG 8" signal; the third input for the AND-circuits $692_5$, $692_{11}$, and $692_{17}$ is the lead 730 carrying the "A REG A" signal; and the third input for the AND-circuits $692_6$, $692_{12}$, and $692_{18}$ is the lead 446 carrying the "A REG B" signal. These signals are respectively secured from the triggers 1, 2, 4, 8, A, and B in the A register 368 and are indicative of the presence or absence of bits in these triggers.

The AND-circuits $688_1$ to $688_{18}$ are respectively connected to the outputs of the latches $690_1$ to $690_{18}$; and in addition, each of the AND-circuits $688_1$ to $688_{18}$ is connected to the lead 666 which constitutes an input to the AND circuits. The AND-circuits $688_1$ to $688_{18}$ are respectively connected to the punch drivers $686_1$ to $686_{18}$, and these punch drivers are respectively connected to the punch magnets $220_1$ to $220_{18}$.

The print section 360 (see FIG. 14) comprises the print start latch 732 which has the lead 630 connected to it on its set side. The print start latch 732 has an AND-circuit 734 on its reset side; and the AND-circuit 734 has three inputs. Lead 682, carrying the "column 1" timing signal, constitutes one of the inputs; and the other inputs are respectively leads 736 and 738. Lead 736 carries the "P1" signal derived from the clock 370. The output of the latch 732 is the lead 556 carrying the "-print start" signal, and this lead is connected to an AND-circuit 742 disposed on the set side of a print op latch 744. The AND-circuit 742 has three inputs; and two of these are the leads 550 and 464 carrying the timing signals "P2" and "-column 96" respectively. The reset side of the latch 744 has a lead 746 connected to it, and this lead at times carries a "print complete" signal. The lead 738 constitutes the output of the latch 744.

The lead 738 is connected to an AND-circuit 748 which is disposed on the set side of the print flag latch 750. The AND-circuit 748 has six inputs; and two of these inputs are the leads 670 and 550 carrying respectively the "bit time 1 & clock B" and "P2" timing signals. Another input is the lead 638 carrying the "transport sync" signal, and still another input is the lead 752 which carries the "A REG C" signal derived from the C trigger of the A register 368. The sixth input of the AND-circuit 748 is a lead 754 which constitutes an output of a stop search latch 756. The latch 756 has a lead 758 on its set side which at times carries a signal "erase print flags" and has the lead 646 on its reset side which at times carries the signal "tier reset." The lead 736, carrying the timed "P1" signal, is connected to the print flag latch 750 on its reset side.

A lead 760 constitutes the output of the latch 750, and this constitutes one of the inputs to an AND-circuit 762. The AND-circuit 762 also has inputs from the leads 550 and 554 carrying the "P2" and "bit time C" timing signals. The output of the AND-circuit 762 is the lead 758 carrying the signal "erase print flags." An inverter circuit 764 is connected to the lead 758 and has its output in the form of lead 510 carrying the signal "erase flags."

An AND-circuit 766 has three inputs, one of which is the lead 760. The other two inputs to the AND-circuit 766 are provided by the leads 648 and 670 respectively carrying the "PR" and "bit time 1 & clock B" signals. The AND-circuit 766 has its output in the form of lead 768 which carries the signal "load print store"; and this lead is connected to print registers $770_1$, $770_2$, and $770_3$.

An AND-circuit 776 has three inputs, namely, from leads 682, 736, and 638 respectively carrying the "column 1," "P1,"and "transport sync" signals; and the AND-circuit 776 has its output in the form of a lead 778 carrying the "reset print storage" signal and connected with the print registers $770_1$, $770_2$, and $770_3$.

The print register $770_1$ is identical with the punch register $689_1$ and includes latches $780_1$ to $780_6$ which are respectively controlled by AND-circuits $782_1$ to $782_6$. The print register $770_1$, like the punch register $689_1$, has its AND-circuits $782_1$ to $782_6$ connected to the leads 722, 724, 726, 728, 730, and 446 respectively carrying the "A REG 1," "A REG 2," "A REG 4," "A REG 8," "A REG A," and "A REG B" signals; and these are indicated to come from a buss 784 from the A register 368. Also, all of the AND-circuits $782_1$ to $782_6$, like AND-circuits $692_1$ to $692_6$, have the lead 704 carrying the "tier 1 latch" signal as inputs. The AND circuits in the print register $770_1$ are connected to the load print store lead 768 and the latches $780_1$ to $780_6$ are connected to the reset print store lead 778, and these leads correspond to the leads 672 and 684 to which the punch register $689_1$ is connected. The outputs of the latches $780_1$ to $780_6$ are combined as separate leads in a buss 786 which applies the signals from the separate leads to a compare circuit 788.

The print register $770_2$ is identical to the register $770_1$ except that its AND circuits are connected to the tier 2 latch lead 712 in lieu of the tier 1 latch lead 704, and the register $770_2$ is thus similar to the punch register $689_2$ in this respect. The register $770_3$ is identical to the registers $770_1$ and $770_2$ except that its AND circuits are connected to the tier 3 latch lead 720 in lieu of the tier 1 latch lead 704 and tier 2 latch lead 712. The register $770_2$ is connected through a buss 790 with a compare circuit 792, and the register $770_3$ is connected through a buss 794 with a compare circuit 796. The compare circuits 792 and 796 correspond to the compare circuit 788 used in connection with the register $770_1$.

Each of the compare circuits 788, 792, and 796 is connected to a print counter 798 by means of a buss 800. The print counter 798 is energized by the "print character" and "print home" signals in the leads 622 and 620; and this is a binary counter which counts from 0 through 63 and provides signals in leads 802, 804, 806, 808, 810, and 812 in binary fashion for this purpose, with these leads being combined in the form of the buss 800 which is applied onto the compare circuits 788, 792, and 796.

The compare circuits 788, 792, and 796 are respectively connected to driver circuits 814, 816, and 818; and these are respectively connected to magnets $260_1$, $260_2$, and $260_3$ for actuating the print hammers 258 respectively for the print wheels 252, 254, and 256.

An AND-circuit 820 is provided for terminating the printing operation; and this has the lead 760, constituting the output of the print flag latch 750 and leads 648 and 464 carrying the timing signals "PR" and "column 96," as inputs. The output of the AND-circuit 820 is the lead 746 carrying the "print complete" signal and applied on the reset side of the print op latch 744.

The read section 362 (see FIG. 13) is under the control of the read key 570 which provides a signal "read key" in lead 568. A read op latch 822 has its set side connected with the lead 568 and has an OR-circuit 824 on its reset side. The OR-circuit 824 has two inputs, one of which is the POR lead 456 and the other of which is a lead 826 carrying the signal "read complete." The latch 822 has two outputs, namely, the lead 828 carrying the signal "read op" and the lead 628 which carries the signal "not read op."

The lead 828 is connected as an input to an AND-circuit 832, and the AND-circuit 832 has a second input in the form of lead 598 carrying the signal "punch start." The AND-circuit 832 is appended onto an OR-circuit 834. A second AND-circuit 836 is appended onto the OR-circuit 834; and the AND-circuit 836 has two inputs, one of which is the lead 826 and the other of which is the lead 481 carrying the signal "verify switch."

The OR-circuit 834 has its output in the form of lead 840 which carries the signal "start read transport counter," and the lead 840 is connected to a counter 842. The counter 842 is connected with the lead 590 carrying the signal "punch dwell," and the counter is operative for counting in response to the pulses in the punch dwell lead 590 which acts as a driver for the counter.

The counter 842 has a lead 844 as an output, and a signal is generated therein by the counter 13 increments after the counter 842 has been initially energized. The lead 844 is applied as an input to an AND-circuit 846 which is appended onto the set side of a write read flag latch 848. The AND-circuit 846 has two inputs, and the second input is the lead 682 carrying the timing signal "column 1." The latch 848 has the lead 464 carrying the "column 96" timing signal attached to it on its reset side. THe latch 848 has its output in the form of a lead 850, and the lead 850 constitutes one of the three inputs to an AND-circuit 852. The other two inputs to the AND-circuit 852 are the leads 736 and 554 respectively carrying the timing signals "P1" and "bit time C." The AND-circuit 852 has the lead 516 as an output carrying the signal "write read flags."

The lead 844, constituting the output of the counter 842, is connected on the set side of a read start latch 854. The latch 854 has an OR-circuit 856 on its reset side; and the OR-circuit 856 has two inputs, one of which is the POR lead 456 and the other of which is the lead 826 carrying the signal "read complete."

The read start latch 854 has its output in the form of a lead 860, and this lead constitutes one of the inputs to an AND-circuit 862. The AND-circuit 862 also has inputs from leads 648 and 638 carrying the timed "PR" signal and the "transport sync" signal respectively and has still other inputs in the form of leads 864, 866, and 868. The lead 864 carries the signal "A REG D" which is derived from the D trigger in the A register 368, and the lead 866 carries the timing signal "bit time D & clock B" which is a pulse at the correspondence of clock B and bit time D. The "transport sync" signal carrying lead 638 constitutes the output of a transport sync latch 870 which has an AND-circuit 872 on its set side. The AND-circuit 872 has two inputs, one of which is the "punch dwell" signal carrying lead 590 and the other of which is the lead 682 carrying the "column 1" timing signal. The lead 464, carrying the "column 96" timing signal, is connected to the latch 870 on its reset side.

The AND-circuit 862 is appended on the set side of a read flag latch 874; and the latch 874 has an OR-circuit 876 on its reset side having two inputs, namely, from the POR lead 456 and from a lead 878. The lead 878 constitutes the output of an AND-circuit 880; and the AND-circuit 880 has two inputs, namely, from the leads 648 and 554 respectively carrying the timing signals "PR" and "bit time C."

The latch 874 has its output in the form of a lead 882, and this lead constitutes one of the three inputs to an AND-circuit 884. The AND-circuit 884, in addition, has inputs from the leads 554 and 736 respectively carrying the timing signals "bit time C" and "P1." The AND-circuit 884 is appended on the set side of a stop search latch 886, and the latch 886 has the tier reset lead 646 connected to it on its reset side. The lead 646 constitutes the output of an AND-circuit 888. The AND-circuit 888 has two inputs, one of which is the lead 648 carrying the timed "PR" signal and the other of which is a lead 890.

The lead 890 constitutes the output of an OR-circuit 892; and the ORscircuit 892 has three inputs which are the leads 710, 718, and 464 respectively carrying the timing signals "column 32," "column 64," and "column 96." The output of the stop search latch 886 is the lead 868 connected to the AND-circuit 862 and providing the fifth input to the AND-circuit 862.

The lead 882 also constitutes the input to an AND-circuit 894, and the AND-circuit 894 has a second input in the form of lead 464 carrying the "column 96" timing signal. The output of the AND-circuit 894 is the lead 826 carrying the "read complete" signal.

The lead 882 also constitutes an input of an AND-circuit 896. The AND-circuit 896 has two additional inputs, namely, from leads 736 and 554 respectively carrying the "P1" and "bit time C" signal. The AND-circuit 896 is appended onto an OR-circuit 898, and an inverter circuit 900 is appended onto the OR-circuit 898. The output of the inverter circuit 900 is the lead 508 constituting an input to the AND-circuit 504. The lead 882 also constitutes an input to another AND-circuit 902 appended onto the OR-circuit 898, and the second input to the AND-circuit 902 is the lead 462 carrying the timed "-PU" signal.

The lead 882 also constitutes an input to an AND-circuit 904. The AND-circuit 904 has two additional inputs, namely, from a lead 906 and from the lead 462 carrying the timed "-PU" signal. The output of the AND-circuit 904 is the lead 520 constituting an input for the OR-circuit 514 and carrying the signal "read data in."

The read station 158 includes 18 phototransistors $234_1$ to $234_{18}$ (see FIG. 13). These phototransistors are positioned in a row transversely of the movement of the cards 100 so that they may sense the openings in the three aligned columns of a tier; for example, to simultaneously sense the openings in columns 2, 34, and 66 of a card 100. Phototransistors $234_1$ to $234_6$ are positioned to detect the openings in tier 1, phototransistors $234_7$ to $234_{12}$ are positioned to detect the openings in tier 2, and phototransistors $234_{13}$ to $234_{18}$ are positioned to detect the openings in tier 3. The emitters of the phototransistors $234_1$ to $234_6$ are connected to the collector of a transistor 908 that has its base connected with the lead 704 having the signal "tier 1 latch" thereon. A transistor 910 is similarly connected to the emitters of the phototransistors $234_7$ to $234_{12}$, and the base of the transistor 910 is connected to the lead 712 carrying the signal "tier 2 latch." The emitters of the phototransistors $234_{13}$ to $234_{18}$ are similarly connected to a transistor 912 which, in turn, is connected to the lead 720 carrying the signal "tier 3 latch." The No. 1 phototransistors for each of the tiers have their collectors connected to a lead 914, and this lead is connected to a read amplifier 916 adapted to be energized when there is an opening in a No. 1 row in one of the particular columns being sensed. Similarly, the 2, 4, 8, A, and B phototransistors are connected to leads 918, 920, 922, 924, and 926 which are respectively connected to amplifiers 928, 930, 932, 934, and 936.

The amplifiers 916, 928, 930, 932, 934, and 936 are respectively connected with AND-circuits 938, 940, 942, 944, 946, and 948. Each of these AND circuits has two inputs, one of which is from one of the read amplifiers just mentioned and the others of which are the leads 398, 400, 402, 404, 406, and 408 respectively carrying the timing signals "bit time 1," "bit time 2," "bit time 4," "bit time 8," "bit time A," and "bit time B." The AND-circuits 938, 940, 942, 944, 946, and 948 are appended onto an OR-circuit 950; and the output of the OR-circuit 950 is the lead 906 constituting one of the inputs to the AND-circuit 904.

The verify section 364 (see FIG. 13) includes a verify compare circuit 952. The compare circuit has inputs from the A REG buss 784 and from an entry REG buss 954, and the compare circuit 952 has an output in the form of lead 956. An inverter circuit 958 is connected to the lead 956 as an input and has its output in the form of lead 960. An AND-circuit 962 has four inputs, one of which is the lead 960; and the other inputs are the lead 418 carrying the "keyboard service" signal and leads 462 and 670 respectively carrying the timed "PU" and "bit time 1 & clock B" signals.

The AND-circuit 962 has its output in the form of a lead 964 that at times carries a "verify noncompare" signal, and the lead 964 is connected to the latch 966 on the set side of the latch. The latch 966 has an OR-circuit 968 on its reset side; and the OR-circuit 968 has two inputs, namely, from leads 970 and 972. The lead 970 at times carries an "error reset key" signal, and this signal is provided by the error reset key 974 on the keyboard 128.

The latch 966 provides two outputs, namely, in leads 976 and 480. The lead 976 carries the signal "verify lock keyboard," and this is applied to the keyboard control logic 434. An error light 977 is also connected to the lead 976. The lead 480 carries the signal "not verify lock keyboard," and this is applied to the AND-circuit 476 that controls the column indicator control 479. The lead 964 is connected also to an error counter 978, and the error counter 978 has two outputs in the form of leads 980 and 982. The leads 980 and 982 constitute the two inputs of an AND-circuit 984, and the AND circuit has the lead 972 as its output.

The lead 972 constitutes the input of a third try error latch 986 on the set side of the latch. The reset side of the latch has the lead 416 carrying the timed signal "keyboard." The output of the latch 986 is in the form of a lead 988 which constitutes one of the three inputs of an AND-circuit 990. The other two inputs of the AND-circuit 990 are the leads 424 and 554 respectively carrying the "P3" and "bit time C" timing signals. The output of the AND-circuit 990 is the lead 524 carrying the signal "write error flag."

The verify section also includes an AND-circuit 994 having three inputs. One of the inputs is in the form of lead 850 connected with the write read flag latch 848, and the other inputs are in the form of leads 424 and 554 respectively carrying the "P3" and "bit time C" timing signals. The AND-circuit 994 is appended onto an inverter circuit 996 which has its output in the form of lead 510 carrying the signal "erase flags."

The verify section 364 also includes a card no good latch 998 having an AND-circuit 1000 appended on its set side. The AND-circuit 1000 has five inputs which are the lead 481 carrying the signal "verify switch," the lead 468 carrying the "K to P transfer latch" signal, the lead 730 carrying the "A REG A" signal, the lead 424 carrying the "P3" timing signal, and the lead 448 carrying the "bit time 4 & clock B" timing signal. The latch 998 has the lead 746 carrying the "print complete" signal applied to it on its reset side.

The output of the card no good latch 998 is a lead 1002 which constitutes one of the inputs of an AND-circuit 1004. The AND-circuit 1004 is appended on the set side of the notch latch 1006, and the AND-circuit 1004 has four inputs. One of the inputs is the lead 481 carrying the "verify switch" signal; another of the inputs is the lead 468 carrying the "K to P transfer latch" signal; and the fourth input is a lead 1008 carrying the signal "column 20" derived from the clock 370. The lead 464 carrying the "column 96" signal is applied onto the latch 1006 on its reset side. The output of the latch 1006 is in the form of a lead 1010 which is connected to the notch magnet 246.

The verify section also includes a secondary incrementer latch 1012 which has an AND-circuit 1014 on its set side. The AND-circuit 1014 has two inputs, one of which is the lead 481 carrying the "verify switch" signal and the other of which is a lead 1016 which is connected to the read transport counter 842 and which carries the signal "ten increments after read complete." The latch 1012 has its output connected by means of a lead 1018 with the second incrementer magnet 274. The reset side of the latch 1012 is connected to the K to P transfer latch lead 468.

In operation, the initialization control 534 is first energized in order to condition the machine for operation. Energization of the initialization control 534 applies a "POR" signal on the lead 456; and, as has been previously described, this lead is connected to the reset sides of the various latches in the system; and the "POR" signal thus has the effect of resetting the various latches. The "POR" lead 456 is, for example, connected to the latches 450 and 466 respectively through the OR-circuits 452 and 470.

Energization of the initialization control logic 534 also has the effect of providing a signal in the lead 536 which has the effect of writing keyboard flags for the 96 columns of data circulating through the delay line 366 and the A register 368. This circulating data takes the form shown in FIG. 4; and the circulation is controlled by clock 370 so that the data passing any one point in the data loop, including delay line 366 and A register 368, is synchronized with the column, character, and bit times shown in FIG. 16. It will be observed from FIG. 4 that the D bit in the P3 character for each of the 96 columns constitutes the keyboard flag for each column. The signal in the lead 536 is applied through OR-circuit 540 onto AND-circuit 542; and the AND-circuit 542, having the timing signals "P3" and "bit time D" from leads 424 and 426 also applied thereto, provides a signal in the write flags lead 522 through the OR-circuit 544 at P3 time and bit time D for each of the 96 columns. This signal in the lead 522 is applied through OR-circuit 514 onto the lead 526 constituting a part of the loop for the data circulating through the delay line 366 and A register 368; and, therefore, a keyboard flag has thus been written in the data loop for each of the 96 columns. The signal provided by the logic 534 in the lead 536 may exist for a duration of 5.4 milliseconds which is the time for one complete memory cycle and is sufficiently long so as to provide all of the 96 keyboard flags.

The 96 columns of data circulating through the data loop including the delay line 366 and A register 368 circulates from the OR-circuit 514 through the lead 526, the AND-circuit 528, and the lead 532 into one end of the delay line 366. The data is clocked into the delay line by virtue of the "not clock A" signal in the lead 530—the "clock A" signal being a signal of 500 nanoseconds duration. Since, under these conditions, there is no signal on the lead 484, the inverter 492 provides a constant input on the AND-circuit 490; therefore, the 96 columns of data flow serially from the delay line 366 through lead 488, AND-circuit 490, OR-circuit 496, and lead 498 into the A register 368. The A register 368 comprises eight triggers—one for each of the 1, 2, 4, 8, A, B, C, and D bits in a column; and the register 368 thus, at one time, contains the contents of a single column. The data emerges from the register 368 and flows through lead 502, AND-circuit 504, and lead 512 back to the OR-circuit 514. Ordinarily, the leads 510, 508, 506, and 432 have signals on them so as to allow the free circulation of the data from the lead 502 to the lead 512 and OR-circuit 514. In this connection, the inverters 654, 764, 996, 900, 538, and 430 should be noted. As has been mentioned, at this time there is also no signal on the lead 494. Therefore, the AND-circuit 500 does not have all of its inputs satisfied; and the data flowing through the lead 502, therefore, cannot shunt the AND-circuit 504, the OR-circuit 514, and the delay line 366.

Although the entry of only the keyboard flag in the bit D position of the character P3 for each of the 96 columns of data has been described, other bits may also be entered by any suitable means into the various characters for the 96 columns circulating in the data loop including the delay line 366 and A register 368. Such additional bits may include bits 2, 4, 8, A, and B, for example, in the various characters P1, P2, P4, and P3 indicating numeric shift, lower shift, auto dup, auto skip, and end of field (see FIG. 4).

After the machine has been set for operation by energizing the initialization control logic 534, one of the data keys 132 or the space key 134 on the keyboard 128 may be depressed for the purpose of making the corresponding entry in the data for column 1 circulating through the delay line 366 and A register 368. The keyboard 128 includes encoding logic for the purpose of raising one or more of the 1, 2, 4, 8, A, and B bits. For example, the bits 1, 2, and A are raised for the letter "T" (see FIG. 1). These raised bits are transmitted through the buss 373 to the entry register 372, and the entry register 372 stores these bits in its various latches. Depression of the space key 134, incidentally, preferably does not raise any of the bits 1, 2, 4, 8, A, and B.

The keyboard 128 includes a conventional system of interlock balls that prevents the simultaneous depression of more than one of the data keys 132 or the space key 134 at a time. This interlock ball system is also under the control of the keyboard restore magnet 442 so that, when the magnet 442 is energized, the keyboard is normally operable so that a data key 132 or the space key 134 may be depressed.

In ordinary operation, the keyboard 128 and keyboard control logic 434 cooperate to first deenergize the magnet 442 so as to temporarily lock the keyboard 128 to prevent any of the data keys 132 or the space key 134 from being depressed once one of these keys has been depressed. Immediately thereafter, the keyboard control logic 434 is operative to again energize the magnet 442 so that the keyboard 128 is restored back into operative condition to allow one of the data keys 132 or the space key 134 to be actuated.

The keyboard control logic 434 also provides an "any data key" signal on the lead 438 on the depression of a data key 132 or the space key 134, and this signal is applied to the AND-circuit 444. The purpose of the AND-circuit 444 is to scan memory and more particularly the A register 368 for the presence of a keyboard flag, which is in the D position of the P3 character for each of the 96 columns, once the machine has been put into operating condition as above described. The AND-circuit 444, as above mentioned, has the inputs A REG B, P3, and bit time 4 & clock B from the leads 446, 424, and 448; and if a keyboard flag exists in a particular column, it will exist in the B trigger of the A register 368 at P3 time and at bit time 4 & clock B time. The inputs to the AND-circuit 444 will thus all be satisfied at the existence of a keyboard flag and upon depression of one of the data keys 132 or the space key 134; and thus, upon the location of a keyboard flag by the AND-circuit 444, the keyboard service latch 450 will be set. The any data key lead 438 has a signal first raised on it at column 1 time due to any suitable control of the keyboard control logic 434 by the clock 370; and, therefore, the AND-circuit 444 is effective to start examining the circulating data for a keyboard flag starting in column 1. Thus, the keyboard service latch 450 is set at column 1, P3, bit time 4, and clock B.

The keyboard service latch 450 has its output on the lead 418 applied onto the AND-circuit 404, and thus, when the keyboard service latch 450 is set and at keyboard time existing as a signal on lead 416 applied to AND-circuit 414, two of the three inputs of the AND-circuit 414 are raised.

The data in the entry register 372 provided by a depression of one of the data keys 132 (or the lack of data in the entry register 372 provided by the depression of the space key 134) is gated in serial form to the AND-circuit 414 as a third input to the AND-circuit 414. The bits 1, 2, 4, 8, A, and B in the entry register 372 are respectively applied onto the AND-circuits 374, 376, 378, 380, 382, and 384 through the leads 386, 388, 390, 392, 394, and 396; and respectively at bit times 1, 2, 4, 8, A, and B applied as signals through leads 398, 400, 402, 404, 406, and 408 on these AND circuits, these AND circuits become operative to transmit the respective bits through the OR-circuit 410 and lead 412 to the AND-circuit 414. The bits are thus serialized by these AND circuits; and the bits are transmitted in serial form at keyboard time through the AND-circuit 414, lead 518, and OR-circuit 514 to the data loop which includes the delay line 366 and A register 368.

The keyboard service latch 450 is subsequently reset at P3, bit time 2, due to the application of these timed signals on the AND-circuit 458 and thereby onto the reset side of the latch 450 through the OR-circuit 452.

The "keyboard service" signal in lead 418 is also effective on the AND-circuit 422 which also has the timing signals "P3" and "bit time D" applied to it as inputs from the leads 424 and 426. Therefore, while the "keyboard service" signal is raised and at the times P3 and bit time D, the AND-circuit 422 is satisfied and provides a signal through OR-circuit 428 to the inverter 430. Therefore, at this time, the signal on lead 432 applied to AND-circuit 504 is discontinued; and the AND-circuit 504 is ineffective for allowing flow at this particular time through the data loop to the delay line 366. At this particular time, the keyboard flag for column 1 is about to pass through the AND-circuit 504; and since the AND-circuit 504, at this particular time, is not effective for passing data therethrough, the AND-circuit 504 has the effect of erasing the keyboard flag for column 1 in the data flow through the data loop.

The "keyboard service" signal on lead 418 is also effective on the AND-circuit 420, which also has the timed input KBD from the lead 416; and, therefore, during KBD time, the AND-circuit 420 is satisfied and transmits a signal through OR-circuit 428 to the inverter circuit 430. The inverter circuit 430 has the same effect on the AND-circuit 504 as just described; and, therefore, since there is no signal in lead 432 during KBD time while the "keyboard service" signal 418 is raised, the AND-circuit 504 is effective to erase any data that may be present at this time in the keyboard character of column 1 in the data circulating through the data loop. Such data, for example, may be present due to a preceding record. Thereupon, as above described, the new data from the entry register 372 occurring because of the depression of the first data key 132 is entered into the data loop through the AND-circuit 414 and OR-circuit 514 in the keyboard character of column 1 of the data circulating through the data loop.

The actuation of a second key 132 or of the space key 134 has the effect of searching for and locating a keyboard flag in the second column of data circulating through the data loop including the delay line 366, erasing this keyboard flag, erasing any data in column 2, and also in entering the data due to the actuation of the key in the same manner as just described in connection with actuation of the first key of the keyboard 128. The AND-circuit 444 is effective in this case for searching out the first keyboard flag following column 1; and this is, of course, found in column 2. Subsequent actuation of additional data keys 132 or the space key 134 is effective in the same manner for entering data in the remainder of the 96 columns of data circulating through the data loop.

The "keyboard service" signal in lead 418 also has another function and that is with respect to the column indicator 486. The lead 418, carrying the "keyboard service" signal, is applied to AND-circuit 477. Each time that the "keyboard service" signal is provided in lead 418, the AND-circuit 477 is satisfied since, under the conditions as so far described, there is no "verify switch" signal in lead 481; and the inverter circuit 484 provides a signal in lead 483 which is one of the inputs to AND-circuit 477. The "keyboard service" signal is thus transmitted through AND-circuit 477 and OR-circuit 478 to the column indicator control 479, and the control 479 is effective through lead 485 to update the column indicator 486 for each application of the "keyboard service" signal. The column indicator 486 initially registers the digit "1"; and on the first application of the "keyboard service" signal, the column indicator 486 is updated to show the digit "2" thereon thus indicating that the next entry of data will be in column 2. Likewise, the column indicator 486 is updated for all of the 96 columns of data as the data is entered into the circulating data loop.

Thus, it is apparent that on each actuation of a data key 132 or the space key 134, a keyboard flag is located in the data circulating through the data loop including the delay line 366 and the A register 368. This keyboard flag is erased; any data in the particular column under consideration is also erased; the new data is loaded into this column position in the circulating data; and this data, along with any other data in the circulating loop, continues to circulate. In addition, the column indicator 486 is updated on each depression of a data key 132 or the space key 134. The circulation of data through the data loop is in serial form, and the data for any particular character is loaded into the entry register 372 in parallel. This data is then serialized at bit time 1 through bit time B by the AND-circuits 374, 376, 378, 380, 382, and 384 so that the data is loaded serially by bits into the data loop.

Subsequent to the entry of data into all of the 96 columns of data circulating in the data loop, the next main operation performed by the machine is to punch one of the cards 100 so that it contains punched openings therethrough corresponding to all of the 96 columns of data that have been entered into the data loop including the delay line 366. First, however, before a card 100 can be so punched, it must be fed from the hopper 144 to a position in the punch 152. Card feed is initiated by the K to P transfer latch 466; and this latch also has the effect, in general, of indicating to the logic that an entire record of 96 columns has been entered into the circulating data loop. In particular, the latch 466, in addition, causes the transfer of data entered into the keyboard sections of the data circulating through the delay line 366 into the PU or punch sections of this data, preparing the machine for punching by writing punch flags in the circulating data and writing new keyboard flags in the circulating data for the entry of the next record. The punch flags are written in the D bit position of the P2 character for each of the columns of data circulating through the delay line 366; and as previously mentioned, the keyboard flags exist in the D bit position of the P3 character for each of the 96 columns.

The K to P transfer latch is under the control of the AND-circuit 460; and this AND circuit is satisfied when the "-keyboard service" signal exists in lead 418 and at bit time 4, PU, and column 96 times derived from the clock 370. Therefore, after the entry of an entire record of 96 columns has been completed into the data loop including the delay line 366, the K to P transfer signal is raised in the lead 468; and this signal is supplied to the OR-circuit 540. As has been previously described, this OR circuit was supplied by a signal in lead 536 from the initialization control logic 534 for the purpose of writing keyboard flags in the P3 and bit time D positions of the data circulating in the delay line 366 (the "P3" and "bit time D" signals are provided to the AND-circuit 542 for this purpose); and, therefore, keyboard flags will be written in the P3, but time D positions in each of the 96 columns of data circulating through the delay line 366 in the same manner as the keyboard flags were initially written under the control of the initialization control logic 534. It will be observed that the K to P transfer latch is reset at bit time 2, PU, and column 96 since these timing signals are effective on the AND-circuit 474. The K to P transfer latch 466 is thus effective for substantially one complete memory cycle; therefore, keyboard flags are written into the data circulating through the delay line 366 for all 96 columns so that this data is in condition for the entry of new data for another record.

The "K to P transfer latch" signal in lead 468 is also applied onto AND-circuit 548, and it will be observed that the AND-circuit 548 also has the "bit time D" and "P2" timing signals applied to it from leads 426 and 550. Therefore, all of the inputs to the AND-circuit 548 are satisfied at this time; and a "-write flags" signal is thus supplied through the OR-circuit 544 at these times onto lead 522. This signal is transmitted through the OR-circuit 514 onto the lead 526 in the data loop; and since punch flags are at bit position D in character P2, punch flags are thus written in all of the 96 columns of circulating data in the delay line 366 at the same time as the keyboard flags have been rewritten as just described.

The transfer of data from the keyboard character to the punch character in each of the 96 columns of data circulating through the delay line 366 is accomplished by means of the action of AND-circuits 490 and 500. The "K to P transfer latch" signal in lead 468 is also applied onto AND-circuit 558, and this AND circuit also has the timed "KBD" signal applied to it by means of lead 416. Therefore, at each keyboard time, a signal is applied onto the lead 494 through the OR-circuit 560. Lead 494 applies a signal to the inverter circuit 492, and the inverter circuit 492 functions to discontinue one input to the AND-circuit 490 at every keyboard time while the "K to P transfer latch" signal is present in lead 468. Therefore, the output of the delay line 366 is prevented from being gated into the A register 368 at keyboard time during this period. The signal in lead 494 is also applied as one input to the AND-circuit 500; and, therefore, at keyboard time, the AND-circuit 500 is enabled and the output of the A register 368 is gated back into the input of the A register. Thus, the action of the AND-circuits 490 and 500 is to block the entry of data from the delay line 366 to the A register 368 at keyboard time and instead gate the keyboard character which is in the A register 368 at this time back into the A register during the succeeding character which is the PU or punch character. Therefore, the keyboard character has been loaded back into the PU or punch section of the particular column of data circulating in the data loop which includes the delay line 366. At the same time, however, the keyboard character is being gated back into the input end of the delay line 366 by means of the lead 502, AND-circuit 504, lead 512, OR-circuit 514, and lead 526. Therefore, actually, the data existing previously only in the keyboard character is located both in the keyboard character and the punch column under consideration. This transfer of data continues for the entire time of 96 columns during which the K to P transfer latch 466 is set. As has been previously mentioned, the AND-circuit 420 is effective for erasing the keyboard data just prior to the entry of new keyboard data by the actuation of another data key 132 or space key 134.

The "K to P transfer latch" signal in lead 468 also has the effect of setting the pick roll latch 564 through the OR-circuit 566. A signal is thereby produced in lead 580 for the purpose of energizing the pick roll magnet 182, and the constantly rotating pick roll 146 is dropped onto the uppermost card 100 in the hopper 144. The card is then fed out of the hopper toward the transport roll 148 and the card sensor 150. The card sensor 150, when uncovered by a card 100, provides a "-card sensor" signal in lead 578; and when the card 100 is fed from the hopper 144 and covers the sensor 150, this signal is discontinued. The card sensor lead 578 is connected with the inverter circuit 576; and when the "card sensor" signal disappears with coverage of the card sensor by a card 100, a signal is applied through the lead 574 onto the reset side of the pick roll latch 566 which is reset at this time. The pick roll magnet 182 is thus deenergized; and the pick roll 156 is lifted off the card 100 being fed through the transport. Further movement of the card to the primary incrementer wheel 154 is maintained by the feed roll 148.

The primary incrementer latch 582 has its set side connected with the lead 580 constituting the output of the pick roll latch 564, and the incrementer latch 582 is set at the time the pick roll latch 564 is set. The primary incrementer latch 582, when set, provides an output signal through its lead 592 in order to energize the primary incrementer magnet 232; and the primary incrementer roll 226 is lifted so that if a card were to reach the primary incrementer wheel 154 at this time, the card would not be moved by the wheel 154. The transport roll 148 and its cooperating roll 190 move the card 100 passing through the transport through the punch 152 and into contact with the pole piece 204 which constitutes a registration gate for the card. The cam 194 swings downwardly at this time to hold the card 100 firmly in position against the pole piece 204. The pole piece 204 at this time is energized due to the action of the gate latch 600. The gate latch 600 is under the control of the AND-circuit 602, and the AND-circuit 602 is enabled by the "pick roll latch" signal in lead 580 and by the "card sensor" signal in lead 578. The card at this time has cleared the card sensor 150 so that light again shines on the phototransistor 202 whereby the "card sensor" signal appears on lead 578 and the gate latch 600 is set.

At this time, the "card sensor" signal appears in lead 578, since the card 100 has cleared the card sensor 150; and the "-card sensor" signal is applied on AND-circuit 594 along with the output of the primary incrementer latch 582, the "punch dwell" signal in lead 590, and the "bit time 1" signal in lead 398. The "punch dwell" signal is a pulse from the punch emitter 286 that indicates a start of dwell of the card 100; that is, it is the beginning of the time in which motion of the card 100 has ceased and the card is stationary in the transport. The AND-circuit 594 thus generates a signal in lead 598 that may be termed "punch start"; and this is the signal, as will be described, that is used to initialize the punch control logic 358. Punching initially takes place at the time of the first dwell of the card 100 (after the dwell of "punch start"), and subsequent punchings in the additional columns takes place during other incremental dwell times which are caused by the primary incrementer wheel 154 and roll 226. The primary incrementer wheel 154 and roll 226 continue to increment the card 100 through the transport as punching continues.

The "card sensor" signal is provided as an input on the AND-circuit 588, and the "punch dwell" signal on lead 590 is also an input to this AND circuit. When the "punch dwell" and "card sensor" signals are on the leads 590 and 578, and at bit time B (applied as a signal by means of lead 408 onto AND-circuit 588), the AND-circuit 588 is effective through lead 586 and OR-circuit 584 to reset the primary incrementer latch 582. The "primary incrementer latch" signal in lead 592 is thus discontinued to deenergize the primary incrementer magnet 232 so that the primary incrementer roll 266 contacts the card 100.

The signal "punch start" on the lead 598 is applied on the set side of the punch op latch 624 through AND-circuit 626 (see FIG. 14). The lead 628 also applied on AND-circuit 626 at this time has a signal on it since the read key 570 is not actuated and the read op latch 822 is in its reset condition; and, therefore, the AND-circuit 626 is satisfied to set the latch 624 indicating that a punch operation is in effect. The output of the latch 624 is applied by means of a lead 632 onto the AND-circuit 634; and the AND-circuit 634 also has the output of the stop search latch 642, the "transport sync" signal in lead 638, the "A REG B" signal in lead 446, and the timing signals "P2" and "bit time 4 & clock B" in leads 550 and 448 applied to it. The function of the AND-circuit 634 is to search for a punch flag in bit D position of the P2 character of the data circulating through the delay line 366, and the AND-circuit 634 starts this functioning in column 1 for the same reasons and under the same controls as the AND-circuit 444 starts searching for keyboard flags beginning in column 1. The stop search latch 642 at this time is not set, and it provides a signal onto the AND-circuit 634 through the lead 640. The "transport sync" signal also exists at this time in lead 638, and this signal is applied from latch 870 in the read section 362. It will be noted that the latch 870 is set by a signal from AND-circuit 872, and the AND-circuit 872 is satisfied when a "punch dwell" signal exists in lead 590 and at column 1 time supplied as a signal through lead 682. It will be noted, therefore, that the latch 870 is set at column 1 time; and this latch is reset at column 96 time. The function of the latch 870 in this connection is to assure that the AND-circuit 634 does not look for punch flags arbitrarily but only during the time that the card 100 is going through a dwell cycle. Therefore, the search for the punch flags will occur only once during each dwell or increment cycle of the card 100 through the transport. Under these conditions, if a punch flag exists in column 1, it will appear in the B trigger position of the A register 368 at P3 time, bit time 4, and clock B time. Under these conditions, with a punch flag existing, the AND-circuit 634 has its inputs satisfied and provides a signal on the punch flag latch 636 to set this latch.

At the time of satisfaction of the inputs of the AND-circuit 634 and prior to this time, the latches $690_1$ to $690_{18}$ are put into and assured to be in reset condition. Resetting of the latches $690_1$ to $690_{18}$ is under the control of the "transport sync" signal in lead 638 derived from the transport sync latch 870 as just described, and the AND-circuit 678 also has the timing signals "P2" and "column 1" applied to it through leads 550 and 682. Therefore, under punch dwell conditions and at these times, the AND-circuit 678 provides a "reset punch store" signal in lead 684 applied to the reset sides of each of the latches $690_1$ to $690_{18}$.

Upon satisfaction of the AND-circuit 634, with a punch flag being located in column 1 of the data circulating through the delay line 366, the punch flag latch 636 is set and provides a signal in its output lead 650. The lead 650 constitutes an input to AND-circuit 652, and the function of the AND-circuit 652 is to erase the punch flag just discovered. The AND-circuit 652 has the timing signals "P2" and "bit time D" applied to it from leads 550 and 426; and, therefore, when the latch 636 is set and at these times, the AND-circuit 652 is satisfied and provides a signal in lead 644. Under ordinary conditions, the inverter circuit 652 provides a signal through lead 510 to AND-circuit 504 in the memory and control section 352; and when a signal is thus provided on lead 644, the inverter circuit 654 functions to discontinue the signal in lead 510 so as to inhibit the output of AND-circuit 504 in the circulating data loop. Therefore, at bit time D and P2 time (which is in correspondence to the location of the punch flag in the circulating data for column 1 in the data loop), the AND-circuit 504 is disenabled; and the punch flag does not pass through the AND-circuit 504 and is thereby erased.

The "punch flag latch" signal in lead 650 is also applied onto the AND-circuit 668 which is for the general purpose of gating the data contained in the punch sections of the data circulating through the data loop into the punch register latches $690_1$ to $690_{18}$. The AND-circuit 688, in addition to the "punch flag latch" signal in lead 650, also has applied to it the timing signals "bit time 1 & clock B" and "PU"; therefore, at these times with the latch 636 set, a "load punch store" signal is supplied by the AND-circuit 668 to the lead 672. The lead 672 is applied to each of the AND-circuits $692_1$ to $692_{18}$, and these AND circuits will be enabled in accordance with the other signals supplied to the AND circuits.

The timing signals "tier 1 latch," "tier 2 latch," and "tier 3 latch" are applied respectively to AND-circuits $692_1$ to $692_6$, AND-circuits $692_7$ to $692_{12}$, and AND-circuits $692_{13}$ to $692_{18}$ as shown. The "tier 1 latch" signal is provided in lead 704 from the tier 1 latch 694, and this latch is set when the inputs to the AND-circuit 702 are present—these inputs being the timing signals "column 96," "PR," and "bit time 4" from leads 464, 648, and 402. The "tier 2 latch" signal in lead 712 is provided by the tier 2 latch 696 under the control of AND-circuit 708, and this AND circuit is enabled at the times of column 32, PR, and bit time 4 as determined by the signals in leads 710, 648, and 402 to set the latch 696. The signal from AND-circuit 708 applied on the latch 696 is present in lead 706, and this lead also is applied on the reset side of the tier 1 latch 694 so that the " tier 1 latch" signal is effective for the first 32 column times of clock 370. The tier 3 latch 698 is similarly set at column 64, PR, and bit time 4 by virtue of the AND-circuit 716; and the output of the AND-circuit 716 is on the lead 714 which is connected to the reset side of the tier 2 latch 696. Similarly, therefore, the "tier 2 latch" signal in lead 712 is effective for the duration of columns 33 through 64 from clock 370. A similar analysis of the action of the tier 3 latch 698 indicates that the "tier 3 latch" signal in lead 720 is effective for column times 65 to 96. As will be noted from FIG. 1 showing the card 100, the card has columns 1 to 32 in the first tier, columns 33 to 64 in the second tier, and columns 65 to 96 in the third tier; and the latches 694, 696, and 698, as will hereinafter appear from further discussion, are applicable to these three tiers. Only one of the three latches 694, 696, and 698 will be set at any given time; and they are set only during the time that the columns of data in the data circulation loop apply to the specific tier with which these latches are labeled. These latches, as will hereinafter appear, distinguish the columns of data which are serially loaded in the delay line 366 and A register 368 and determine which columns of data apply to the three tiers, so that the data is read out of the data circulation loop in a parallel condition.

Data is loaded initially from column 1 of the data circulating through the delay line 366, and the tier 1 latch 694 is initially the one of the tier latches that is set. The "tier 1 latch" signal in lead 704 is applied to the latches $690_1$ to $690_6$ in the tier 1 punch register $689_1$, and therefore, the latches $690_1$ to $690_6$ are those latches which receive data initially. The AND-circuits $692_1$ to $692_6$ respectively have the "A REG 1," "A REG 2," "A REG 4," "A REG 8," "A REG A," and "A REG B" signals thereon, together with the "tier 1 latch" signal and the "load punch store" signal in lead 672 thereon. Therefore, at this time, the latches $690_1$ to $690_6$ respectively have the data transferred to them that is in the 1, 2, 4, 8, A, and B positions in the A register 368. For example, if there is a bit in the 2 position of the A register 368, this information will be transferred to the latch $690_2$; and the latch $690_2$ will be set. Thus, the data in column 1 has been loaded into the latches $690_1$ through $690_6$.

As previously described, the AND-circuit 652 when provided with a signal from the punch flag latch 636 was effective to erase a punch flag; and this flag was the flag for column 1. The signal from the AND-circuit 652, which may be termed the "erase punch flags" signal, is also applied onto the stop search latch 642; and the purpose of the latch 642 is to prevent the immediate search, subsequent to the location of the column 1 flag, for any further punch flags by means of AND-circuit 634. When the stop search latch 642 is set, the signal provided on the lead 640 from this latch is discontinued; and the AND-circuit 634 is disenabled.

The stop search latch 642 has the signal "tier reset" applied to it on its reset side by means of lead 646, and this signal is derived from the OR-circuit 888 in the read section 362. As will be observed, the "column 32," "column 64," and "-column 96" timed signals are applied to the OR-circuit 892; and, therefore, after the search has been completed for column 1, a signal is provided on the lead 890 by means of the OR-circuit 892; and the "tier reset" signal is supplied to the lead 646 and to the latch 642 at column 32, PR time, by means of AND-circuit 888. The application of the "tier reset" signal on the latch 642 resets the latch 642 so that the signal in lead 640 reappears and reenables the AND-circuit 644 so that it can resume its function to search for punch flags.

The punch flag scanning AND-circuit 634 is then effective to look for a punch flag starting in column 33. In the case given, a punch flag is located in column 33; and the punch flag latch 636 is set. The latch 636 functions similarly as for column 1 to erase a punch flag, which is in column 33 in this case, and to generate a "load storage" signal in lead 672. At this time, however, the tier 2 latch 696, instead of the tier 1 latch 694, is set; and, therefore, the data from the 1, 2, 4, 8, A, and B positions in the A register 368 is gated into the punch register $689_2$ for the second tier. This gating is similar to the gating of the column 1 data into the latches $690_1$ to $690_6$ but occurs for the latches $690_7$ to $690_{12}$ in view of the fact that the "tier 2 latch" signal in lead 712 is effective on the latches $690_7$ to $690_{12}$. In this case also, for column 33, the stop search latch 642 is set so as to suspend the search for punch flags by the AND-circuit 634. The stop search latch 642 is reset by the "tier reset" signal in lead 646; and this occurs at column 64, PR time, due to the action of the OR-circuit 892 and the AND-circuit 888.

The data for column 65 is transferred into the latches $690_{13}$ to $690_{18}$ of the punch register $689_3$ for the third tier in the same manner as the data was transferred into the latches $690_1$ to $690_{12}$ for the first two tiers; and, therefore, the 18 punch latches $690_1$ to $690_{18}$ are now loaded with data which applies to the three aligned columns 1, 33, and 65 in the first incremented position of the card 100 as it passes through the transport. At this time, the further search for punch flags by the AND-circuit 634 is discontinued in view of the fact that the transport sync latch 870 is reset at column 96 time due to the application of the timed "column 96" signal onto the latch 870 by means of the lead 464. The "transport sync" signal therefore is discontinued in the lead 638 applied onto the punch flag searching AND-circuit 634; and the AND-circuit 634 will not be able to search further for punch flags until another "punch dwell" pulse occurs that indicates that the card 100 has moved to the next incremented position.

The punch registers $689_1$, $689_2$, and $689_3$ are now loaded with data ready for punching; and this data is gated to the punch drivers $686_1$ to $686_{18}$ by means of the AND-circuits $688_1$ to $688_{18}$. These AND-circuits are enabled by means of a signal on lead 666 from the punch gate latch 660, and the latch 660 is set by the "punch op" signal in lead 632 from the punch op latch 624 which, as previously mentioned, indicates that a punch operation is in effect. The signal in lead 632 is applied along with a "punch on" signal in lead 614 to the AND-circuit 658 which is on the set side of the latch 660 for this purpose. The signal "punch on" from the punch emitter 286 and from the punch emitter amplifiers 608 indicates the time during the card motion cycle at which the punch magnets $220_1$ to $220_{18}$ should be energized for proper punching while the card 100 is stationary. The output of the punch gate latch 660 is reset by the "punch off" signal in lead 612 which is also derived from the emitter 286 and the amplifiers 608—the signal "punch off" indicating that the time has arrived at which the magnets $220_1$ to $220_{18}$ should be deenergized for proper withdrawal of the punches 210 while the card 100 is still stationary.

When the AND-circuits $688_1$ to $688_{18}$ are satisfied, they energize the punch drivers $686_1$ to $686_{18}$ and energize the corresponding magnets $220_1$ to $220_{18}$ so as to cause the corresponding punches 210 to make perforations through the card 100. As is apparent, only those of the latches $689_1$ to $689_{18}$ are set which correspond to bits in the circulating data in the delay line 366 in columns 1, 33, and 65; and, therefore, only those of the punches $220_1$ to $220_{18}$ that correspond also to these bits are energized to cause corresponding holes to be punched in the card 100. Therefore, the aligned columns 1, 33, and 65 in the particular bit positions corresponding to the bits existing in columns 1, 33, and 65 of the circulating data in the delay line 366 have been punched; and the punching of these aligned columns in the first incremented position of the card 100 has been completed.

The punching for the remaining columns 2 to 32 in the top tier and for the aligned columns 34 to 64 and columns 66 to 96 in the second and third tiers proceeds in the same manner as the punching occurred for the first three columns 1, 33, and 65. The punching for each incremental movement of the card 100 to successive column positions by means of the first incrementer wheel 154 is controlled in particular by the transport sync latch 870. This latch is reset for each memory pass by means of the timed "column 96" signal applied through lead 464 on the reset side of the latch 890; and since the card is next incremented to the second incremental position in which columns 2, 34, and 66 are in alignment with the punches 210, the transport sync latch 870 is again set by the "punch dwell" signal applied to the AND-circuit 872 by means of lead 590. The "transport sync" signal is thus applied by means of lead 638 on the AND-circuit 634; and the AND-circuit 634 again starts its search for punch flags in the recirculating data in the circulating data loop including the delay line 366 starting in column 1. In view of the fact that the punch flags in columns 1, 33, and 65 have been erased in the recirculating data, the first punch flag located by the AND-circuit 634 will be in column 2; and subsequently, the punch flags for columns 34 and 66 will be located by the AND-circuit 634. The punch registers $689_1$, $689_2$, and $689_3$, are loaded with the data in columns 2, 34, and 66 of the data circulating through storage 366; and punching of this data will occur by means of the magnets $220_1$ to $220_{18}$ in columns 2, 34, and 66 of the card 100 in the same manner as the data was punched into columns 1, 33, and 65. The transport sync latch 890 controls the subsequent punching of data into the succeeding columns of the card 100 in the same manner while the card is being moved through the transport by the primary incrementer wheel 154 until the three last aligned columns 32, 64, and 96 have been punched.

When the punch operation in columns 32, 64, and 96 is being completed, the "punch flag latch" signal exists in lead 650; and at PR and column 96 times, the AND-circuit 674 has its inputs satisfied so that it produces a "punch complete" signal in lead 630. This lead is applied onto the reset side of the punch op latch 624 so that this latch is reset, thus ending the punching operation including the search for data during the punching operation.

The lead 630 is also applied onto the set side of the print start latch 732, and this latch is set to provide a "print start" signal on its output lead 556. The print start latch 732 has functions very similar to those of the K to P transfer latch 446 in connection with the punch operation. The purposes of the print start latch 732 are to write print flags in every column in memory (in bit position C of character P2 for each column), and it also causes data to be transferred from the PU or punch sections of the data circulating through the delay line 366 to the print sections of this circulating data for the purpose of printing.

Print flags are written particularly due to the action of the AND-circuit 552 (see FIG. 13). The "print start" signal in lead 556 is applied to the AND-circuit 552 along with the "P2" and "bit time C" timing signals, and this generates the signal "write flags" in lead 522 at these times. The "write flags" signal is applied on OR-circuit 514; and, therefore, the print flags are written in bit position C of character P2 for each of the 96 columns of data circulating through the delay line 366—this writing of flags being similar to the writing of keyboard and punch flags previously described.

The print start latch 732 also has the function of transferring data from the PU to the PR positions in the circulating data in the delay line 366; and this function is particularly due to the action of the AND-circuit 562 (see FIG. 13). The AND-circuit 562 has the "print start" signal in lead 556 and the timed "PU" signal in lead 462 applied to it as inputs, and the AND-circuit 562 is effective for transferring the data from the PU to the PR characters in the recirculating data in the same manner as the AND-circuit 558 was effective to cause a transfer of data from the KBD characters to the PU characters as previously described. For this purpose, as is apparent, the timing signal "PU" from lead 462 is used on the AND-circuit 562 instead of the timed "KBD" signal that is used on the AND-circuit 558 for transferring data from the KBD to the PU characters. In particular, the AND-circuit 562 functioning with the AND-circuit 490 inhibits the output of the delay line 366 at PU time and functioning with the AND-circuit 500 gates the output of the A register 368 back to its input thus completing a transfer of data from a PU character to a PR character of the data circulating through the delay line 366.

After having accomplished the transfer of data from the PU characters to the PR characters in the data circulating through the delay line 366 and having written print flags in the bit C positions of the P2 characters of this circulating data, the print op latch 744 is set at the following column 96 time and PU time. The AND-circuit 742 is effective for this purpose and has the "print start" signal in lead 556 and the "P2" and "-column 96" timing signals in leads 550 and 464 applied to it for this purpose. The print op latch 744 when set indicates that a print operation is being performed. When the latch 744 is set, its output on lead 738 is applied onto the AND-circuit 734 which also has the timed "column 1" and "P1" signals applied to it from leads 682 and 736. The print start latch 732 is thus reset so as to end the data transfer operation from the PU characters to the PR characters and so as to end the flag writing operation utilizing the AND-circuit 562.

The printing operation is quite similar to the punching operation in that three columns of data must first be located in the data circulating through the delay line 366 for each triad of aligned columns on the card 100. This function is accomplished by the AND-circuit 748 which searches for the print flags located in bit position C of character P2 in the columns of data circulating through the delay line 366. The AND-circuit 748, in addition to inputs from the print op latch 744 and the stop search latch 756, has the "transport sync" signal from lead 638, the signal from the C trigger of the A register 368 in lead 752, and the timing signals "P2" and "bit time 1 & clock B" from leads 550 and 670 applied to it as inputs. The latch 756 is in its reset condition at this time and thus supplies a signal on lead 754. The AND-circuit 748 thus has substantially the same inputs as the AND-circuit 634 which functions to search for punch flags except that the C trigger of the A register 368 is examined instead of the B trigger; and, therefore, the AND-circuit 748 searches for print flags. This search begins in column 1 under the same controls as those provided for the AND-circuit 634 searching for punch flags and the AND-circuit 444 searching for keyboard flags.

When the first print flag in bit position C of character P2 in column 1 of the data circulating through the delay line 366 is located, all of the inputs of the AND circuit 748 are satisfied; and the print flag latch 750 is set. A signal is thus provided on lead 760, and this signal is applied onto the AND-circuit 762 which has the additional timing signals "P2" and "bit time C" applied thereto from leads 554 and 550. The AND-circuit 762 is therefore satisfied at P2 time and bit time C and provides an "erase print flags" signal in lead 758. Due to the inverter circuit 764, a signal ordinarily is raised in lead 510; however, when the "erase print flags" signal appears in lead 758, the signal on lead 510 which is applied on AND-circuit 504 (see FIG. 13) is discontinued. Therefore, at bit time C and P2 time, the AND-circuit 504 does not have all of its inputs satisfied and is effective to inhibit or erase the print flag in bit position C of character P2 in column 1 of the data circulating through the delay line 366. The signal "erase print flags" on lead 758 is also applied to set the stop search latch 756; and, therefore, the signal in lead 754 is discontinued so that the AND-circuit 748 is suspended from its operation in searching for print flags at this time.

During the time the AND-circuit 748 is effective for searching for the first print flag and prior thereto, the print registers $770_1$, $770_2$, and $770_3$ are reset. This resetting operation occurs once for each increment that the card 100 travels and is under the control of the AND-circuit 776. The AND-circuit 776 has the "transport sync" signal from lead 638 and the timing signals "P1" and "column 1" from leads 736 and 682 applied to it as inputs; and, therefore, just prior to a printing operation in columns 1, 33, and 65 (and just prior to printing in any others of the aligned columns in tiers 1, 2, and 3 of card 100) the AND-circuit 776 provides a signal on lead 778. This signal is supplied onto the reset sides of the latches in the print registers $770_1$, $770_2$, and $770_3$, for example, on the latches $780_1$ to $780_6$ of the register $770_1$ so as to reset these latches.

Subsequently, at bit time 1, clock B, and PR times applied as signals on leads 648 and 670 on AND-circuit 766 and subsequent to setting of the latch 750, the AND-circuit 766 is effective to generate the signal "load print store" in lead 768. The "load print store" signal in lead 768 conditions each of the latches in the print registers $770_1$, $770_2$, and $770_3$ for operation; and the latches $780_1$ to $780_6$ are loaded from the 1, 2, 4, 8, A, and B triggers of the A register 368 so as to contain in effect the corresponding data bits in the PR character of column 1 of the data circulating through the delay line 366. The construction and operation of the print register $770_1$ is very similar to that of the punch register $689_1$.

The loading of the circulating column 33 print data and of the column 65 print data from the data circulating through the delay line 366 into the print registers $770_2$ and $770_3$ takes place substantially in the same manner as the registers $689_2$ and $689_3$ are loaded with punch data as previously described. The stop search latch 756 functions in the case of printing in the same manner as the stop search latch 642 functions for punching—the resetting of both of these latches being under the control of the OR-circuit 892 having the "column 32," "-column 64," and "column 96" timing signals applied thereto so as to select the print flags in columns 33 and 65 and the corresponding data in these columns from the circulating data for loading the column 33 and column 65 data into the print registers $770_2$ and $770_3$. In particular, the "tier reset" signal on lead 646 resets the stop search latch 756 so that a signal appears on lead 754 and conditions the AND-circuit 748 to search for a print flag in column 33. The AND-circuit 748 locates the flag in column 33, loads the data from column 33 into the print register $770_2$ utilizing the AND-circuit 766, erases the print flag in column 33 utilizing the AND-circuit 762, and sets the stop search latch 756 so as to suspend the search for further print flags until the "tier reset" signal in lead 646 again appears for the column 64 time. The stop search latch 756 is reset in column 64 so that the AND-circuit 748 is effective for searching for a print flag in column 65, and the AND-circuit 748 is effective to cause the erasing of the column 65 print flag and to load the column 65 data into the print register $770_3$ in the same manner as such erasing and data loading occurred for the other columns. The registers $770_2$ and $770_3$ are respectively conditioned to receive the tier 1, tier 2, and tier 3 data similarly as are the registers $689_1$, $689_2$, and $689_3$ since the "tier 1 latch" signal, the "tier 2 latch" signal, and the "tier 3 latch" signal in leads 704, 712, and 720 are respectively applied onto the latches for the print registers $770_1$, $770_2$, and $770_3$ preliminary to printing this information onto the card 100.

Printing occurs in a slightly different manner than does punching in view of the fact that there are only three print hammers 258 as compared to the 18 punches 210 while in the case of both punch and print, there are three registers and 18 latches in these registers—the punch registers being $689_1$, $689_2$, and $689_3$ and the print registers being $770_1$, $770_2$, and $770_3$. In the case of printing, the contents of the print register $770_1$ is printed in print column 1; the contents of the print register $770_2$ is printing in print column 33; and the contents of the print register $770_3$ is printed in print column 65. As previously mentioned, the printing mechanism includes the three print rows 252, 254, and 256 which are respectively for printing print lines 1, 2, and 3 together with a hammer 258 for each of the print rows. These print rows 252, 254, and 256 each have 63 characters and a blank on its peripheries, and they continuously rotate. In order to print, therefore, it is necessary that the print wheel be synchronized with motion of the corresponding print hammers so that the print hammer strikes the periphery of the print wheel at the time that the particular character to be printed is in correspondence with the hammer. This is accomplished using the compare circuits 788, 792, and 796.

The buss 800, carrying the output of the print counter 798, is connected with each of the compare circuits 788, 792, and 796. The counter 798 is a binary counter which counts from 0 through 63; and its output is a bit pattern with a 1, 2, 4, 8, A and B bit configuration. The bits 1, 2, 4, 8, A, and B are respectively provided on the leads 802, 804, 806, 810, and 812 which together constitute the buss 800. The characters on the print wheel are arranged sequentially from 0 to 63; and each of these characters corresponds to different combinations of bits 1, 2, 4, 8, A, and B. The counter 798 is under the control of print emitter 296 and the print emitter amplifiers 618; and, under the control of the print emitter 296, the amplifiers 618 produce one "print home" signal in lead 620 for each revolution of the print wheel 251 and produce 64 "print character" signals on the lead 622 for each revolution of the print wheel. The "print home" and "print character" signals are applied onto the counter 798, and the counter is stepped one time for each of the "print character" signals. The "print home" signal is effective on the counter 798 so as to synchronize the output of the counter in buss 800 with particular characters on the peripheries of the print wheels.

The arrangement of bits in the output of the counter 798 is such that, if these bits are matched with the bits contained by any of the registers $770_1$, $770_2$, and $770_3$, the particular characters on the peripheries of the print wheel, corresponding to the contents of the registers $770_1$, $770_2$, and $770_3$ will appear opposite the respective print hammers 258 when the print hammers 258 strike the printing wheel peripheries.

The contents of the register $770_1$ in the bit pattern 1, 2, 4, 8, A, and B are applied by means of the buss 786 by means of the compare circuit 788; and likewise, the output of the counter 798 in the same bit pattern is applied through buss 800 on the compare circuit 788. When the bit patterns provided by the two busses 786 and 800 are the same, the compare circuit 788 produces a signal on the print driver 814 which, in turn, energizes the magnet $260_1$ so as to move the corresponding print hammer 258 into contact with the print wheel 252 that is in alignment with column 1, print line 1 on the card 100. Therefore, the character on this print row that corresponds to the contents of register $770_1$ is printed on the card 100 in column 1, print line 1. In like manner, the contents of print registers $770_2$ and $770_3$ functioning with the respective compare circuits 792 and 796, magnet drivers 816 and 818, and magnets $260_2$ and $260_3$, causes the printing of the characters in print columns 33 and 65 in print lines 2 and 3 on the card 100 that correspond to the contents of registers $770_2$ and $770_3$.

Printing for the other columns on the card 100 occurs in the same manner as for print columns 1, 33, and 65. Since the AND-circuit 762 has been effective to erase the print flags for columns 1, 33, and 65 in the data circulating through the delay line 366, the AND-circuit 748, which functions to search for print flags beginning in column 1, is not effective for searching for the second column of data until the second print flag is located which occurs in column 2 of the data circulating through the delay line 366. The AND-circuit 748 is under the control of the "transport sync" signal in lead 638; and this signal does not exist until the next "punch dwell" signal appears in lead 590 which, as previously described, occurs at the start of a dwell of the card 100; and the search for print flags does not start until the card 100 is in its second incremented position in the card transport. Thus, all of the 96 print columns are printed with the characters corresponding to the contents of the 96 columns of data circulating through the delay line 366.

At this time, the AND-circuit 820 has all of its inputs satisfied. The print flag latch 750 is operative at column 96 time to produce a signal on its output lead 760; and, therefore, at PR time and column 96 time provided as signals on AND-circuit 819 through leads 648 and 464, the AND-circuit 819 is satisfied and produces a "print complete" signal on lead 746. These three inputs to the AND-circuit 819 indicate that the next character from the data circulating through the delay line 366 is now being loaded into the register $770_3$; therefore, the AND-circuit 819 and its "print complete" signal 746 at this time terminates the printing operation by resetting the latch 744. Therefore, all of the characters circulating within the data loop including the delay line 366 have now been punched and printed.

Insofar as the card transport is concerned, at some time during the printing operation, the trailing edge of the card 100 will have passed out from between the primary incrementing wheel 154 and roll 226, and the secondary incrementing wheel 164 and roll 266 are active to move the card 100 through additional increments. The card is moved through the complete 33 increments necessary for printing and then passes between the stacker shoe 282 and the stacker wheel 284, and the wheel 284 drives the card into the stacker 166. Additional cards 100 are punched and printed with data from the keyboard 128 in the same manner, and these additional cards 100 also enter the stacker 166 behind the preceding card or cards to form a stack. The cards move into the stacker 166 and are held in stacked relationship by the tray back 278 which is under the influence of the spring 280.

After the document card 100 has been punched and printed as above described, the machine may be used for verifying the card, particularly for determining whether or not the correct characters have been punched into the card. This is done by placing the card in the hopper 144 as the top card in the hopper; and then after the card has been fed from the hopper 144 into the card transport mechanism, the operator may use the original source document in order to rekey the characters. If the characters that are rekeyed in the verify operation are identical with those that have been punched in the card, verification has been accomplished; and the notcher 160 is then effective to put a small notch into the card indicating that it has been verified.

After the punched card 100 has been put into the hopper 144 as the top card thereof, in order to begin the verify operation, the read key 570 is actuated. The read key 570 provides the "read key" signal in lead 568, and this has the effect of setting the pick roll latch 566 (see FIG. 13) by means of OR-circuit 566, so that the pick roll 146 is lowered onto the card in the hopper 144 similarly as in the above-described case in which the card is about to be punched; and the card is fed by the pick roll 146 and transport roll 148 to the gate pole piece 204 of the gate 156. The gate latch 600 is set as in the punch operation, and the pole piece is magnetically held engaged with the deck 170 so that the card 100 is registered at column 0 in the punch station and is located over the punches 210.

Depression of the read key 570 also has the effect of setting the read op latch 822 (see FIG. 13) which has the read key lead 568 connected to it on its set side indicating that a read operation is in effect. A "read op" signal is thereby provided on the lead 828, and this signal is applied to AND-circuit 832. AND-circuit 832 also has the "punch start" signal applied to it by means of lead 598 which at times carries this signal, and the "punch start" signal is present at this time due to the fact that the primary incrementer latch 582 is set similarly as when a punch operation is proceeding as above described. The "-punch start" signal indicates that the card is registered in the punch station at column 0 in contact with the pole piece 204; and, in the read operation which will presently take place, operations will begin on the card in some manner beginning with this position. In the case of punching the card, punching begins at this station as above described; however, in the case of reading, the card must be incremented 13 more columns before it reaches the read station.

The AND-circuit 832 thus has its two inputs satisfied at this time and provides a "start read transport counter" signal on lead 840 through OR-circuit 834. The read transport counter 842 thus is energized and begins operation. The counter 842 is basically a binary counter that counts increments; and as previously described, it is driven by the "punch dwell" signal in lead 590 which is a signal indicating each time that the card 100 reaches a dwell.

After the counter 842 has counted 13 dwells, it produces the signal "13 increments after PU start" in lead 844; and this signal is applied on the AND-circuit 846 along with the timed signal "column 1" in lead 682. The write read flag latch 848 is thus set at this time, 13 increments after the card has left its column 0 position, producing a signal in lead 850 which is applied onto AND-circuit 852. The AND-circuit 852 has the timed signals "P1" and "bit time C" applied thereto as inputs from leads 736 and 554; and, therefore, a "write read flags" signal in lead 516 is produced at P1 time and bit time C. Referring to FIG. 4, read flags are located at bit position C in the P1 character in each of the columns of data circulating through the delay line 366; and the "write read flags" signal in lead 516 has the effect of writing such a flag in column 1, the signal in lead 516 being transmitted through the OR-circuit 514 onto lead 526 and thereby into the data loop. Similarly, read flags will be written in columns 2 through 96 at bit C position in character P1 in the data circulating through the delay line 366 under the action of the AND-circuit 852 which is effective at each bit time C and P1 time. At the end of one memory cycle, the timed signal "column 96" applied by lead 464 to the reset side of the write read flag latch 848 functions to reset the latch 848 so that the AND-circuit 852 is inoperative at this time for writing read flags.

After read flags have thus been written into the 96 columns of data circulating through the delay line 366, the system is now ready for reading data from the card 100. The signal "13 increments after PU start" in lead 844 is also applied to the read start latch 854, and this latch is set. The latch 854 provides a "read start" signal in lead 860 which is applied to AND-circuit 862, and the AND-circuit 862 is thereupon effective for searching for a read flag. The AND-circuit 862 also has the "not stop search latch" signal in lead 868 applied to it, and this signal is raised at this time. In addition, the "transport sync" signal in lead 638 is applied to the AND-circuit 862; and this signal is raised at this time after an incremental movement of the card 100. The timed signals "PR" and "bit time D & clock B" are also applied to the AND circuit through leads 648 and 866 along with the "A REG D" signal in lead 864 derived from the D trigger in the A register 368. A print flag will exist in the D trigger position of the A register 368 at PR time, bit time D, and clock B time. Therefore, the AND-circuit 862, on thus searching for a read flag, locates such a read flag and has all of its inputs satisfied. This searching operation by the AND-circuit 862 starts in column 1 of the data circulating through the delay line 366 due to the same reasons and mechanism applicable to the AND-circuit 446 which is effective for searching for keyboard flags as above mentioned.

The AND-circuit 862 on thus locating a read flag at position C of character P1 of column 1 of the data circulating through the delay line 366 sets the read flag latch 870. A "read flag latch" signal is thus provided on lead 882, and this signal is applied onto the two AND-circuits 896 and 902. The purposes of these two AND circuits are to erase the read flag in column 1 and also to erase the old data in the punch section of column 1 of the data circulating through the delay line 366 in view of the fact that it is the punch section of the circulating data into which data is read during the read operation.

The AND-circuit 896 provides a signal through OR-circuit 898 onto the inverter circuit 900. The AND-circuit 896 also has the timed signals "P1" and "bit time C" effective thereon from leads 736 and 554; and, therefore, while the read flag latch 870 is set, the AND-circuit 896 provides a signal through OR-circuit 898 onto the inverter circuit 900 during P1 time and bit time C. The output of the inverter circuit 900 generally is raised; however, when the AND-circuit 896 is thus effective, the signal on lead 508 ceases so that the AND-circuit 504, during P1 time and bit time C, is inhibited. The AND-circuit 504 thus blocks the output of the A register 368 at P1 time and bit time C and thus inhibits and erases the read flag in column 1 that existed at bit time C in character P1 in this column.

The AND-circuit 902 has the same effect as the AND-circuit 896 except that it is operating during PU time instead of P1 time and bit time C. The AND-circuit 902, therefore, causes the erasing and inhibiting of all of the data in the PU character for column 1 of the data circulating through the delay line 366 thus erasing any old data in the PU section of column 1.

The "read flag latch" signal in lead 882 is also effective utilizing the AND-circuit 904 to cause the reading of data from the punched holes in column 1 of card 100 into the PU section of the data circulating through the delay line 366. At this time, column 1 of card 100 is located over the phototransistors $234_1$ to $234_6$; and a signal is applied onto the transistor 908 from the tier 1 latch 694 through the lead 704. Therefore, if punched holes appear in column 1 in any of the 1, 2, 4, 8, A, and B positions, the corresponding phototransistors $234_1$ to $234_6$ are energized; and the corresponding read amplifiers 916, 928, 930, 932, 934, and 936 are energized through leads 914, 918, 920, 922, 924, and 926. The energized ones of these read amplifiers apply signals onto the respective ones of the AND-circuits 938, 940, 942, 944, 946, and 948; and these AND-circuits are respectively gated to lead 906 through OR-circuit 950 at bit time 1, bit time 2, bit time 4, bit time 8, bit time A, and bit time B due to the fact that these timing signals are respectively applied to these AND circuits by means of leads 398, 400, 402, 404, 406, and 408. These AND circuits thus serialize the data, which is read from the card 100 and which exists in these amplifiers, onto the lead 906.

The AND-circuit 904 is enabled when the read flag latch 874 is set and during PU time applied as a signal onto the AND circuit through lead 462; and, therefore, the serialized data in lead 906 passes through the AND-circuit 904 and lead 520 to OR-circuit 514 and to lead 526 in the data loop including the delay line 366. The punched contents of column 1 in card 100 has thus been read into the delay line 366 and particularly into the PU character of column 1 of the data circulating through the delay line 366.

Shortly after the read flag latch 874 has been set, the stop search latch 886 is effective to stop the searching of memory by the AND-circuit 862 for read flags. The AND-circuit 884 is satisfied when the read flag latch 870 is set; and at bit time C and P1 time, due to these signals being applied to the AND-circuit 884 at these times through the leads 554 and 736, the stop search latch 886 is set. This discontinues the "not stop search latch" signal in lead 868 applied to the AND-circuit 862, and the AND-circuit 862 is thereupon inhibited. Subsequently, the read flag latch 874 is reset at PR time and bit time C applied as signals onto AND-circuit 880 by means of leads 648 and 554. The stop search latch 886 is reset by the "tier reset" signal in lead 646 that occurs at column 32 time applied as a signal on the OR-circuit 892, and the signal on lead 868 appears so that the AND-circuit 862 is effective to find a read flag at bit position C in character P1 of column 33 of the data circulating through the delay line 366. The circuitry is then effective, as for the punched data in column 1 of the card 100, to read the openings in column 33 in the card 100. The AND-circuits 896 and 902 are utilized for erasing the read flag in column 33 and for erasing any data in the punch character in column 33, and the AND-circuit 904 is utilized for then writing the new data in column 33 of the data circulating through the delay line 366 detected by the phototransistors $234_7$ to $234_{12}$ which are effective for the second tier by virtue of the "tier 2 latch" signal in lead 712. The reading of the punched data in column 65 similarly occurs, as for the punched data in column 33, except that in this case the phototransistors $234_{13}$ to $234_{18}$ are operative by virtue of the "tier 3 latch" signal in lead 720.

Thus, one complete column of reading has been completed, reading the punched data from the aligned columns 1, 33, and 65 of the card 100; and at this time, the transport sync latch 870 is reset by the "column 96" timed signal effective on the reset side of this latch by means of lead 464. The "transport sync" signal in lead 638 is therefore discontinued, and the AND-circuit 862 is thereby inhibited so that it cannot be effective at this time to search for additional read flags. The AND-circuit 862 is rendered again effective when another incremental movement of the card 100 takes place; and at this time, another "punch dwell" signal in lead 590 occurs so that the transport sync latch 870 is again set. The setting of the latch 870 indicates that the card 100 has moved another increment so that another column including columns 2, 34, and 66 from the card 100 are positioned in alignment with the phototransistors $234_1$ to $234_{18}$ and may be read. The reading of the punched information in columns 2, 34, and 66 takes place in the same manner as the punched information has been read from columns 1, 33, and 65 of the card 100; and the reading of the punched information from the rest of the card takes place in the same manner. At the time the punched information in column 96 is being read, the read flag latch 874 is set to provide a signal in lead 882. The "column 96" signal exists in lead 464, and both of these signals are applied onto the AND-circuit 894 to produce the "read complete" signal in lead 826. This signal is applied onto the reset side of the read op latch 822 through the OR-circuit 824, and the reading operation is terminated on the resetting of this latch.

Verification consists in general of rekeying the 96 columns of data from the original source document which should contain the same data as the card 100 that has just been read assuming that no mistakes occurred either in the original keying or in rekeying. The new data, namely, the data that is entered from the keyboard 128 on a rekeying, is compared against the data that was read from the card and which now is in the PU characters of the data circulating through the delay line 366. If the two pieces of data correspond, there has been no error in the original keying or in the rekeying; and the card 100 will be notched by means of the notcher 160 so as to provide a visable evidence that the card has been checked and is a valid card. On the other hand, if a mistake has been made, the error light 977 will be lighted and the keyboard 128 will be locked. The operator may then attempt to rekey the data again; and if a continuing error is made on the second keystroke as indicated by the error light 977 continuing to be lighted, the operator may then rekey the data with a third keystroke causing the data in that particular column circulating through the delay line 366 to be changed. The simultaneous indication will be made that this document card 100 attempted to be verified has an error, and the system writes an error flag in memory. This particular card may be considered an error card and will not be notched.

The 96 columns of data have been read from the document card 100 into the data circulating through the delay line 366 as above described, and the document card is stopped at a notcher station in which the card is disposed beneath the notcher 160 so that the notcher 160 may be effective to notch the card adjacent its trailing edge if the card is completely verified. The AND-circuit 836 in the read section 362 (see FIG. 13) has the signal "verify switch" applied to it from the lead 481, and it also has the signal "read complete" applied to it at this time from the lead 826. The AND-circuit 836 is thus effective to provide a signal through the OR-circuit 834 and the lead 840 to the counter 842, and the counter at this time generates a signal in the lead 1016 which may be termed "10 increments after read complete." This is a signal generated by the counter 842 after the document card 100 has been incremented 10 positions beyond the point at which reading of the card was finished. The signal "10 increments after read complete" in the lead 1016 is applied to the AND-circuit 1014 along with the signal "verify switch" in the lead 481, and the AND-circuit 1014 is thus satisfied and sets the secondary incrementer latch 1012. The latch 1012 being set provides a signal in the lead 1018, and the second incrementer magnet 274 is thus energized so that it is effective to lift the second incrementer pressure roll 266 off the card 100 so as to thereby stop the card 100 with its trailing edge under the notcher 160. The card 100 remains in this position, which may be considered to be a verify station, throughout the entire verify operation as the operator attempts to rekey the entire 96 columns of data and until verification is complete; and at this time, the notcher 160 is either actuated to notch the card 100 or remains unactuated in the case of an error card.

With the card 100 in its verify position in the card transport, the operator proceeds to rekey the first column of data from the source document; and the encoded data, due to this depression of a data key 132 or the space 134, is entered into the entry register 372 as has been previously described. The keystroke also has the effect through the keyboard control logic 434 to provide the "any data key" signal in the lead 438 and to cause the AND-circuit 444 to search for keyboard flags as previously described. When the keyboard flag in the first column of the data circulating through the delay line 366 is located, the AND-circuit 444 causes the keyboard service latch 450 to be set so as to provide a "keyboard service" signal on the lead 418.

The bits 1, 2, 4, 8, A, and B from the entry register 372 are provided through the buss 954 to the compare circuit 952; and the bits 1, 2, 4, 8, A, and B in the A register 368 are provided through the buss 784 to the compare circuit 952. In view of the fact that the 96 columns of data are circulating through the A register 368, these bits of data provided from the A register 368 to the compare circuit 952 are continuously changing.

When there is a compare of the data provided from the entry register 372 and from the A register, the compare circuit 952 provides a signal in the lead 956. At this time, the inverter circuit 958 does not supply a signal to its output lead 960. On the other hand, when the data supplied from the A register and from the entry register 372 to the compare circuit 952 does not compare, there is no signal on the lead 956; and the inverter circuit 958 provides a signal on lead 960. The "-keyboard service" signal is effective on location of the keyboard flag in column 1 of the data circulating through the delay line 366; and at PU time and at bit time 1 & clock B times, the signals for which are provided by the leads 462 and 670, the AND-circuit 962 provides "verify noncompare" output signal in lead 964. The use of the timing signals "PU" and "bit time 1 & clock B" assure that the AND-circuit 962 is effective in this regard only with respect to the data in the PU character of the first column of data circulating through the delay line 366 which is that data that has been read from column 1 of the card 100.

The "verify noncompare" signal in lead 964 applied on the set side of the lock keyboard latch 966 causes the latch to be set and provides the "verify lock keyboard" signal on lead 976. This signal on lead 976 is applied onto the keyboard control logic 434 which is effective to discontinue a signal on lead 440 for deenergizing the keyboard restore magnet 442 to lock the keys 132 and 134 of the keyboard 128. The "verify lock keyboard" signal on the lead 976 also has the effect of lighting the error light 977 indicating to the operator that an error has occurred and is applied onto the error counter 978. The counter 978 is then effective to provide an output signal on lead 980.

The lock keyboard latch 966 may be reset by use of the error reset key 974 that provides the "error reset key" signal on the lead 970. On resetting of the latch 966, the keyboard 128 is unlocked; and the error light 977 is turned off. The operator may then reenter the first column character by using the proper data key 132 or space key 134. Assuming that the mistake was made on the first rekeying, there is a compare by means of the compare circuit 952 so that there is a signal in the lead 956 but none in the lead 960 to be effective on the AND-circuit 962.

Assuming, however, that on the second rekeying of the first column there is another noncompare, the inverter 968 supplies a signal on lead 960; and the AND-circuit 962 is effective as before to provide a "verify noncompare" signal on the lead 964 for setting the lock keyboard latch 966 with the same results on the keyboard 128 and error light 977. The "verify noncompare" signal on the lead 964 is also effective on the error counter 978, and the error counter at this time provides a signal on lead 982 but none on lead 980.

If the operator on the third rekeying of the column 1 data from the source document still causes a noncompare by the compare circuit 852, the "verify noncompare" signal will appear on lead 964 to set the latch 966 with the same results as previously. The third "verify noncompare" signal on the lead 964 has the effect of advancing the counter 978 to its third incremental condition; and at this time, the counter 978 provides output signals on both lead 980 and lead 982. The AND-circuit 984 is then enabled, since it has both of its inputs satisfied, and provides a signal on lead 972. This has the effect of resetting the lock keyboard latch 966 and has the effect of setting the third try error latch 986. The latch 986 provides an output signal on lead 988, and the AND-circuit 990 is then satisfied at bit time C of P3 time so as to write an error flag in memory at bit position C of the P3 character of column 1 of the data circulating through the delay line 366. The AND-circuit 990 provides the "write error flag" signal on lead 524 which is applied to the OR-circuit 514 for this purpose.

Prior to the verify operation, the AND-circuit 994 is effective to assure that all of the bit C positions of the P3 characters of the data circulating through the delay line 366 in all columns are vacant so that the error flag may be written in the column 1 position as well as in the circulating data for the other columns. It will be noted that the AND-circuit 994 has an input from the leads 424 and 554 carrying the timing signals "P3" and "bit time C;" so, therefore, when the read flag latch 848 is set, the AND-circuit 994 and the inverter circuit 996 appended thereto do not provide the signal "erase flags" in lead 510 which is under ordinary conditions effective for enabling the AND-circuit 504 to allow the passage of the recirculating data from the delay line 366 therethrough.

The AND-circuit 984 provides an output on lead 972 on the third rekeying stroke and has the effect of resetting the lock keyboard latch 966; and, therefore, under these conditions, the keyboard control logic 434 unlocks the keyboard 128. The "not verify lock keyboard" signal on lead 480 is also supplied under these conditions, and this signal is effective on the AND-circuit 476 with the "verify switch" signal in lead 481 and "keyboard service" signal in lead 418 to energize the column indicator control 479 through the OR-circuit 478 so as to cause an updating of the column indicator 486 so that the digit "2" appears on the column indicator. The following actuation of one of the data keys 132 or of the space key 134 thus has the effect of causing a compare to take place with respect to column 2 data.

Compare operations are performed with respect to the data circulating through the delay line 366 for the column 2 and the succeeding columns in the same manner as the compare operation was performed between the data of column 1 circulating through the delay line and that provided to the entry register 372 by the first depression of a data key 132. Eventually, comparison operations will have been performed with respect to the entire record; and the K to P transfer latch 466 is set as above described in connection with initial data entry prior to punching, so as to provide the "K to P transfer latch" signal on lead 468. The AND-circuit 1000 has applied to it the "K to P transfer latch" signal on lead 468, the "verify switch" signal on lead 481, the "A REG A" signal on lead 730 derived from the A trigger of the A register 368, and the timing signals "P3" and "bit time 4 & clock B" on leads 424 and 448; and the AND-circuit 1000 functions to search for any error flags in memory during the K to P transfer cycle. As above described, the error flags occur in bit position C of the P3 character in those of the 96 columns of data circulating through the delay line 366 for which errors were detected; and these errors will be present in the A trigger of the A register 368 at P3 time, bit time 4, and clock B time so that the AND-circuit 1000 is thus effective to search for any of the error flags in the circulating data. If the AND-circuit 1000 is satisfied, it indicates that the card under examination contains at least one error and perhaps others. The AND-circuit 1000 is on the set side of the card no good latch 998; and, with a card having such an error in it, the latch 998 is set and discontinues the signal from the latch 998 in the lead 1002. The general effect of the card no good latch 998 on setting is to indicate that the particular card under examination is in error and should not be notched.

Assuming that no errors have been found in the card under examination, the AND-circuit 1000 is not satisfied any time during the examination of a document card 100; and under these conditions, the card no good latch 998 remains in its reset condition. Under these conditions, a continuous signal is applied to the lead 1002; and, therefore, with the "verify switch" signal on lead 481 existing, the AND-circuit 1004 has all of its inputs satisfied at column 20 time during a K to P transfer operation. The "verify switch" signal, the "column 20" timing signal, and the "K to P transfer latch" signal are respectively supplied as inputs to the AND-circuit 1004 by means of leads 481, 1008, and 468. Therefore, after examination of the complete card 100, the notch latch 1006 is set and provides a signal on its output lead 1010 which is connected to the notch magnet 246. The notch punch 242 is thus driven through the card 100 so as to notch the card to provide a visual indication on the card that it has been checked and that no errors have been found. The notch latch 1006 is reset at the following column 96 time supplied as a signal by means of lead 464 on the latch 1006; and the purpose of the "column 20" and "column 96" signals supplied to the AND-circuit 1004 and the notch latch 1006 is to provide a pulse of 4 milliseconds in duration applied to the notch magnet 246 (from column 20 through column 96) so that a pulse of sufficient duration is effective on the notch magnet 246 to cause the notch punch 242 to make its full stroke through the card 100 and back again.

Under error conditions in which the card no good latch 998 is set, the signal from this latch on lead 1002 is not supplied; and, therefore, the AND-circuit 1004 and latch 1006 cannot be effective to energize the magnet 246. The particular card 100 under consideration under these conditions remains unnotched thus indicating that a valid check of the card has not been completed.

During the K to P transfer operation, the "K to P transfer latch" signal is supplied to the reset side of the secondary incrementer latch 1012 from the lead 468; and the latch 1012 is reset. This has the effect of discontinuing the signal on lead 1018 and of deenergizing the magnet 274 so that the incrementer roll 266 drops onto the card 100 and feeds the card further along the card transport into the stacker 166. If the card thus fed to the stacker 166 has been notched, the card is thereby indicated to be found valid and without errors on verification while, if the card has no notching, it contains errors and should be replaced.

Advantageously, the keypunch or data recorder of the invention provides an operator-oriented stand-alone device capable of punching, printing, and reading data at electronic speeds (at 20 columns per second, for example) into and from a document card 100 which is considerably smaller than the conventional 80-column or Hollerith card—the punching, printing, and reading being done in nonserial fashion with respect to the plurality of tiers of the document card. The machine utilizes the keyboard 128 for encoding data serially and utilizes the magnetostrictive delay line 366 as a storage device so that punching and printing may be done in parallel fashion with three aligned columns in the three tiers being punched and printed at the same time, additional incremental movements of the card being utilized for completing the punching and printing of the card. The machine constitutes an off-line buffered unit record device used to transcribe original data serially by means of the keyboard 128 and to punch and print parallel, by tier, three characters at a time.

The machine has a capability of four stored programs in the characters P1, P2, P4, and P3 of the data circulating through the delay line 366; and the machine is capable of verification of the data entered into the document cards 100 and provides visual and physical evidence of proper content to the operator due to the notches provided by the verify notcher 160. The punching, reading, and printing assembly 126, due to the relatively small document card 100 that is utilized, is relatively small and utilizes only substantially one-half the length of the table top 116 so as to provide an adequate work surface, which may easily amount to 350 to 400 square inches, for the operator.

The machine document transport 142 utilizes a clutchless, straight-line feed path with continuous motion of the cards 100 during punching and printing and allowing easy operator access to the cards 100 passing through the transport. The hopper 144 is a top-feeding hopper which allows any data on the cards that are being fed from the hopper to be viewed by the operator, since the cards 100 are in the hopper face up with their registration edge (the card edge adjacent columns 1, 33, and 65) to the left as seen in FIG. 5 (in the direction in which the cards pass through the transport). For the purpose of rendering the upper faces of the cards 100 easily seen by the operator so that the operator may easily read any printed or written material thereon, the plate 168 of the hopper 144 extends downwardly at approximately an angle of 35° with respect to horizontal as previously described; and, therefore, the upper faces of the cards 100 in the hopper 144 extend at the same angle with respect to vertical and are approximately perpendicular to the operator's line of sight. Magnet action allows the pick roll 146 to pick a card 100 from the top out of the hopper 144 so that the card moves against the registration gate 156 at the punch station in which the card 100 is in a column 0 position. During the dwell portions of an incremental card movement, the pressure rolls 226 and 266 grip the card 100 against the lower continuously incrementing wheels 154 and 164 so that the card travels incrementally through the punch, read, and print stations to the stacker 166 and so that punching and printing actually take place when the card is momentarily stationary. It will be noted that the hopper 144 is preferably slanted at an angle of about 15° with respect to the deck 170 so that the cards 100 feed slightly downwardly onto the deck 170; and the stacker shoe 282 cooperates with the constantly rotating stacker wheel 284, which rotates on an axis parallel with the deck 170 and the cards 100 thereon, for the purpose of turning the cards 100 through a right angle and stacking them in the stacker 166 at right angles to the plane of the deck 170.

This same machine, utilized for punching and printing the cards 100, advantageously also allows the cards to be verified. A document card 100 is stopped at a verify notch location—this pause being effective by lifting the pressure roll 266 by magnet action; and when the magnet action is discontinued, the roll 266 and second incrementer wheel 164 again cause the card 100 to increment until it passes between the stacker shoe 282 and stacker wheel 284 into the stacker 166. A following card 100 is moved in the same manner behind a previous card 100 to maintain sequence and form the stacked deck. The configuration of the transport provides simplicity, accessibility, and flexibility in a small volume and is made possible in particular due to the relatively small card 100 which may only be, for example, 3¼ inches long and 2⅝ inches wide, even though it provides 96 columns for punch data in three tiers and provides three print lines corresponding to the 96 columns.

The disclosure in this application is related to the disclosures in other copending applications owned by the same assignee, particularly, John J. Igel and Myron D. Schettl, Ser. No. 835,548, filed June 23, 1969; John J. Igel and Myron D. Schettl, Ser. No. 838,969, filed July 3, 1969; and John J. Igel and Myron D. Schettl, Ser. No. 24,780, and filed Apr. 1, 1970.

Various features of these three applications may be added to and incorporated into the machine disclosed in the present application, and it should be noted that the third of the above-mentioned related applications discloses and claims a mechanism comparable to that shown in FIG. 13 of this application for correcting the data in a circulating data loop on the third stroke of a data key during a verify operation.

What is claimed is:

1. A machine for recording encoded data on a record medium divided into separate tiers including a plurality of adjacently arranged data recording columns, and machine comprising:
- recording devices for respectively recording data in said tiers,
- a storage device for storing encoded data,
- character encoding means for encoding characters one after the other and connected with said storage device so as to serially enter the characters as encoded into said storage device, and
- means connecting said storage device and said recording devices so that said recording devices are respectively energized by the data of encoded characters in said storage device taken in an arrangement other than the serial arrangement in which the encoded characters are entered into said storage device.

2. A machine as set forth in claim 1, said record medium constituting a document card having the data recording columns of said tiers in alignment, said recording devices constituting a line of punches which are in alignment with each other.

3. A machine as set forth in claim 1, said record medium constituting a document card having the data-recording columns of said tiers in alignment, said recording devices constituting a plurality of rotatable coaxial rows of print characters and hammers for said rows which are in alignment with each other.

4. A machine as set forth in claim 1, said record medium constituting a document card having the data-recording columns of said tiers in alignment, said machine including a transport for said document card and means for incrementing the card through incremented positions in said transport corresponding to said aligned columns, said means connecting said storage device and said recording devices being effective so as to make the recording devices operative while the card is in its incremented positions.

5. A machine as set forth in claim 4, said record medium constituting a document card having the data-recording columns of said tiers in alignment, said recording devices constituting a plurality of punches for each of said tiers and which are in alignment with each other and with the punches for the other tiers.

6. A machine as set forth in claim 4, said recording devices constituting a plurality of rotatable rows of print characters and hammers for said rows which are in alignment with each other.

7. A machine as set forth in claim 1, said storage device including a magnetostrictive delay line and circuitry connecting the ends of the line so that data may circulate through the delay line.

8. A machine as set forth in claim 7, said record medium constituting a document card having three tiers and having the data-recording columns of said tiers in alignment, said machine including a transport for said document card and means for incrementing the card through positions corresponding to said columns, said means connecting said storage device and said recording devices being so effective as to make the recording devices operative while the card is in its incremented positions.

9. A machine as set forth in claim 7, said connecting means including a register for storing the encoded data for each of said recording devices and connectable with said delay line so as to be supplied with separate encoded characters respectively applicable to said recording devices.

10. A machine as set forth in claim 7, said connecting means including:
- means for providing a flag bit circulating through said delay line for each of the characters circulating through the line,
- a register for storing the encoded information to be used by each of said recording devices for recording the data in said tiers,
- means for detecting the presence of said flag bits circulating through said delay line,
- means for gating said delay line to said registers on detection of a flag bit, and
- means for selectively rendering said detecting means operable for spaced ones of said flag bits so as to respectively load said registers with the spaced characters circulating through said delay line to be respectively recorded in the different ones of said tiers.

11. A machine as set forth in claim 1, said storage device including a magnetostrictive delay line, a shift register comprising a series of triggers, and circuitry connecting said line and said shift register in series,
- said connecting means including a storage register for storing the data to be used by each of said recording devices and said storage registers each including a plurality of latches to store each of the encoded bits of a character, and
- means for connecting each of said latches with one of said triggers in said shift register so that the storage register is effective to store the encoded characters to be utilized by the respective recording devices.

12. A machine as set forth in claim 1, said storage device including a magnetostrictive delay line, a shift register comprising a series of triggers and circuitry connecting said delay line and shift register so that they form a data loop,
- means for writing a flag bit into the data circulating in said loop for each of said encoded characters, said connecting means including a storage register for each of said tiers and each of said storage registers including a plurality of latches,
- means for connecting said latches respectively with the triggers in said shift register so that the contents of the shift register are stored by said latches, and means for switching the connecting means so that said storage registers respectively store encoded data from spaced ones of the characters circulating through said data loop whereby the registers store the data for respective ones of said recording devices.

13. A machine as set forth in claim 12, said record medium constituting a document card having the data-recording columns in one of said tiers aligned with the data-recording columns in the other or others of said tiers, said machine including:

means for incrementing said document card past said recording devices, means responsive to said incrementing means so that said recording devices are effective for each increment of said card, and means responsive to said incrementing means for locating said flag bits in the data circulating through said data loop applicable to the data to be recorded in succeeding columns on said card after the first said column so that spaced encoded characters from the data loop are stored in said storage registers for the succeeding columns of said card after the first said column.

14. A machine as set forth in claim 1, said storage device including a magnetostrictive delay line, and circuitry connecting the ends of the line so that data may circulate through the delay line, said character encoding means including a keyboard which is so connected with the delay line as to serially enter encoded characters into keyboard sections of succeeding columns of data circulating through the delay line, said connecting means including means for moving the encoded characters in the data circulating through said delay line from a keyboard section into another section for each of the columns of data circulating through the delay line, said connecting means also including means connecting said recording devices with said data loop so that spaced ones of said encoded characters as so moved are effective for energizing said recording devices whereby spaced ones of said characters as so entered into said data loop are recorded on said record medium.

15. A machine as set forth in claim 14, said connecting means also including:

means for writing a flag bit to correspond with each of the columns of data circulating in said data loop, means for searching for said flag bits preliminary to causing said recording devices to record the data and for then erasing the flag bit of each of the characters recorded by a recording device, and means for gating said recording devices with said delay line on location of flag bits, said machine also including means for incrementing the card across said recording devices, and means responsive to the incrementing of the card so as to cause said connecting means to search for the flags for succeeding spaced encoded characters circulating through said data loop so that said recording devices are successively effective to record data for succeeding columns on said record medium.

16. A machine as set forth in claim 1, said recording devices constituting a line of punches, said storage device including a magnetostrictive delay line and circuitry connecting the ends of the line so that data may circulate through the delay line, said machine including additional recording devices constituting a plurality of rotatable rows of print characters and hammers for said rows so as to print the characters on the record medium, said machine also including additional connecting means for connecting said storage device and said additional recording devices so that print characters corresponding to the data punched in said record medium by said punches is printed in tiers on said record medium.

17. A machine as set forth in claim 1, said storage device including a magnetostrictive delay line and circuitry connecting the ends of the line so that data may circulate through the delay line, said character-encoding means including a keyboard which is so connected with said delay line that successive encoded characters are successively entered into keyboard sections of successive data columns circulating through said delay line as the keyboard is successively actuated, said record medium constituting a document card having aligned punch and printing columns in a plurality of tiers, said recording devices constituting a plurality of punches for simultaneously punching the punch columns in the plurality of punch tiers and including also a plurality of rotatable rows of print characters and hammers for said rows so that the aligned print columns may be substantially simultaneously printed, said connecting means including means for transferring the data entered from said keyboard into said columns of data circulating through said delay line from a first character position to a punch character position whereby said punches may be activated by the data for punching the card, said machine including also means for subsequently transferring the data in said punch sections of the data circulating through the delay line to print sections of the circulating data whereby said hammers may be actuated to print columns of characters to correspond to the columns of data punched into the card.

* * * * *

PO-1050 (5/69)

UNITED STATES PATENT OFFICE
CERTIFICATE OF CORRECTION

Patent No. 3,642,197 Dated February 15, 1972

Inventor(s) Donald E. Bean, James T. Engh, James R. Hammer, John J. Igel, John W. Kerr, Myron D. Schettl, Harry J. Tashjian and Richard J. Ullmer It is certified that error appears in the above-identified patent and that said Letters Patent are hereby corrected as shown below:

In the claims:

Claim 1, column 35, line 43, "and" should be --said--.

Signed and sealed this 18th day of December 1973.

(SEAL)
Attest:

EDWARD M. FLETCHER, JR.
Attesting Officer

RENE D. TEGTMEYER
Acting Commissioner of Patents

Disclaimer 3,642,197.—*Donald E. Bean*, *James T. Engh*, *James R. Hammer*, and *John J. Igel*, Rochester, *Myron D. Schettl*, Oronoco, *Harry J. Tashjian* and *Richard J. Ullmer*, Rochester, and *John W. Kerr*, Byron, Minn DATA RECORDER AND VERIFIER. Patent dated Feb. 15, 1972. Disclaimer filed July 1, 1974, by the assignee, *International Businesss Machines Corporation*.

Hereby enters this disclaimer to claims 1 through 7 of said patent.

[*Official Gazette May 20, 1975.*]